(12) United States Patent
Bender et al.

(10) Patent No.: US 8,996,563 B2
(45) Date of Patent: Mar. 31, 2015

(54) HIGH-PERFORMANCE STREAMING DICTIONARY

(75) Inventors: Michael A. Bender, Syosset, NY (US);
Martin Farach-Colton, New York, NY (US); Yonatan R. Fogel, Port Jefferson, NY (US); Zardosht Kasheff, New York, NY (US); Bradley C. Kuszmaul, Lexington, MA (US); Vincenzo Liberatore, University Heights, OH (US); Barry Perlman, Cambridge, MA (US); Rich Prohaska, Westford, MA (US); David S. Wells, Waterville, VT (US)

(73) Assignee: Tokutek, Inc., Lexington, MA (US)

( * ) Notice: Subject to any disclaimer, the term of this patent is extended or adjusted under 35 U.S.C. 154(b) by 54 days.

(21) Appl. No.: 12/755,391

(22) Filed: Apr. 6, 2010

(65) Prior Publication Data
US 2011/0246503 A1 Oct. 6, 2011

(51) Int. Cl.
*G06F 17/30* (2006.01)
(52) U.S. Cl.
CPC ................ *G06F 17/30306* (2013.01)
USPC ......................................... 707/769
(58) Field of Classification Search
USPC .................................. 707/797, 769
See application file for complete search history.

(56) References Cited

U.S. PATENT DOCUMENTS

| | | |
|---|---|---|
| 5,124,987 A | 6/1992 | Milligan |
| 5,204,958 A | 4/1993 | Cheng |
| 5,819,292 A | 10/1998 | Hitz |
| 6,026,406 A | 2/2000 | Huang |
| 6,694,323 B2 | 2/2004 | Bumbulis |
| 7,577,673 B2 | 8/2009 | Pauly |
| 8,185,551 B2 | 5/2012 | Kuszmaul |
| 2005/0102255 A1 | 5/2005 | Bultman |
| 2006/0179086 A1 | 8/2006 | Najork |

OTHER PUBLICATIONS

Ittai Abraham, James Aspnes, and Jian Yuan. Skip B-trees. In Pro-ceed-ings of the 9th International Conference on Principles of Distributed Systems (OPODIS), vol. 3974 of Lecture Notes in Computer Science, pp. 366-380, 2005.

(Continued)

*Primary Examiner* — Mariela Reyes
*Assistant Examiner* — Mohsen Almani
(74) *Attorney, Agent, or Firm* — Bradley N. Ruben

(57) ABSTRACT

A method, apparatus and computer program product for storing data in a disk storage system is presented. A high-performance dictionary data structure is defined. The dictionary data structure is stored on a disk storage system. Key-value pairs can be inserted and deleted into the dictionary data structure. Updates run faster than one insertion per disk-head movement. The structure can also be stored on any system with two or more levels of memory. The dictionary is high performance and supports with full transactional semantics, concurrent access from multiple transactions, and logging and recovery. Keys can be looked up with only a logarithmic number of transfers, even for keys that have been recently inserted or deleted. Queries can be performed on ranges of key-value pairs, including recently inserted or deleted pairs, at a constant fraction of the bandwidth of the disk.

12 Claims, 56 Drawing Sheets

(56) References Cited

OTHER PUBLICATIONS

Stephen Alstrup, Michael A. Bender, Erik D. Demaine, Martin Farach-Colton, J. Ian Munro, Theis Rauhe, and Mikkel Thorup. Efficient tree layout in a multi-level memory hierarchy. arXiv:cs.DS/0211010, Nov. 2002. http://www.arXiv.org/abs/cs.DS/0211010.
Lars Arge. The buffer tree: A technique for designing batched external data structures. Algorithmica, 37(1):1-24, 2003.
Lars Arge. The buffer tree: A new technique for optimal i/o-algorithms (extended abstract). In Proceedings of the 4th International Workshop on Algorithms and Data Structures (WADS '95), pp. 334-345, 1995.
Lars Arge. The buffer tree: A new technique for optimal I/O algorithms. Technical Report BRICS RS-96-28, BRICS RS-96-28, Aug. 1996.
Lars Arge, Michael A. Bender, Erik D. Demaine, Bryan Holland-Minkley, and J. Ian Munro. Cache-oblivious priority queue and graph algorithm applications. SIAM Journal on Computing, 36(6):1672-1695, 2007. An earlier version appeared in STOC 2002.
James Aspnes and Gauri Shah. Skip graphs. In Proceedings of the Fourteenth Annual ACM-SIAM Symposium on Discrete Algorithms (SODA), pp. 384-393, 2003.
Baruch Awerbuch and Christian Scheideler. The hyperring: a low-congestion deterministic data structure for distributed environments. In Proceedings of the Fifteenth Annual ACM-SIAM Symposium on Discrete Algorithms (SODA), pp. 318-327, Jan. 11-14, 2004.
Baruch Awerbuch and Christian Scheideler. Consistent and compact data management in distributed storage systems. In Proceedings of the Sixteenth Annual ACM Symposium on Parallel Algorithms (SPAA), pp. 44-53, Barcelona, Spain, Jun. 27-30, 2004.
Rudolf Bayer and Edward M. McCreight. Organization and maintenance of large ordered indexes. Acta Informatica, 1 (3):173-189, Feb. 1972.
M. A. Bender, G. S. Brodal, R. Fagerberg, D. Ge, S. He, H. Hu, J. Iacono, and A. Lopez-Ortiz. The cost of cache-oblivious searching. In Proceedings of the 44th Annual Symposium on Foundations of Computer Science (FOCS), pp. 271-280, 2003.
M. A. Bender, R. Cole, E. Demaine, and M. Farach-Colton. Scanning and traversing: Maintaining data for traversals in a memory hierarchy. In Proceedings of the 10th European Symposium on Algorithms (ESA), pp. 139-151, 2002.
M. A. Bender, R. Cole, and R. Raman. Exponential structures for efficient cache-oblivious algorithms. In Proceedings of the 29th International Colloquium on Automata, Languages and Programming (ICALP), pp. 195-207, 2002.
M. A. Bender, E. Demaine, and M. Farach-Colton. Cache-oblivious B-trees. In 41st Annual Symposium on Foundations of Computer Science (FOCS), pp. 399-409, 2000.
M. A. Bender, E. Demaine, and M. Farach-Colton. Efficient tree layout in a multilevel memory hierarchy. In Proceedings of the 10th European Symposium on Algorithms (ESA), pp. 165-173, 2002.
Michael A. Bender, Erik D. Demaine, and Martin Farach-Colton. Cache-oblivious B-trees. SIAM Journal on Computing, 35(2):341-358, 2005.
M. A. Bender, Z. Duan, J. Iacono, and J. Wu. A locality-preserving cache-oblivious dynamic dictionary. In Proceedings of the 13th Annual ACM-SIAM Symposium on Discrete Algorithms (SODA), pp. 29-38, 2002.
Michael A. Bender, Ziyang Duan, John Iacono, and Jing Wu. A locality-preserving cache-oblivious dynamic dictionary. Journal of Algorithms, 53(2):115-136, Nov. 2004.
Michael A. Bender, Martin Farach-Colton, Jeremy T. Fineman, Yonatan R. Fogel, Bradley C. Kuszmaul, and Jelani Nelson. Cache-oblivious streaming b-trees. In Proceedings of the 19th Annual ACM Symposium on Parallel Algorithms and Architectures (SPAA), pp. 81-92, 2007.
Michael A. Bender, Martin Farach-Colton, and Bradley C. Kuszmaul. Cache-oblivious string B-trees. In the 25th ACM SIGMOD-SIGACT-SIGART Symposium on Principles of Database Systems (PODS 2006), pp. 233-242, Chicago, IL, Jun. 2006.
Michael A. Bender, Jeremy T. Fineman, Seth Gilbert, and Bradley C. Kuszmaul. Concurrent cache-oblivious B-trees. In Symposium on Parallelism in Algorithms and Architectures (SPAA05), pp. 228-237, Jul. 2005.
M. A. Bender and H. Hu. An adapative packed-memory array. In Proceedings of the 25th ACM SIGMOD-SIGACT-SIGART Symposium on Principles of Database Systems (PODS), pp. 20-29, Chicago, 2006. Winner, Best Newcomer Award.
Michael A. Bender and Haodong Hu. An adaptive packed-memory array. Transactions on Database Systems, 32(4), 2007.
Jon Louis Bentley and James B. Saxe. Decomposable searching problems I:Static-to-dynamic transformation. J. Algorithms, 1(4):301-358, 1980.
Mark de Berg, Otfried Cheong, Marc van Kreveld, and Mark Overmars. Computational Geometry I Algorithms and Applications. Springer-Verlag, third edition, 2008.
Philip A. Bernstein and Nathan Goodman. Multiversion concurrency control—theory and algorithms. ACM Transaction on Database Systems (TODS), 8(4):465-483, Dec. 1983.
Laurynas Biveinis, Simonas Saltenis, and Christian S. Jensen. Main-memory operation buffering for efficient R-tree update. In Proceedings of the 33rd International Conference on Very Large Data Bases (VLDB), pp. 591-602, 2007.
Burton H. Bloom. Space/time trade-offs in hash coding with allowable errors. Commun. ACM, 13(7):422-426, 1970.
Klaus Brengel, Andreas Crauser, Paolo Ferragina, and Ulrich Meyer. An experimental study of priority queues in external memory. J. Exp. Algorithmics, 5:17, 2000.
A. Brinkmann, K. Salzwedel, and C. Scheideler. Efficient, distributed data placement strategies for storage area networks. In Proceedings of the Twelfth Annual ACM Symposium on Parallelism in Algorithms and Architectures, Bar Harbor, Maine, USA, Jul. 9-12, 2000.
Gerth Stolting Brodal and Rolf Fagerberg. Lower bounds for external memory dictionaries. In Proceedings of the 13th Annual ACM-SIAM Symposium on Discrete Algorithms (SODA), pp. 39-48, 2002.
Adam L. Buchsbaum, Michael Goldwasser, Suresh Venkatabsubramanian, and Jeffery R.Westbrook. On external memory graph traversal. In Proc. ACM-SIAM Symp. on Discrete Algorithms, 2000.
Peter Bumbulis and Ivan T. Bowman. A compact B-tree. In Proceedings of the 2002 ACM SIGMOD International Conference on Management of Data (SIGMOD), pp. 533-541, Madison, WI, Jun. 2002.
Bernard Chazelle and Leonidas J. Guibas. Fractional cascading: I. a data structuring technique. Algorithmica, 1 (2):133-162, 1986.
Douglas Comer. The ubiquitous B-tree. ACM Computing Surveys, 11(2):121-137, Jun. 1979.
CopperEye. Impact of key locality on performance. A CopperEye Technical White Paper, Jan. 2004.
CoppperEye. Profile of CopperEye indexing technology. A CopperEye Technical White Paper, Sep. 2004.
CopperEye. Introduction to the CopperEye DataBlade for informix. Power point presentation at Washing DC IIUG, Jan. 27, 2005.
T. H. Cormen, C. E. Leiserson, R. L. Rivest, and C. Stein. Introduction to Algorithms, 2nd edition. MIT Press, McGraw-Hill Book Company, 2000.
David J. DeWitt, Randy H. Katz, Frank Olken, Leonard D. Shapiro, Michael R. Stonebraker, and David Wood. Implementation techniques for main memory database systems. In Proceedings of the 1984 ACM SIGMOD International Conference on Management of Data, pp. 1-8, Boston, Massachusetts, Jun. 18-21, 1984.
Peter C. Dillinger and Panagiotis Manolios. Bloom filters in probabilistic verification. In Proceedings on 5th International Conference on Formal Methods in Computer-Aided Design (FMCAD), pp. 367-381, 2004.
Li Fan, Pei Cao, Jussara M. Almeida, and Andrei Z. Broder. Summary cache: a scalable wide-area web cache sharing protocol. IEEE/ACM Trans. Netw., 8(3):281-293, Jun. 2000.
Li Fan, Pei Cao, Jussara M. Almeida, and Andrei Z. Broder. Summary cache: A scalable wide-area web cache sharing protocol. In SIGCOMM, pp. 254-265, 1998.

(56) References Cited

OTHER PUBLICATIONS

Matteo Frigo, Charles E. Leiserson, Harald Prokop, and Sridhar Ramachandran. Cache-oblivious algorithms. In 40th Annual Symposium on Foundations of Computer Science, pp. 285-297, New York, New York, Oct. 17-19, 1999.
Filesystem in Userspace (FUSE). http://fuse.sourceforge.net, 2006.
Goetz Graefe. B-tree indexes for high update rates. SIGMOD Record, 35(1):39-44, 2006.
Jim Gray and Andreas Reuter. Transaction Processing: Concepts and Techniques. Morgan Kaufmann, 1993.
Joseph M. Hellerstein, Jeffrey F. Naughton, and Avi Pfeer. Generalized search trees for database systems. In VLDB, pp. 562-573, 1995.
Bingsheng He and Qiong Luo. Cache-oblivious databases: Limitations and opportunities. ACM Transactions on Database Systems, 33(2):8:1-8:42, Jun. 2008.
H. V. Jagadish, P. P. S. Narayan, S. Seshadri, S. Sudarshan, and Rama Kanneganti. Incremental organization for data recording and warehousing. In Proceedings of the 23trd VLDB Conference, Athens, Greece, 1997.
Chris Jermaine, Anindya Datta, and Edward Onniecinski. A novel index supporting high volume data warehouse insertion. In Proceedings of 25th International Conference on Very Large Data Bases (VLDB), pp. 235-246, 1999.
Christopher M. Jermaine, Edward Omiecinski, and Wai Gen Yee. The partitioned exponential le for database storage management. The International Journal on Very Large Data Bases, 16(4):417-437, 2007.
Theodore Johnson. A highly concurrent priority queue based on the B-link tree. Electronic Tech Report 007-91, University of Florida, Department of CIS, Aug. 18, 1991.
Theodore Johnson. The Performance of Concurrent Data Structure Algorithms. PhD thesis, New York University, 1994.
Theodore Johnson and Dennis Shasha. A framework for the performance analysis of concurrent B-tree algorithms. In Proceedings of the 9th ACM SIGACT-SIGMOD-SIGART Symposium on Principles of Database Systems, pp. 273-287, 1990.
Theodore Johnson and Dennis Shasha. The performance of current B-tree algorithms. ACM Trans. Database Syst., 18 (1):51-101, 1993.
D. Karger, E. Lehman, T. Leighton, M. Levine, D. Lewin, and R. Panigrahy. Consistent hashing and random trees: Distributed caching protocols for relieving hot spots on the world wide web. In Proceedings of the Twenty-Ninth Annual ACM Symposium on the Theory of Computing (STOC), pp. 654-663, 1997.
Donald E. Knuth. The Art of Computer Programming, vol. 3: Sorting and Searching. Addison Wesley, Reading, MA, 1973.
Marcel Kornacker, C. Mohan, and Joseph M. Hellerstein. Concurrency and recovery in generalized search trees. In Proceedings of the 1997 ACM SIGMOD International Conference on Management of Data, pp. 62-72, 1997.
Bradley Kuszmaul, Michael A. Bender, and Martin Farach-Colton. Disk-resident streaming dictionary. U.S. Appl. No. 11/760,379, 2007. (Unpublished application.).
Vladimir Lanin and Dennis Shasha. A symmetric concurrent B-tree algorithm. In Proceedings of the Fall Joint Computer Conference, pp. 380-389, 1986.
Vladimir Lanin and Dennis Shasha. Concurrent set manipulation without locking. In Proceedings of the 7th ACM SIGACT-SIGMOD-SIGART Symposium on Principles of Database Systems, pp. 211-220, 1988.
Kim S. Larsen and Rolf Fagerberg. B-trees with relaxed balance. In Proc. 9th International Parallel Processing Symposium, pp. 196-202, 1995.
Philip L. Lehman and S. Bing Yao. Efficient locking for concurrent operations on B-trees. ACM Trans. Database Syst., 6(4):650-670, 1981.
Constantin Loizides. Journaling filesystem fragmentation project. http://www.informatik.uni-frankfurt.de/~loizides/reiserfsl, 2004. Accessed Fri May 25, 2012.
Marshall K. McKusick, William N. Joy, Samuel J. Leer, and Robert S. Fabry. A fast file system for UNIX. Computer Systems, 2(3):181-197, Aug. 1984.
L. W. McVoy and S. R. Kleiman. Extent-like performance from a UNIX file system. In Proceedings of the USENIX. Winter 1991 Technical Conference, pp. 33-43, Dallas, TX, USA, 1991.
Jelani Nelson. External-memory search trees with fast insertions. Master's thesis, Massachusetts Institute of Technology, Department of Electrical Engineering and Computer Science, Jun. 2006.
Otto Nurmi, Eljas Soisalon-Soininen, and Derick Wood. Concurrency control in database structures with relaxed balance. In Proc. Sixth ACM SIGACT-SIGMOD-SIGART Symposium on Principles of Database Systems (PODS), pp. 170-176, 1987.
Patrick O'Neil, Edward Cheng, Dieter Gawlick, and Elizabeth O'Neil. The log-structured merge-tree (LSM-tree). Acta Informatica, 33(4):351-385, 1996.
Anna Pagh, Rasmus Pagh, and S. Srinivasa Rao. An optimal bloom filter replacement. In Proceedings of the Sixteenth Annual ACM-SIAM Symposium on Discrete Algorithms (SODA), pp. 823-829, 2005.
Franco P. Preparata and Michael Ian Shamos. Computational Geometry: An Introduction. Springer-Verlag, 1985.
Harald Prokop. Cache-oblivious algorithms. Master's thesis, Department of Electrical Engineering and Computer Science, Massachusetts Institute of Technology, Jun. 1999.
Felix Putze, Peter Sanders, and Johannes Singler. Cache-, hash- and space-eggocient bloom filters. In Proceedings of 6th International Workshop Experimental Algorithms (WEA), pp. 108-121, 2007.
H. T. Reiser. Reiser File system white paper. http://www.namesys.com/whitepaper.html, 2002. Retrieved from the internet archive at http://web.archive.org/web/20070927003401/http://www.namesys.com/whitepaper.html on Fri May 25, 2012.
Mendel Rosenblum and John K. Ousterhout. The design and implementation of a log-structured file system. ACM Transactions on Computer Systems, 10(1):26-52, Feb. 1992.
Yehoshua Sagiv. Concurrent operations on B*-trees with overtaking. In Proceedings of the 4th Annual ACM SIGACT-SIGMOD Symposium on the Principles of Database Systems, pp. 28-37, 1999.
Yehoshua Sagiv. Concurrent operations on B*-trees with overtaking. Journal of Computer and System Sciences, 33 (2):275-296, 1986.
C. Schindelhauer and G. Schomaker. Weighted distributed hash tables. In Proceedings of the Seventeenth Annual ACM Symposium on Parallel Algorithms and Architectures (SPAA '2005), Las Vegas, Nevada, Jul. 2005.
Dennis G. Severance and Guy M. Lohman. Differential les: Their application to the maintenance of large databases. ACM Transactions on Database Systems, 1(3):256-267, Sep. 1976.
Sleepycat Software. The Berkeley database. http://www.sleepycat.com, 2005. This company was bought by Oracle, the web site is gone, and a recent version of the programming manual is now available at http://docs.oracle.com/cd/E17076_02/html/programmer_reference/BDB_Prog_Reference.pdf.
Keith A. Smith and Margo I. Seltzer. File system aging—increasing the relevance of file system benchmarks. In Measurement and Modeling of Computer Systems, pp. 203-213, 1997.
Ulrich Stern and David L. Dill. A new scheme for memory-efficient probabilistic verification. In Formal Description Techniques IX: Theory, application and tools, IFIP TC6 WG6.1 International Conference on Formal Description Techniques IX / Protocol Specification, Testing and Verification XVI, pp. 333-348, 1996.
Adam Sweeny, Doug Doucette, Wei Hu, Curtis Anderson, Mike Nishimoto, and Geoff Peck. Scalability in the XFS file system. In Proceedings of the 1996 USENIX Technical Conference, pp. 1-14, San Diego, CA, Jan. 1996.
Ken Thompson. Unix implementation. Bell System Technical Journal, 57(6), July{Aug. 1978.
Andrew Twigg. Data storage methods and apparatus. U.S. Appl. No. 12/752,673, 2010. (Unpublished application.).
Wikipedia, the Free Encyclopedia. Bloom filter, Feb. 2008. Viewed Feb. 5, 2008.
Ke Yi. Dynamic indexaiblity and lower bounds for dynamic one-dimensional range query indexes. In PODS '09, Providence, RI, Jun. 29{Jul. 2 2009.
Graefe, B., B-tree Indexes for High Update Rates, Sigmoid Record, vol. 35, No. 1, pp. 40-41.
International Search Report (Form PCT/ISA/220) for PCT/US08/63435, mailed Sep. 4, 2008.

OMT 1101

```
is_array 1102
omt_cursors 1103
omt_array 1104
omt_tree 1105
```

OMT_FIND_PAIR $(N, p)$
1  if $p < value(N)$
2      then return OMT_FIND_PAIR$(left(N), p)$;
3  else if $p = value(N)$
4      then return $leftweight(N)$;
5  else return $leftweight(N) + 1 +$ OMT_FIND_PAIR$(right(N), p)$;

OMT_FIND_VALUE $(N, i)$
1   if $i < leftweight(N)$
2       then return OMT_FIND_VALUE$(left(N), i)$;
3   else if $i = leftweight(N)$
4       then return $value(N)$;
5   else return OMT_FIND_VALUE$(right(N), i - leftweight(N) - 1)$;

OMT_INSERT_UNBALANCED $(N, i, v)$
1  if $N$ is NULL
2     then return a new node with value $v$, weight 1, and no children.
3  else if $i \leq \mathit{leftweight}(N)$
4     then
5          $\mathit{left}(N) \leftarrow$ OMT_INSERT_UNBALANCED$(\mathit{left}(N), i, v)$;
6          return $N$;
7     else
8          $\mathit{right}(N) \leftarrow$ OMT_INSERT_UNBALANCED$(\mathit{right}(N), i - \mathit{leftweight}(N) - 1, v)$;
9          return $N$;

FIG. 21

| le_tag 2201: LE_COMMITTED = 1 |
| le_key 2202 |
| le_cvalue 2204 |
| le_checksum 2206 |

| le_tag 2201: LE_BOTH = 2 |
| le_key 2202 |
| le_xid 2203 |
| le_cvalue 2204 |
| le_pvalue 2205 |
| le_checksum 2206 |

| le_tag 2201: LE_PROVDEL = 3 |
| le_key 2202 |
| le_xid 2203 |
| le_cvalue 2204 |
| le_checksum 2206 |

| le_tag 2201: LE_PROVVAL = 4 |
| le_key 2202 |
| le_xid 2203 |
| le_pvalue 2205 |
| le_checksum 2206 |

```
CHECKSUM(B, l)
1   s ← 0;
2   i ← 0;
3   while i < l
4       v ← 0;
5       j ← 0;
6       while i < l and j < 8
7           v ← v + B_i · 2^{7-j};
8           i ← i + 1;
9           j ← j + 1;
10      s ← (s · 17 + v) mod 2^{64};
11  return ~((0xFFFFFFFF & s) ⊗ (s >> 32));
```

```
uint64_t checksum_inner (uint64_t *x, int n) {
    uint64_t r=0;
    for (int i=0; i<n; i++) {
        r = r*17 + x[i];
    }
    return r;
}
```

```
#define CHUNK 32
uint64_t x1764 (uint64_t *x, int n) {
    uint64_t subsum[CHUNK];
    uint64_t nbyCHUNK = n/CHUNK;
    uint64_t seventeento = power(17, nbyCHUNK);
    cilk_for (uint64_t j=0; j<CHUNK; j++) {
        uint64_t r=0;
        for (int i=0; i<nbyCHUNK; i++) {
            r = r*17 + x[j*nbyCHUNK + i];
        }
        subsum[j]=r;
    }
    uint64_t r = 0;
    for (int i=0; i<CHUNK; i++) {
        r = r*seventeento + subsum[i];
    }
    return r;
}
```

FIG. 25

Message encoding example 2901

| 01 | 00 | 00 | 00 | 00 | 00 | 00 | 04 | 12 | 00 | 00 | 00 | 03 | 61 | 62 | 63 | 00 | 00 | 00 | 04 | 77 | 78 | 79 | 7A |

FIG. 29 block translation pair 3101

| offset 3102 |
| size 3103 |

FIG. 31 segment allocator 3201

| ba_align 3202 |
| ba_nsegments 3203 |
| ba_arraysize 3204 |
| ba_arrayptr 3205 |
| ba_nextfit 3206 |
| ba_reserve 3207 |

FIG. 32 statistics 414

| |
|---|
| ndata 3301 |
| ndata_error_bound 3302 |
| nkeys 3303 |
| nkeys_error_bound 3304 |
| minkey 3305 |
| maxkey 3306 |
| dsize 3307 |

```
1  BEGIN TRANSACTION X_0
2      INSERT(k, val_0);
3      BEGIN TRANSACTION X_1
4          INSERT(k, val_1);
5      COMMIT X_1;
6      BEGIN TRANSACTION X_2
7          INSERT(k, v_2);
8          BEGIN TRANSACTION X_3
9              INSERT(j, v_j);
10             BEGIN TRANSACTION X_4
11                 INSERT(k, v_4);
12             COMMIT X_4
13         COMMIT X_3
14     COMMIT X_2
15 COMMIT X_0
```

FIG. 34

| insert | $k$ | $X_0$ | $v_0$ |   3501

| insert | $k$ | $X_1, X_0$ | $v_1$ |   3502

| insert | $k$ | $X_2, X_0$ | $v_2$ |   3503

| insert | $k$ | $X_4, X_3, X_2, X_0$ | $v_4$ |   3504

FIG. 35

Message insert | $k$ | $X_0$ | $v_0$     3501 insert | $k$ | $X_1, X_0$ | $v_1$     3502 insert | $k$ | $X_2, X_0$ | $v_2$     3503 insert | $k$ | $X_4, X_3, X_2, X_0$ | $v_4$     3504

Leaf entry after message is processed

| $k$ | $X_0$ | $v_0$ |     3601

| $k$ | $X_1$ | $v_1$ |
|     | $X_0$ | $v_0$ |     3602

| $k$ | $X_2$ | $v_2$ |
|     | $X_0$ | $v_1$ |     3603

| $k$ | $X_4$ | $v_4$ |
|     | $X_3$ | $v_2$ |
|     | $X_2$ | $v_2$ |
|     | $X_0$ | $v_1$ |     3604

FIG. 36

| $k$ | $X_4$ | $v_4$ |
|---|---|---|
| | $X_3$ | placeholder |
| | $X_2$ | $v_2$ |
| | $X_0$ | $v_1$ |

```
1  BEGIN TRANSACTION $X_0$
2      INSERT($k, val_0$);
3      BEGIN TRANSACTION $X_1$
4          INSERT($k, val_1$);
5      COMMIT $X_1$;
6      BEGIN TRANSACTION $X_2$
7          INSERT($k, v_2$);
8          BEGIN TRANSACTION $X_3$
9              INSERT($j, v_j$);
10             QUERY $k$;
11             BEGIN TRANSACTION $X_4$
12                 INSERT($k, v_4$);
13             COMMIT $X_4$
14         COMMIT $X_3$
15         QUERY $k$;
16     COMMIT $X_2$
17 COMMIT $X_0$
18 QUERY $k$;
```

FIG. 38

Message or Query                           Leaf entry after processing

| insert | $k$ | $X_0$ | $v_0$ |     3501

| $k$ | $X_0$ | $v_0$ |     3901

| insert | $k$ | $X_1, X_0$ | $v_1$ |     3502

| $k$ | $X_1$ | $v_1$ |
|     | $X_0$ | $v_0$ |     3902

| insert | $k$ | $X_2, X_0$ | $v_2$ |     3503

| $k$ | $X_2$ | $v_2$ |
|     | $X_0$ | $v_1$ |     3903

| insert | $k$ | $X_3, X_2, X_0$ | query |     3910

| $k$ | $X_2$ | $v_2$ |
|     | $X_0$ | $v_1$ |     3904

| insert | $k$ | $X_4, X_3, X_2, X_0$ | $v_4$ |     3504

| $k$ | $X_4$ | $v_4$ |
|     | $X_3$ | $v_2$ |
|     | $X_2$ | $v_2$ |
|     | $X_0$ | $v_1$ |     3905

| insert | $k$ | $X_2, X_0$ | query |     3911

| $k$ | $X_2$ | $v_4$ |
|     | $X_0$ | $v_1$ |     3906

| insert | $k$ | root | query |     3912

| $k$ | root | $v_4$ |     3907

```
1  BEGIN TRANSACTION $X_0$
2      INSERT$(k, val_0)$;
3      BEGIN TRANSACTION $X_1$
4          INSERT$(k, val_1)$;
5      COMMIT $X_1$;
6      BEGIN TRANSACTION $X_2$
7          INSERT$(k, v_2)$;
8          BEGIN TRANSACTION $X_3$
9              INSERT$(j, v_j)$;
10             DELETE $k$;
11             BEGIN TRANSACTION $X_4$
12                 DELETE $k$;
13                 INSERT$(k, v_4)$;
14             COMMIT $X_4$
15         COMMIT $X_3$
16     COMMIT $X_2$
17 DELETE $k$;
18 COMMIT $X_0$
```

FIG. 40

Message or Query

| insert | $k$ | $X_0$ | $v_0$ | 3501

| insert | $k$ | $X_1, X_0$ | $v_1$ | 3502

| insert | $k$ | $X_2, X_0$ | $v_2$ | 3503

| insert | $k$ | $X_3, X_2, X_0$ | delete | 4110

| insert | $k$ | $X_4, X_3, X_2, X_0$ | delete | 4111

| insert | $k$ | $X_4, X_3, X_2, X_0$ | $v_4$ | 3504

| insert | $k$ | $X_0$ | delete | 4112

Leaf entry after processing

| $k$ | $X_0$ | $v_0$ |  4101

| $k$ | $X_1$ | $v_1$ |  4102
|     | $X_0$ | $v_0$ |

| $k$ | $X_2$ | $v_2$ |  4103
|     | $X_0$ | $v_1$ |

| $k$ | $X_3$ | delete |  4104
|     | $X_2$ | $v_2$ |
|     | $X_0$ | $v_1$ |

| $k$ | $X_3$ | delete |  4106
|     | $X_2$ | $v_2$ |
|     | $X_0$ | $v_1$ |

| $k$ | $X_4$ | $v_4$ |  4105
|     | $X_3$ | placeholder |
|     | $X_2$ | $v_2$ |
|     | $X_0$ | $v_1$ | null

```
1  BEGIN TRANSACTION $X_0$
2      INSERT$(k, val_0)$;
3      BEGIN TRANSACTION $X_1$
4          INSERT$(k, val_1)$;
5      COMMIT $X_1$;
6      BEGIN TRANSACTION $X_2$
7          INSERT$(k, v_2)$;
8          BEGIN TRANSACTION $X_3$
9              INSERT$(j, v_j)$;
10             BEGIN TRANSACTION $X_4$
11                 INSERT$(k, v_4)$;
12             ABORT $X_4$
13         COMMIT $X_3$
14     COMMIT $X_2$
15 COMMIT $X_0$
```

FIG. 42

Message or Query

| insert | $k$ | $X_0$ | $v_0$ | 3501 |

| insert | $k$ | $X_1, X_0$ | $v_1$ | 3502 |

| insert | $k$ | $X_2, X_0$ | $v_2$ | 3503 |

| insert | $k$ | $X_4, X_3, X_2, X_0$ | $v_4$ | 3504 |

| insert | $k$ | $X_4, X_3, X_2, X_0$ | abort | 4310 |

Leaf entry after processing

| $k$ | $X_0$ | $v_0$ | 4301 |

| $k$ | $X_1$ | $v_1$ | 4302 |
|     | $X_0$ | $v_0$ |      |

| $k$ | $X_2$ | $v_2$ | 4303 |
|     | $X_0$ | $v_1$ |      |

| $k$ | $X_4$ | $v_4$         | 4305 |
|     | $X_3$ | placeholder   |      |
|     | $X_2$ | $v_2$         |      |
|     | $X_0$ | $v_1$         |      |

| $k$ | $X_2$ | $v_2$ | 4302 |
|     | $X_0$ | $v_0$ |      |

FIG. 43

Buffer Pool 4601

```
n_in_table 4602
table 4603
table_size 4604
lurlist 4605
cachefile_list 4606
size 4607
size_limit 4608
mutex 4609
workqueue 4610
checkpointing 4611
```

FIG. 46 checkpoint_begin 4701
| |
|---|
| LSN 4722 |
| entrytype 4723 |
| timestamp 4724 | checkpoint_end 4702
| |
|---|
| LSN 4722 |
| entrytype 4723 |
| timestamp 4724 |
| lsn_of_begin 4725 | fassociate 4703
| |
|---|
| LSN 4722 |
| entrytype 4723 |
| filenum 4726 |
| flags 4727 |
| filename 4729 | txnisopen 4704
| |
|---|
| LSN 4722 |
| entrytype 4723 |
| transaction_id 2812 |
| parenttxn 4728 | committxn 4705
| |
|---|
| LSN 4722 |
| entrytype 4723 |
| filenum 4726 |
| transaction_id 2812 | aborttxn 4706
| |
|---|
| LSN 4722 |
| entrytype 4723 |
| transaction_id 2812 | begintxn 4707
| |
|---|
| LSN 4722 |
| entrytype 4723 |
| parenttxn 4728 |

FIG. 47 fdelete 4708

| LSN 4722 |
| --- |
| entrytype 4723 |
| transaction_id 2812 |
| filename 4729 | fcreate 4709

| LSN 4722 |
| --- |
| entrytype 4723 |
| flags 4727 |
| filename 4729 |
| iname 4730 |
| mode 4736 |
| descriptor_version 4737 |
| descriptor 4738 | fopen 4710

| LSN 4722 |
| --- |
| entrytype 4723 |
| filenum 4726 |
| flags 4727 |
| filename 4729 | fclose 4711

| LSN 4722 |
| --- |
| entrytype 4723 |
| filenum 4726 |
| flags 4727 |
| filename 4729 | emptytablelock 4712

| LSN 4722 |
| --- |
| entrytype 4723 |
| transaction_id 2812 |
| filenum 4726 |

FIG. 48 pushinsert 4713

| LSN 4722 |
| --- |
| entrytype 4723 |
| filenum 4726 |
| transaction_id 2812 |
| key 2810 |
| value 2811 | pushinsertnooverwrite 4714

| LSN 4722 |
| --- |
| entrytype 4723 |
| filenum 4726 |
| transaction_id 2812 |
| key 2810 |
| value 2811 | pushdeleteboth 4715

| LSN 4722 |
| --- |
| entrytype 4723 |
| filenum 4726 |
| transaction_id 2812 |
| key 2810 |
| value 2811 | pushdeleteany 4716

| LSN 4722 |
| --- |
| entrytype 4723 |
| filenum 4726 |
| transaction_id 2812 |
| key 2810 |

FIG. 49 pushinsertmultiple 4717
| |
|---|
| LSN 4722 |
| entrytype 4723 |
| filenum 4726 |
| transaction_id 2812 |
| key 2810 |
| value 2811 |
| filenums 4731 | pushdeletemultiple 4718
| |
|---|
| LSN 4722 |
| entrytype 4723 |
| filenum 4726 |
| transaction_id 2812 |
| key 2810 |
| value 2811 |
| filenums 4731 | comment 4719
| |
|---|
| LSN 4722 |
| entrytype 4723 |
| timestamp 4724 |
| comment 4732 | load 4720
| |
|---|
| LSN (4722) |
| entrytype 4723 |
| timestamp 4724 |
| filenum 4726 |
| transaction_id 2812 |
| oldfname 4733 |
| newfname 4734 |

FIG. 50

```
txndict 4721
┌─────────────────────┐
│ LSN 4722            │
│ entrytype 4723      │
│ filenum 4726        │
│ transaction_id 2812 │
│ blocknum 404        │
└─────────────────────┘
```

FIG. 51

Disk A 5503

Disk A 5507

Disk B 5504

Disk B 5508

Disk C 5505

Disk C 5509

Disk D 5506

Disk D 5510

5501

5502

HIGH-PERFORMANCE STREAMING DICTIONARY

1 BACKGROUND

This invention relates to the storage of information on computer-readable media such as disk drives, solid-state disk drives, and other data storage systems.

An example of a system storing information comprises a computer attached to a hard disk drive. The computer stores data on the hard disk drive. The data is organized as tables, each table comprising a sequence of records. For example, a payroll system might have a table of employees. Each record corresponds to a single employee and includes, for example, 1. First name (a character string),
2. Last name (a character string),
3. Social Security Number (a nine-digit integer),
4. A birth date (a date), and
5. An annual salary, in cents (a number).

The system might maintain another table listing all of the payments that have been made to each employee. This table might include, for example, 1. Social Security Number,
2. Payroll date (a date), and
3. Gross pay (a number).

The employee table might be maintained in sorted order according to social security number. By keeping the data sorted, the system may be able to find an employee quickly. For example, the data were not sorted then the system might have to search through every record to find an employee. If the data is kept sorted, on the other hand, then the system could find an employee by using a divide-and-conquer approach, in the same way that one can look up a phone number in a hardcopy phone book by dividing the book in two, and determining whether your party is in the first half or the second half, and then repeating this divide-and-conquer approach on the selected half.

The problem of efficiently maintaining sorted data can become more difficult when disk drives or other real data storage systems are used. Storage systems often have interesting performance properties. For example, having read a record from disk, it is typically much cheaper to read the next record than it is to read a record at the other end of the table. Many storage systems exhibit "locality" in which accessing a set of data that is stored near each other is cheaper than accessing data that distributed far and wide.

This invention can be used to maintain data, including but not limited to these sorted tables, as well as other uses where data needs to be organized in a computer system.

2 SUMMARY

This invention can be used to implement dictionaries. Many databases or file systems employ a dictionary mapping keys to values. A dictionary is a collection of keys, and sometimes includes values.

In some systems, when data is stored in a disk storage system, the data is stored in a dictionary data structure stored on the disk storage system, and data is fetched from the disk storage system by accessing the a dictionary.

In some systems, there is a computer-readable medium having computer-readable code thereon, where the code encodes instructions for storing data in a disk storage system. The computer readable medium includes instructions for defining a dictionary data structure stored on the disk storage system.

In some systems, a computerized device is configured to process operations disclosed herein. In such a system the computerized device comprises a processor, a main memory, and a disk. The memory system is encoded with a process that provides a high-performance streaming dictionary that when performed (e.g. when executing) on the processor, operates within the computerized device to perform operations explained herein.

Other systems that are disclosed herein include software programs to perform the operations summarized above and disclosed in detail below. More particularly, a computer program product can implement such a system. The computer program logic, when executed on at least one processor in a computing system, causes the processor to perform the operations indicated herein. Such arrangements of logic can be provided as software, code and/or other data structures arranged or encoded on a computer readable medium, or combinations thereof, including but not limited to an optical medium (for example, CD-ROM), floppy or hard disk (for example, rotating magnetic media, solid state drive, etc.) or other media including but not limited to firmware or microcode in one or more ROM or RAM or PROM chips or as an Application Specific Integrated Circuit (ASIC), networked memory servers, or as downloadable software images in one or more modules, shared libraries, etc. The software or firmware or other such configurations can be installed onto a computerized device to cause one or more processors in the computerized device to perform the techniques explained herein. Software processes that operate in a collection of computerized devices, including but not limited to in a group of data communications devices or other entities can also provide the system described here. The system can be distributed between many software processes on several data communications devices, or all processes could run on a small set of dedicated computers, or on one computer alone.

The system can be implemented as a data storage system, or as a software program, or as circuitry, or a some combination, including but not limited to a data storage device. The system may be employed in data storage devices and/or software systems for such devices.

The memory system of a computer typically comprises one or more storage devices. Often the devices are organized into levels in a storage hierarchy. Examples of devices include registers, first-level cache, second-level cache, main memory, a hard drive, the cache inside a hard drive, tape drives, and network-attached storage. As technology develops other devices may be developed. Additional examples of storage devices will be apparent to one of ordinary skill in the art. In this patent, we often describe the system as though it consists of only two levels in a hierarchy, and discuss how to optimize the number of transfers between one level and another. But the same analysis applies whether considering transfers from cache to main memory, or transfers from main memory to disk, or transfers between main memory and a hard drive, or transfers between any two storage devices, even if they are not organized into levels in a hierarchy. And a memory hierarchy can comprise many different levels. For convenience of description we will often refer to one device as RAM, in-RAM, in-memory, internal memory, main memory, or fast memory, whereas we will refer to a second level as disk, out of memory, on disk, or slow memory. It will be apparent to one of ordinary skill in the art that a dictionary can be implemented to use combinations of storage devices, such pairs including cache versus main memory, different parts of cache, main memory versus disk cache, disk cache versus disk, disk versus network attached storage, registers versus cache, etc. Furthermore, a dictionary can be implemented using more than two storage devices, for example using all of the storage devices mentioned above. Instead of analyzing the number transfers between two devices which are adjacent in a storage hierarchy, one could analyze the transfers between non-adjacent levels of memory, or between any two devices of a memory system. Furthermore, there could be multiple instances of each level, that is, there might be multiple caches, for example one or more for each processor or there may be multiple disks.

3 BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 11 depicts the structure of an order-maintenance tree (OMT).

FIG. 19 depicts how the system looks up a value in an OMT.

FIG. 20 depicts how the system looks up an index in an OMT.

FIG. 21 depicts how the system inserts into an OMT in an unbalanced fashion.

FIG. 22 depicts various types of leaf entries.

FIG. 23 depicts how the system computes checksum.

FIG. 24 depicts the inner loop of the checksum calculation using 64-bit operations.

FIG. 25 depicts How the system computes a checksum in parallel, expressed in Cilk++.

FIG. 29 depicts a message encoding example.

FIG. 31 depicts a block translation pair.

FIG. 32 depicts a segment allocator.

FIG. 33 depicts a statistics structure for nonleaf nodes.

FIG. 34 depicts an example of insertion with nested transactions.

FIG. 35 depicts the messages sent in an example of insertion with nested transaction.

FIG. 36 depicts the processing of messages for an example of insertion with nested transactions.

FIG. 37 depicts a leaf entry employing a placeholder.

FIG. 38 depicts an example with insertions and queries in nested transactions.

FIG. 39 depicts the processing of messages and queries.

FIG. 40 depicts an example with insertions and deletions.

FIG. 41 depicts the processing of messages for insertions and deletions.

FIG. 42 depicts an example with insertions and aborts.

FIG. 43 depicts the processing of insertions and aborts.

FIG. 46 depicts a buffer pool.

FIG. 47 depicts the format of some log entry types.

FIG. 48 depicts the format of some additional log entry types.

FIG. 49 depicts the format of more additional log entry types.

FIG. 50 depicts the format of even more additional log entry types.

FIG. 51 depicts the format of yet more additional log entry types.

4 DETAILED DESCRIPTION

Figure 1:
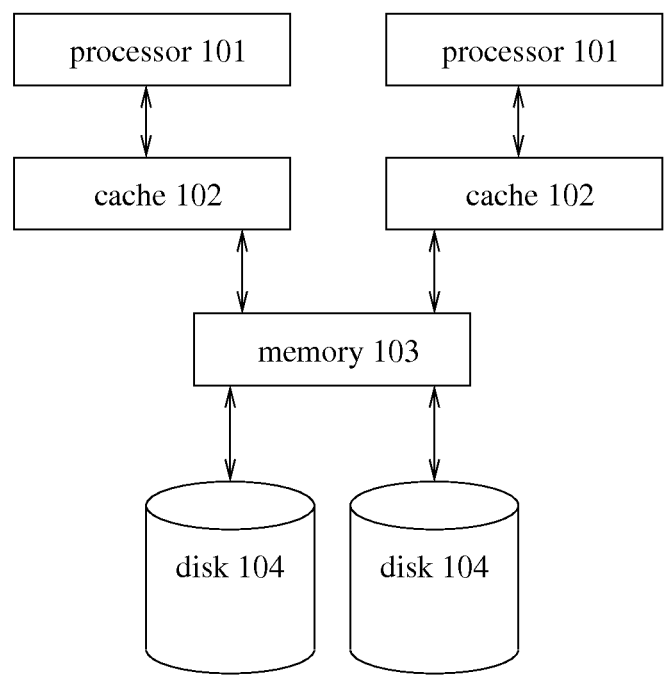
FIG. 1 depicts a configuration of processing and storage/memory elements in a computer system.

The invention may be practiced in a computer system that operates on data stored in a computer. Typically a computer system, as illustrated in FIG. 1, comprises one or more processor chips (101), each of which may have one or more CPU cores. The processors are connected to a cache 170 (102), a main memory (103) sometimes called RAM, and to a secondary memory, which is often implemented as one or more hard disk drives (104). The disk drives may be implemented as rotating disks, and may have a processor and a cache in the disk drive. The cache in the disk drive may include nonvolatile storage (e.g., with battery backup) so that if the power fails, recent writes will not be lost. The disk drives may also be implemented as solid state storage. The system 175 may also have other storage including but not limited to magnetic tape or optical laser disks. The disk drives may be connected to the processors directly, or through a network. Depending on the configuration, different protocols are used to communicate between the processors and the disks. Some systems use SCSI or SATA, and others use higher level protocols including but not limited to NFS (the Sun Network File System), and some systems use still other protocols. Several distinct computers may work together over a network. Collectively, the disks, RAM, cache, and other data storage is referred to as a storage hierarchy. A program is provided to the processors, to direct the processors to perform the operations described below. The program may be stored at one more levels of the storage hierarchy. For example, copies of the program may be stored on disk, on a DVD, and in RAM.

A system is said to cache a value if it stores the value in a faster part of the memory hierarchy rather than in a slower part of the memory hierarchy (or rather than precomputing the value). For example, the system may cache blocks in the cache (102) from RAM (103). It may cache values in RAM (103) that might otherwise require accessing disk (104). Or if a value is expensive to compute, it may cache a copy of that value, to avoid precomputing the value in the future.

Figure 2:
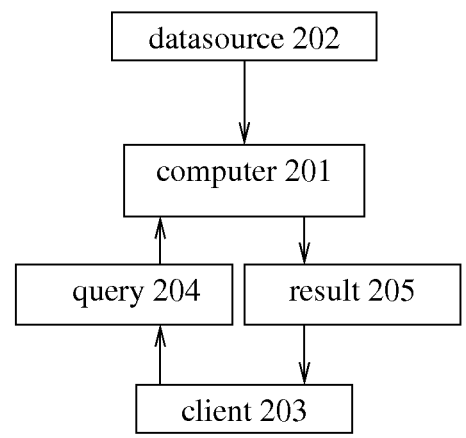
FIG. 2 depicts a computer transforming data and queries into results.

In a typical mode of operation, the system operates as shown in FIG. 2. A computer (201) receives data from a data source (202), and stores that data in its storage hierarchy. One or more clients (203) form queries (204) (which may include commands to insert, modify, or delete data), which are input into the computer (201). The computer (201) operates on the data stored in its storage hierarchy. Such operation may include sorting, indexing, scanning, and otherwise reading 195 and writing the data in the hierarchy. The computer produces a result (205) which is returned to the client.

In one mode of operation, the system organizes data in a tree structure. A tree comprises nodes. A node comprises a sequence of children. If a node has no children, then it is called a leaf node. If the node has children, it is called a nonleaf node or internal node. There is one root node that has no parent. All other nodes have exactly one parent. The tree nodes can have different on-disk and in-RAM representations. When a tree node is read from disk and brought into internal RAM, the node is first converted from the on-disk data format to the in-RAM data format, if different. When a tree node is evicted from RAM and written back to disk, it is converted from the in-RAM data format back to the on-disk data format, if different.

Figure 3:
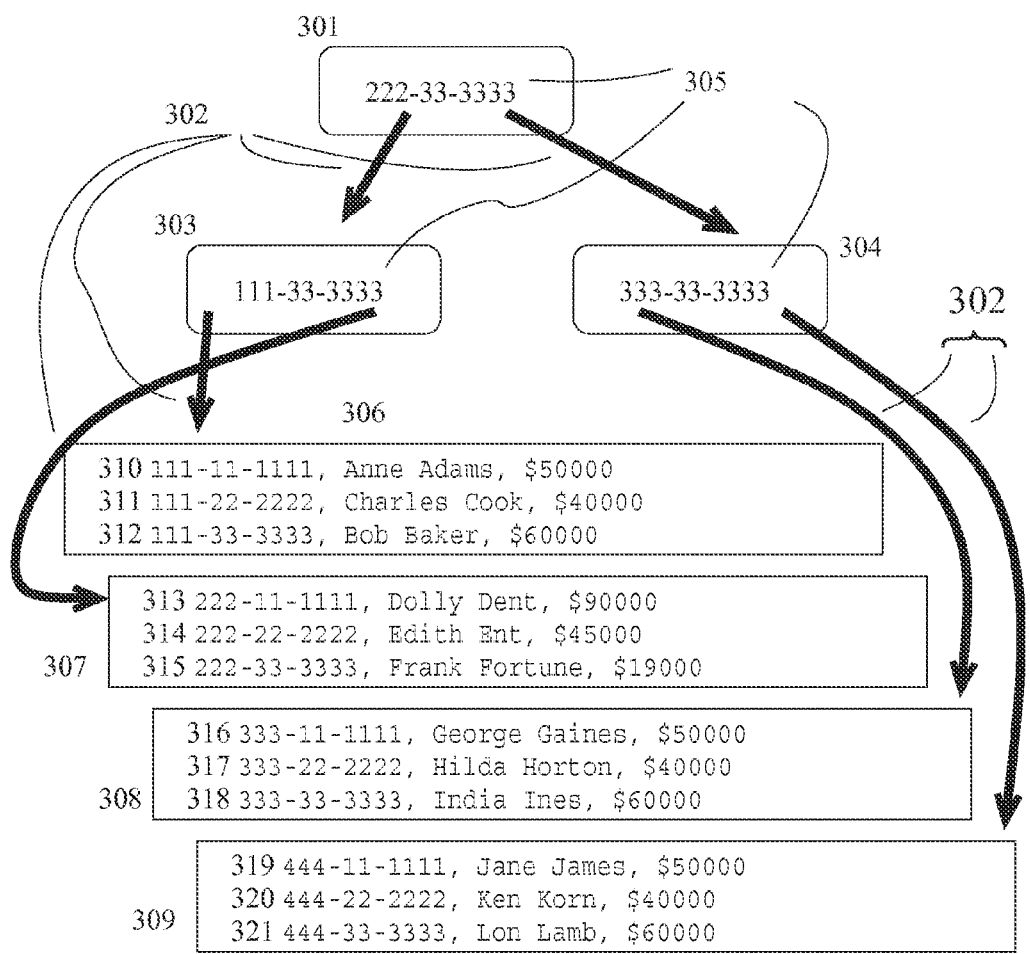
FIG. 3 depicts data stored in a tree-structured dictionary.

FIG. 3 shows an example tree containing employee records. The tree comprises a root node (301), which comprises two pointers (302), one to a left child (303) and one to a right child (304), and a pivot key (305). The pivot key of the root node (301) is the social security number 222-33-3333 indicating that all the social security numbers in the subtree rooted at the left child (303) are at or before 222-33-3333, and all the social security numbers in the subtree rooted at the right child 210 (304) are at or after 222-33-3333. Similarly the left child (303) comprises two pointers (one to leaf node (LeafA (306)), and one to leaf node (LeafB (307))) and a pivot key (305), and the right child (304) comprises two pointers and a pivot key.

Each leaf node (306, 307, 308, and 309 respectively) includes three employee records, each with a social security number, a name, and a salary. The leaf nodes collectively contain the employee records (310, 311, 312, 313, 314, 315, 316, 317, 318, 319, 320, and 321).

To find a given employee, such as the one with social security number 333-22-2222, the system examines the root node (301) and determines that the pivot key (305) stored therein is less than the employee's, so the system examines the right child (304), where it discovers that the pivot key stored therein is greater than the employee's, so the system examines the left leaf node (308) of the right child (304) where it can find the complete record of the employee.

When the system needs to examine a node, including the root node (301), the system may be storing the node on disk (104) or in memory (103). If the node is not in memory (103), then the system moves a copy of the node from disk (104) to memory (103), changing the node's representation if appropriate. If memory (103) becomes full, the system may write nodes back 225 from memory (103) to disk (104). If the in-memory node has not been changed since it was read, the system may simply delete the node from memory (103) if there is a still a copy on disk (104).

There are variations on this memory hierarchy. For example, the data can be moved between any two or more different types of computer-readable media. Another example is that the system may sometimes store data to disk in the in-RAM format, and sometimes store data in the on-disk 230 format.

Alternatively, organizing data with different representations can be employed for other structures besides trees. For example, if the dictionary is a cache-oblivious look-ahead array or a cascading array, then different in-RAM and on-disk representations could be employed for different subarrays.

In the example of FIG. 3 every nonleaf node has two children. The system organizes trees with a varying number of children, with some nodes having fewer and some having more than two children. For example, nodes might have hundreds or thousands or even more children.

In a tree, the height of a leaf node is 0. The height of a nonleaf node is one plus the maximum height of its children nodes. The depth of the root node is 0. The depth of a nonroot node is one plus the depth of its parent.

The system employs trees of uniform depth. That is, all of the leaves are the same depth. Alternatively, the tree could be of nonuniform depth, or that system could employ another structure. For example a system could employ a structure in which some nodes have two or more parents, or in which a tree has multiple roots, or a structure which contains cycles.

The subtree of a tree rooted at node n comprises n and the subtrees rooted at the children of n. This implies the subtree rooted at a leaf node is the node itself. A tree or subtree can contain only one node, or it can contain many nodes.

Whenever a new key-value pair $\langle k,v \rangle$ is inserted into the dictionary, it logically replaces any previous pair $\langle k,v' \rangle$ that exists.

For dictionaries that allow duplicate keys other rules apply. For example, all the different key-value pairs may be kept, even though some have the same key. In such a dictionary, pairs might be stored logically in sorted order. That is, record (k,v) is logically before record (k', v') if and only if k<k' or (k=k' and v<v'), where the comparisons are made with the appropriate comparison functions.

The system supports dictionaries with no duplicate keys (NODUP) as well as dictionaries with duplicate keys (DUP) which break ties by comparing values. in a DUP dictionary, inserting a duplicate key with a duplicate value typically has no effect.

A key is represented as a byte string. The user of the dictionary may supply comparison functions for keys. If no comparison function is supplied by the user, then a default comparison 260 function is used, in which keys are ordered lexicographically as byte strings.

Similarly values are represented as byte strings, and the user may supply a comparison function for values.

A tree-structured data structure is organized as a search tree when nonleaf nodes of the tree comprise pivot keys (which may be keys or key-value pairs or they may be substrings of keys or key-value pairs). If the tree has n children, then for $0 \le i < n-1$, the subtree rooted at child i contains pairs that are less than or equal to pivot key i, and for $1 \le i < n$, the subtree rooted at child i contains pairs that are greater than pivot key i−1. We say that a pair p belongs to child i if
1. i=0 and p is less than or equal to pivot key 0, or
2. i=n−1 and p is greater than pivot key n−1, or 3. $0<i<n-1$ and p is less than or equal to pivot key i and greater than pivot key i−1.

The system includes a front-end module that receives commands from a user and converts them to operations on a dictionary. For example, the front-end a SQL database receives SQL commands which are then executed as a sequence of dictionary operations.

Dictionaries

The system implements a dictionary in which keys can be compared. That is, given two keys, they are either considered to be the same, or one is considered to be ordered ahead of the other. For example, if a dictionary uses integers as keys, then the number 1 is ordered ahead of the number 2. In some dictionaries the keys are not ordered.

Another example is that a character string can be used as a key. A character string is a sequence of characters. For example the string "abc" denotes the string s where the first character 'a', the second character is 'b', and the third character is 'c'. We denote the first character as $s_0$ the second character as $S_1$, and so forth. Thus, in this example, indexing of strings starts at 0. Strings can be ordered using a lexicographic ordering. Typically, in a lexicographically ordered system, two strings s and r are considered to be the same if they are the same length (that is $|s|=|r|$) and the ith character is the same for all relevant values of i (that is $s_i=r_i$ for all $0 \le i < |s|$). If there is some index i such that $s_i \ne r_i$ then let j be the minimum such index. String s is considered to be ahead of string r if and only if $s_j$ is before $r_j$. If there is no such i, then the remaining case is that one of the strings is a prefix of the other, and the shorter string is considered to be ahead of the longer one.

Another example is when one has a collection of vectors, all the same length, where corresponding vector elements can be compared. One way to compare vectors is that two vectors are considered the same if their respective components are the same. Otherwise, the first differing component determines which vector is ahead of the other. In some systems, the vectors may be of different lengths, or corresponding elements may not be comparable.

Alternatively, there exist many other ways of constructing keys. Examples include comparing the last element of a sequence first, or ordering the keys in the reverse of their natural order (including but not limited to ordering the integers so that the descend rather than ascend).

A dictionary can be conceived as containing key-value pairs. A key-value pair comprises a key and a value.

One way to use dictionaries is for all the keys to be unique. Another way to use dictionaries allows keys to be duplicated for different entries. For example, some dictionaries might allow duplicate keys in which case ties are broken using some other technique including but not limited to based on which pair was inserted earlier or based on the contents of the values.

The same data can be stored in many different dictionaries. For some of these dictionaries, the role of the values comprising the key and value may be changed. For example, a key in one dictionary may be used as the value in another dictionary. Or the key may comprise the key of another dictionary concatenated or otherwise combined with parts of a value. Each dictionary may have an associated total ordering on the keys. Different dictionaries may contain the same key-value pairs, but with a different ordering function. For example, a system might employ two dictionaries, one of which is the reverse of the other. An example would be a dictionary containing names of people as keys. A system might maintain one dictionary in which the names are sorted by last name, and another in which the names are sorted by first name.

Given a key, a search operation can determine if a key is stored in a dictionary, and return the key's associated value if there is one. Given a key, finding the corresponding key-value pair if it exists or reporting the nonexistence if it does not exist is called looking up the key. It is also referred to as a search or a get. In some situations, a look up, search, or get may perform different operations (including but not limited to not returning the associated value, or performing additional operations). Given a key k, the system can find the successor of k in the dictionary (if there is one), which is the smallest key greater than k in the dictionary. The system can also find the predecessor (if there is one). Another common dictionary operation is to perform a range scan on the dictionary: Given two keys k, and k', find all the key-value pairs ⟨ k", v ⟩, such that $k \le k" \le k'$. One way to perform a range scan is to first find the successor k" of k, and then find the successor of k", and then find successor of that key, and so forth, until a key larger than k' is found. Another way to perform a range scan is to find the predecessor of k', and then use subsequent predecessor operations to find the pairs in reverse order. Alternatively, there are other implementations of range scans, including but not limited to using a cursor.

Typically a system performs a range scan in order to perform an operation on each pair as it is found. An example operation is to sum up all the values when the values are numbers. Other examples are to make a list of all the pairs or keys or values; or to make a list of the first element of every value (for example, if the values are sequences); or to count the number of pairs. Many other operations can be performed on the pairs of a range query. Some range scan operations can be more efficient if the values are produced in a particular order (for example, smallest to largest, or largest to smallest). For example, joining two dictionaries in a relational database can be more efficient if the dictionaries are traversed in a particular order. Other range scan operations may be equally efficient in any order. For example, to count the number of pairs in a range, the values can be found in any order.

There are several ways that dictionaries can deal with the possibility of duplicate keys, that is key-value pairs with the same key.

For example, some dictionaries forbid duplicate keys. One way to forbid duplicate keys is to ensure that whenever a key-value pair ⟨ k, v ⟩ is inserted into the dictionary, it overwrites any previous value v' associated with key k. Alternatively, there are other ways to prevent duplicate keys. For example, the dictionary could be left unchanged when a duplicate is inserted. Another example is to generate error when a duplicate is inserted.

Another way to handle duplicate keys is to extend the comparison keys to allow comparisons on key-value pairs. In this approach, duplicate keys are allowed as long as any two records with the same key have different values, in which case a value comparison function is provided by the system to induce a total order on the values. Key-value pairs are stored in sorted order based on the key comparison function, and for duplicate keys, based on the value comparison function. This kind of duplication can be employed, for example, to build an index in a relational database.

Alternatively, there are other ways to accommodate duplicate keys in a dictionary. For example, a system might "break ties" by considering pairs that were inserted earlier to be ordered earlier than pairs that were inserted later. Such a system could even accommodate "duplicate duplicates", in which both the key and the value are equal. Alternatively, when storing pairs with duplicate keys, the key might be stored only once, which could save space, and for duplicate duplicates that the value could be stored only once which could save space.

Alternatively, other space-saving techniques can be employed. For example when keys and values are strings, often two adjacent keys share a common prefix. In this case, the system could save space by storing the common prefix only once.

The system employs tree structure to implement dictionaries. As the system traverses the tree from left to right, it encounters key-value pairs in sorted order.

Leaf Node in Memory

Figure 4:
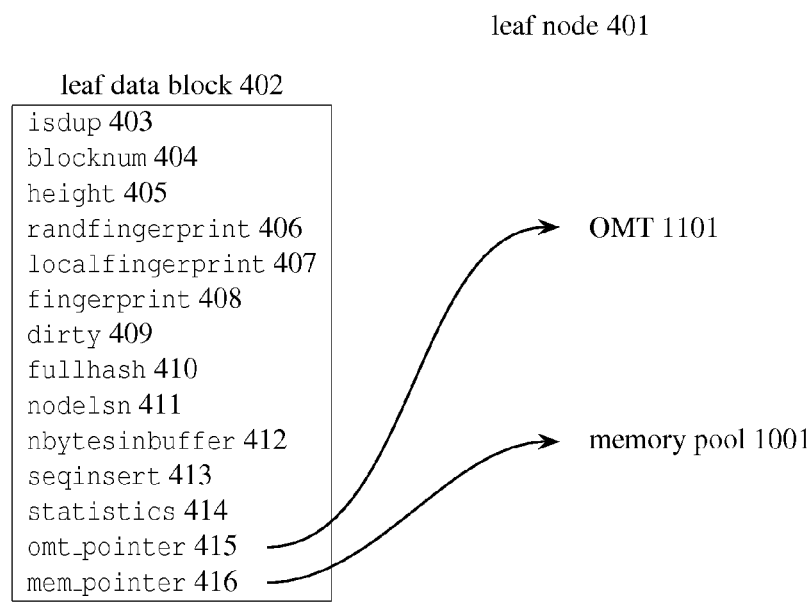
FIG. 4 depicts the structure of a leaf node in RAM.

FIG. 4 shows a leaf node (401) in RAM. The node is a structure comprising a leaf data block (402), an order maintenance tree (OMT) (1101), and a memory pool (1001). The leaf data block (402) is a structure comprising
1. isdup (403), a Boolean that indicates whether the leaf node is part of a DUP or a NODUP 365 tree;
2. blocknum (404), a 64-bit number that indicates which block number is used to store the data on disk;
3. height (405), a 16-bit number that indicates the height of the node (which is 0 for leaf nodes);
4. randfingerprint (406), a 32-bit number employed for calculating fingerprints;
5. localfingerprint (407), a 32-bit number that provides a fingerprint of the values stored in the leaf;
6. fingerprint (408), a 32-bit number that contains the fingerprint of the node;
7. dirty (409), a Boolean that indicates that the in-RAM node represents different data than does the on-disk node (that is, that the node has been modified in RAM);
8. fullhash (410), a 32-bit number that is a hash value used to find the leaf node in a Buffer Pool (4601);
9. nodelsn (411), a 64-bit number that equals the log sequence number (LSN) associated with the most recent change to the node;
10. nbytesinbuffer (412), a 32-bit number that indicates how many bytes of leaf entries are stored in the leaf node including overheads such as length;
11. seqinsert (413), a 32-bit number that indicates how many insertions have been performed with sequentially increasing keys,
12. statistics (414), a structure that maintains statistical information;
13. omt_pointer (415), a pointer to an OMT (1101); and
14. mem_pointer (416), a pointer to a memory pool (1001).

The system calculates the fingerprint (408) of a leaf node by taking the sum, over the leaf entries in the node, of the fingerprints of the leaf entries. The fingerprint of a leaf entry in a node is taken by computing a checksum, for example as shown in FIG. 23, of the leaf entry, and multiplying that checksum by the randfingerprint (406) of the node.

The system establishes the fingerprint seed randfingerprint (406) when a node is created by choosing a random number (e.g., with the random( ) C library function, which in turn can be seeded e.g., with the date and time.)

The fullhash (410) is a hash of the blocknum (404) and a dictionary identifier. The system 395 employs fullhash (410) to look up blocks in the buffer pool.

The system keeps track of how many insertions have been performed on sequentially increasing keys using the seqinsert (413) counter. The system increments the counter whenever a pair is inserted at the rightmost position of a node. Every time a pair is inserted elsewhere, the counter is decremented with a lower limit of zero. When a leaf node splits, if the seqinsert (413) counter 400 is larger than one fourth of the inserted keys, the system splits the node unevenly.

Alternatively, other methods for maintaining and using such a counter can be employed. For example, the system could split unevenly if the counter is greater than a constant such as four. For another example, the system could remember the identity of the most recently inserted pair, and increment the counter whenever a new insertion is adjacent to the previous insertion. In that case the system when choosing a point to split a node, if the counter is large the system can split the node at the most recently inserted pair.

Alternatively the particular sizes of the numbers chosen can be chosen differently. For example, the nbytesinbuffer (412) field could be made larger so that more than $2^{32}$ bytes could be stored in a leaf block. Similar size changes could be made throughout the system. In the following description, we use the word "number" to indicate a number with an appropriate number of bits to represent the range of numbers required.

The system sets the dirty (409) Boolean to TRUE whenever the system modifies a node. When the system writes a node to node, it sets the dirty (409) Boolean to FALSE.

To insert a key-value pair into a leaf node (401), the system first allocates space in the node's 415 memory pool (1001) (which may invoke the memory pool's mechanism for creating a new internal buffer and copying all the values to that space), and copies the value into the newly allocated space. Then the memory-pool pointer to that value is stored in the OMT (1101).

Memory Pool

Figure 10:
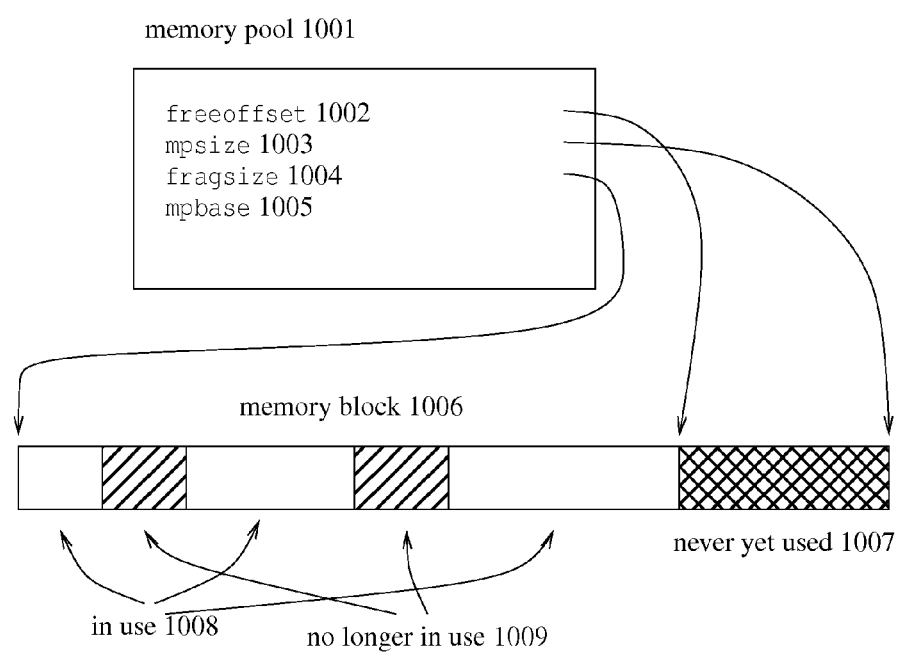
FIG. 10 depicts the structure of a memory pool.

FIG. 10 shows a memory pool (1001). A memory pool (1001) is a structure comprising
1. mpbase (1005), a memory pointer to a memory block (1006);
2. mpsize (1003), a number which indicates the length of the memory block;
3. freeoffset (1002), a number which indicates the beginning of the unused part of memory block. All bytes in the memory block beyond the freeoffset (1002) are not in use. In FIG. 10, the free space is shown inside the memory block as a crosshatched region marked "never yet unused" (1007); and
4. fragsize (1004), a number indicating how many allocated bytes of the memory block are no longer in use. In FIG. 10 the hatched regions (1009) are no longer in use. The fragsize (1004) is the sum of the sizes of the blocks no longer in use. The blocks that are still in use (1008) are also shown.

To allocate n bytes of memory in a memory pool, the system increments freeoffset (1002) by n. If the freeoffset (1002) is not larger than mpsize (1003), then the memory has been allocated. Otherwise a new block of memory is allocated (using for example the system's standard library malloc( ) function) of size 2·(freeoffset−fragsize), and all useful data is copied from the old memory block to the beginning of the new memory block. The useful data can be identified as pointer values stored in the OMT (1101). The mpbase (1005) is set to point at the new memory block, and the old memory block is freed. The mpsize (1003) is set to the new size, the freeoffset (1002) is set to (freeoffset−fragsize), and the fragsize (1004) is set to 0.

To free a subblock of size n of memory in a memory pool, the system increments the fragsize (1004) by n.

Order Maintenance Tree

An order-maintenance tree (OMT) is an in-memory dictionary. An OMT has two representations: a sorted array, and a weight-balanced tree. An OMT can insert and look up a particular key-value pair by using the comparison function on pairs.

An OMT can also look up the ith key-value pair, knowing only i (similarly to an array access). For example, an OMT can look up the third value in the sorted sequence of all the values. Also an OMT can insert a pair after the ith pair.

FIG. 11 shows an OMT. An OMT is a structure comprising
1. is_array (1102), a Boolean indicating whether the OMT uses the array or tree representation;
2. omt_cursors (1103), a linked list of OMT cursors;
3. omt_array (1104), a pointer pointing to the array (in the case that is_array (1102) is TRUE); and
4. omt_tree (1105), a pointer pointing to the tree (in the case that is_array (1102) is FALSE).

Since omt_array (1104) and omt_tree (1105) are never both valid at the same time, the same memory can be used to hold both points using, for example, a C-language union.

In the array representation, an OMT's omt_array (1104) pointer points at a sorted array of key-value pairs. To look up a key, perform a binary search on the array. To look up the ith value, index the array using i. To insert or delete a value, first convert the OMT into the tree representation, and then insert it.

Figure 18:
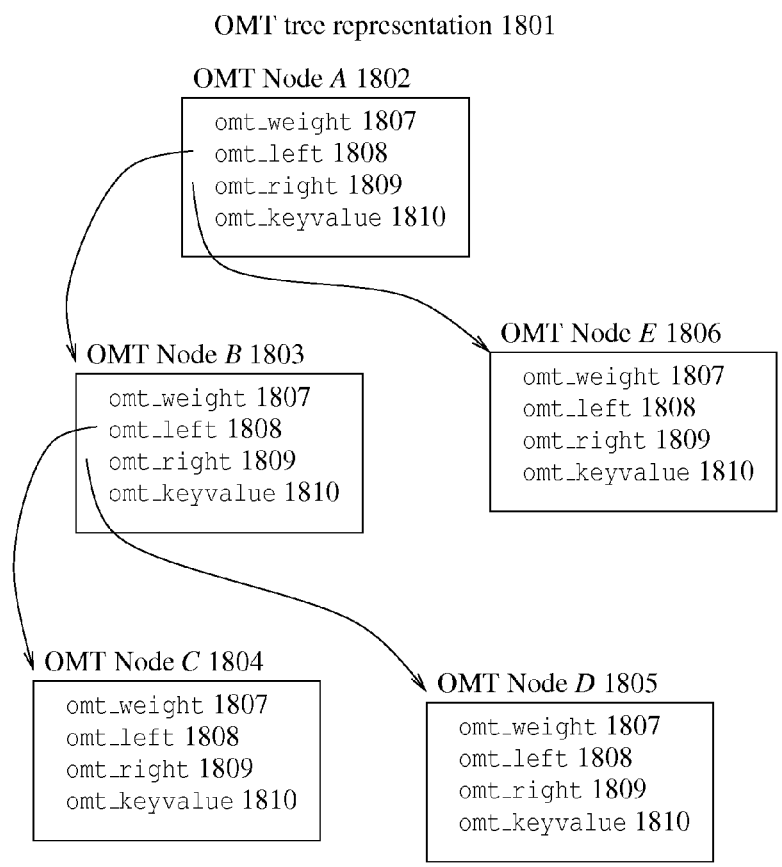
FIG. 18 depicts the structure of an order-maintenance tree represented by a tree.

FIG. 18 shows the tree representation (1801) of an OMT. The tree comprises zero or more OMT nodes (1802, 1803, 1804, 1805, 1806). Each node is a structure comprising
1. omt_weight (1807), a number which is the size of the subtree rooted at this OMT node;
2. omt_left (1808), a pointer to the left subtree (the pointer is NULL if the left subtree is empty);
3. omt_right (1809), a pointer to the right subtree (the pointer is NULL if the right subtree is empty); and
4. omt_keyvalue (1810), a key-value pair.

By convention, if there is no left (or right) child of a node, we say that the left (respectively right) child is NULL.

The OMT tree is a search tree, meaning that all the pairs in the left subtree of a node are less than the pair of the node, and the value of the node is less than all the pairs in the right subtree.

We define the left-weight of an OMT node to be one plus the number of nodes in its left subtree. The left-weight of a node N can be calculated by examining the pointer in omt_left (1808). If that is NULL then the left-weight of N is zero. Otherwise the left weight is the value stored in omt_weight (1807) of the OMT node pointed to by omt_left (1808).

We define the right-weight of an OMT node to be one plus the number of nodes in its right subtree.

The OMT tree is weight balanced, meaning that left-weight is within a factor of two of the right-weight for every node in the OMT tree. For example Node (1802) has left-weight equal to 4 (it has three descendants, plus 1), and right-weight equal to 2 (one descendant plus 1). Since 2 is within a factor of two of 4, Node (1802) is weight balanced.

Given a pair p, to find the index of that pair in an OMT rooted at Node N, the system performs a recursive tree search, starting at the root of the OMT, as shown in FIG. 19. In this function (1901),
1. if p is less than the omt_keyvalue (1810) of a node, then the index can be found by looking in the left child of the node, omt_left (1808), as shown at Line 2;
2. if p equals the omt_keyvalue (1810) of the node, then the index equals the left-weight of the node because that is how many values are in the tree that are less than p, as shown at Line 4; and
3. otherwise the index equals one plus the left-weight of the node plus the index of the node in the right subtree, as shown at Line 5.

To look up a value given an index i in an OMT rooted at Node x, the system traverses the tree recursively, as shown in FIG. 20. In this function (2001),
1. if i is less than the left-weight of N, then the value can be found by looking in the left child of the node, omt_left (1808), as shown at Line 2;
2. if i equals the left-weight of N, then the omt_keyvalue (1810) stored at N is returned, as shown at Line 4; and
3. otherwise, the value can be found by searching in the right subtree, omt_right (1809), with an index equal to i minus the left-weight of N minus 1, as shown at Line 5.

To look up a value given a pair p, one can first find the index using OMT_FIND_PAIR function shown in FIG. 19, and then use that index with the OMT_FIND_VALUE function shown in FIG. 20.

To insert a pair p into an OMT tree, the system first inserts the node in an unbalanced fashion, and then rebalances the tree if needed by rebuilding the largest unbalanced subtree.

FIG. 21 shows how to insert, in an unbalanced fashion, a value after a particular index given a node N, an index i that will be the index of the new value, and the value v that is to be inserted. The function (2101) returns the new tree. In this function,
1. if N is NULL then a new OMT node is created, as shown at Line 2;
2. if i is less than or equal to the left weight, then the value is inserted in the left child of N at index i, and the resulting tree is stored as the left child of N, as shown in Line 5, and N is returned as shown in Line 6; and
3. otherwise the value is inserted in the right child of N, at the index i minus the left-weight of N minus 1, and the resulting tree is stored as the right child of N, as shown in Line 8, and N is returned as shown in Line 9.

After performing the unbalanced insertion, any unbalanced subtree is rebalanced. As the OMT_INSERT_UNBALANCED function returns, it records the highest unbalanced subtree, which is then rebalanced. If there is such a node, then the system takes the highest unbalanced node, x, (the node closest to the root), and rebuilds that subtree as a balanced tree. The system performs this rebuild by allocating an array large enough to hold all of the values in x, then scanning the subtree from left to right filling in the array. If the entire tree is being rebalanced, then the array is used to build the OMT in the array representation. Otherwise, after filling in the array, the subtree is then rebuilt by inserting the elements back into a tree to build a balanced tree. This balanced tree construction is accomplished by inserting the middle element of the array into the tree, and then recursively inserting the left subarray into the tree, and then the right subarray into the tree.

Alternatively, one can delete a pair from the OMT array by first deleting in an unbalanced 525 fashion and then rebuilding the largest unbalanced subtree.

An OMT cursor can be thought of as a pointer at a pair inside an OMT. Given a cursor, the system can fetch the pair, or it can move the cursor forward or backward. The system implements a cursor as an integer, which is the index in the array representation. Since that index can be used both the tree and the array representation, it suffices. However any time the tree changes shape (due 530 to an insertion or deletion), that integer must be updated. When this occurs, the system invalidates the OMT cursor, and then the user of the OMT cursor reestablishes the cursor by looking up the relevant key-value pair. The OMT cursor provides a callback method to notify its user that the cursor is about to become invalid, so that the user can copy out the key-value pair, which will enable the user to reestablish the cursor. Alternatively the system can update the integer as needed, or otherwise maintain the cursor in a valid state.

All of the OMT cursors that refer to a given OMT, are maintained in a linked list stored at omt_cursors (1103).

Leaf Entries

The objects stored in an OMT can have extra information beyond the key-value pairs themselves. These objects, which comprise the key-value pairs and any additional information, and are called leaf entries, and they are looked up in an OMT using the same key comparison used for key-value pairs. That is, for NODUP dictionaries, they are identified by a key, and for DUP dictionaries they are identified by a key-value pair. In this system, the extra information records whether the transaction that last inserted or deleted the key-value pair has committed or aborted.

FIG. 22 shows various types of leaf entries. Each leaf entry is serialized into a block of memory. This encoding is called the serialized representation of the leaf entry. The first byte is a tag le_tag (2201) that is used to discriminate between the different types of leaf entries. FIG. 22 shows four tags, which are LE_COMMITTED (encoded as 1), LE_BOTH (encoded as 2), LE_PROVDEL (encoded as 3), and LE_PROVVAL (encoded as 4).

1. A LE_COMMITTED leaf entry then encodes
   (a) a key le_key (2202) that is encoded by encoding a numeric length and the key bytes, and
   (b) a committed value le_cvalue (2204) that is encoded by encoding a numeric length and the key bytes.
2. A LE_BOTH leaf entry then encodes
   (a) a key le_key (2202),
   (b) a transaction identifier (XID) le_xid (2203) that encodes a 64-bit number,
   (c) a committed value le_cvalue (2204), and
   (d) a provisional value le_pvalue 2205 that is encoded by encoding a numeric length and the key bytes.
3. A LE_PROVDEL leaf entry then encodes
   (a) a key le_key (2202),
   (b) an XID le_xid (2203), and
   (c) a committed value le_cvalue (2204).
4. a LE_PROVVAL leaf entry then encodes
   (a) a key le_key (2202),
   (b) an XID le_xid (2203), and
   (c) a provisional value le_pvalue 2205.

These four leaf entry types further comprise a checksum le_checksum (2206).

Alternatively, other encodings can be used to implement a dictionary. For example, for a dictionary without transactions, it may suffice to employ only one type of leaf entry comprising a key, a value, and a checksum.

Alternatively, the checksum can be modified to be more robust or less robust (or even removed). For example, if the reliability demanded by users of the system is much less than the reliability provided by the system, then the checksum might be removed to save cost.

Checksums

A checksum le_checksum (2206) can be calculated using any convenient checksum, such as a CRC. The system computes a checksum of a block of memory B of length l, calculated as shown in FIG. 23. The function CHECKSUM (2301) calculates a 32-bit unsigned checksum. In Line 1 a 64-bit unsigned variable s is set to zero. In Line 2 a number variable i is set to zero. Line 3 starts a loop that will run while i<l. Line 4 sets a 64-bit unsigned variable v to zero. Line 5 sets a number variable j to zero. Line 6 starts a loop that will run as long as i<l and j<8. Line 7 fetches the ith byte of Block B, and left-shifts it by 7−j bytes by multiplying it by $2^{7-j}$, and then adds that value to v. Lines 8-9 increment i and j respectively.

After the inner loop finishes, Line 10 updates s by multiplying s by 17 and adding v, and then truncating any higher-order bits so that the value fits into s. Line 10 converts the 64-bit value s to a 32-bit checksum by taking the high-order 32 bits of s and combining them with the low-order 32-bits of s using a bitwise exclusive or operator, and then inverting the bits, and returning the result.

For simplicity of further explanation, we focus the inner loop of the checksum, which after optimizing for operating directly 64-bit values can be expressed in the C99 programming language as shown in FIG. 24. If we include only 64-bit values, the checksum can be expressed mathematically as $$\sum_i a_i \cdot 17^i$$

where $a_i$ is the ith 64-bit number. The function (2401) of FIG. 24 computes this checksum.

To compute the same checksum in parallel the system operates as follows. If a and b are vectors of 64-bit values, and a+b is the concatenation of vectors, and |b| is the length of b then checksum(a+b)=checksum(a)·$17^{|b|}$+checksum(b)

where all calculations are performed in 64-bit unsigned integer arithmetic.

The system computes $17^x$ by repeated squaring. For example $17^{100}=17^{64} \cdot 17^{32} \cdot 17^4$ so to compute it the system computes $x_2=17 \cdot 17$;

$x_4=x_2 \cdot x_2$;

$x_8=x_4 \cdot x_4$;

$x_{16}=x_8 \cdot x_8$;

$x_{32}=x_{16} \cdot x_{16}$;

$x_{64}=x_{32} \cdot x_{32}$;

$x_{100}=x_{64} \cdot x_{32} \cdot x_4$;

Thus the system computes $17^x$ modulo $2^{64}$ in O(logx) 64-bit operations.

Note that the "big-Oh" notation is used to indicate how fast a function grows, ignoring constant factors. Let f(n) and g(n) be non-decreasing functions defined over the positive integers. Then we say that f(n) is O(g(n)) if there is exist positive constants c and $n_0$ such that for all n>$n_0$, f(n)<cg(n).

FIG. 25 shows how to compute this checksum function in parallel using the Cilk++ programming language. In this language the cilk_for loop is like a C99 for loop, except that all the iterations can run in parallel. The x1764 function (2501) divides the work into 32 pieces, which can then be computed in parallel, and combined at the end.

Non-Leaf Nodes

Figure 26:
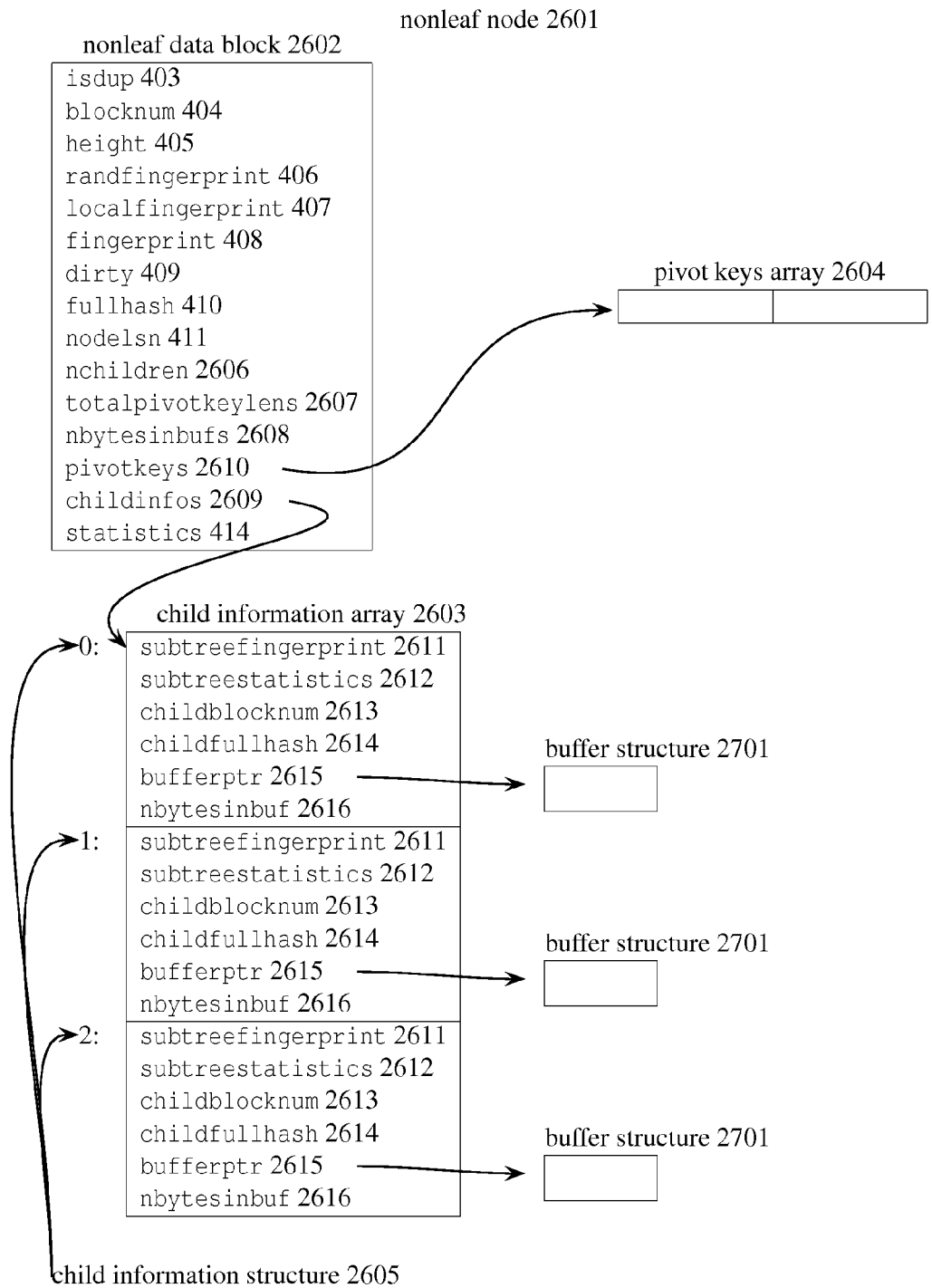
FIG. 26 depicts the structure a nonleaf node in RAM.

FIG. 26 shows a nonleaf node (2601) in RAM. The node comprises a nonleaf data block (2602), an array child information array (2603), and an array pivot keys array (2604).

A nonleaf data block (2602) is a structure comprising
1. isdup (403), a Boolean;
2. blocknum (404), a number;
3. height (405), a number;
4. randfingerprint (406), a number;

5. localfingerprint (407) a number;
6. fingerprint (408), a number;
7. dirty (409), a Boolean;
8. fullhash (410), a number;
9. nodelsn (411), a number; and
10. statistics (414) a structure.

all of which serve essentially the same role as in the leaf node of FIG. 4. The nonleaf data block (2602) further comprises
1. nchildren (2606), a number indicating how many children the node has;
2. totalpivotkeylens (2607), a number indicating a sum of the lengths of the pivot keys;
3. nbytesinbufs (2608), a number indicating a sum of the number of bytes in buffers;
4. pivotkeys (2610), a pointer to an array of pivot keys; and
5. childinfos (2609), a pointer to an array of structures containing information for each child.

The pointer childinfos (2609) refers to a child information array (2603) in RAM. The ith element, a child information structure (2605), of the array is a structure that contains information about the ith subtree of the node, comprising
1. subtreefingerprint (2611), a number which equals the fingerprint of the subtree;
2. childblocknum (2613), a number which equals the block number where the subtree's root is stored;
3. childfullhash (2614), a number which equals a hash of the subtree root, used to quickly find the leaf node in a Buffer Pool (4601);
4. bufferptr (2615), a pointer to a buffer buffer structure (2701); and
5. nbytesinbuf (2616), a number equal to the sum of the number of bytes in buffer structure (2701).

If the node has n children then the child information array (2603) contains n structures, each a child information structure (2605). The value of nbytesinbufs (2608) is the sum of the various nbytesinbuf (2616) values in the child information array (2603). In FIG. 26 the child information array (2603) is shown with three elements, labeled 0, 1, and 2. Each element is a child information structure (2605).

The pointer pivotkeys (2610) refers to a pivot keys array (2604) of pivot keys. For a NODUP dictionary a pivot key comprises the key of a key-value pair. For a DUP dictionary a pivot key comprises both the key and the value of a key-value pair. If the node has n children then the pivot keys array (2604) contains n−1 pivot keys. In FIG. 26 the pivot keys array (2604) is shown with two slots which can each hold one pivot key. The array of pivot keys is maintained in sorted order. Let $\langle k_1, \ldots, k_a \rangle$ denote the sequence of pivot keys in a nonleaf node, then $k_1 \leq \ldots \leq k_a$. For NODUP dictionaries $k_1 < \ldots < k_a$.

Figure 27:
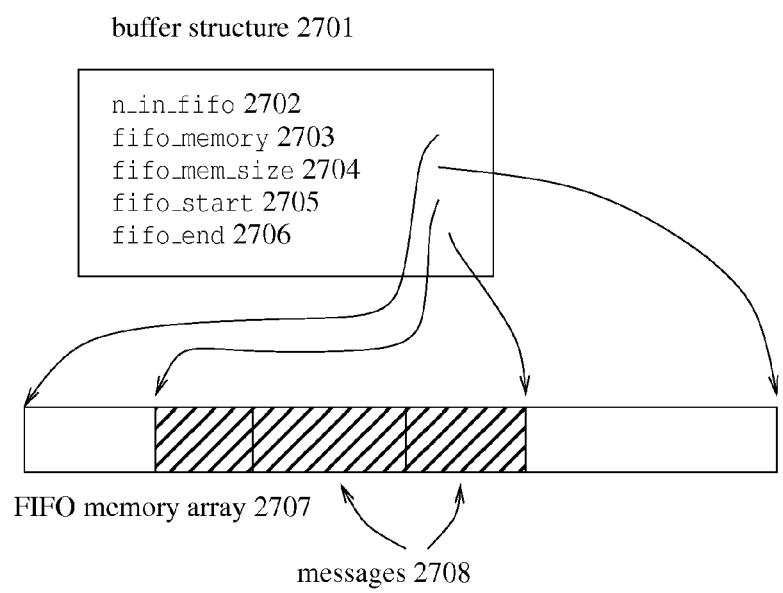
FIG. 27 depicts a buffer structure.

FIG. 27 shows a buffer structure (2701), which implements a first-in-first-out (FIFO) of messages (2708). A FIFO is a structure comprising
1. n_in_fifo (2702), a number indicating how many messages (2708) are in the FIFO;
2. fifo_memory (2703), a pointer to a block of memory (2707) holding the messages (2708);
3. fifo_mem_size (2704), a number that says how big the block of memory is;
4. fifo_start (2705), a number that indicates the offset in the block of the oldest message; and
5. fifo_end (2706), a number that indicates the offset in the block of just beyond the newest message (that is, the offset where the next message will be enqueued).

A buffer structure (2701) contains zero or more messages.

In FIG. 27 the FIFO is shown holding three entries of various sizes.

To enqueue a message of size M in a FIFO, the system uses the following procedure:
1. Let S be the size of the data in the FIFO (that is, the difference between fifo_end (2706) and fifo_start (2705)).
2. Let R be the size remaining space after the newest message (that is, the difference between fifo_mem_size (2704) and fifo_end (2706)).
3. If M<R (there is not enough space at the end of the memory block), then
   (a) If either 2(S+M) is greater than fifo_mem_size (2704) or 4(S+M) is less than fifo_mem_size (2704), then allocate a new block of memory of size 2(S+M) and
      i. copy the block of size S from offset fifo_start (2705) in the old block to the beginning of the new block,
      ii. copy the message to offset S in the new block,
      iii. set fifo_memory (2703) to point at the new block,
      iv. set fifo_mem_size (2704) to 2(S+M),
      v. set fifo_start (2705) to 0,
      vi. set fifo_end (2706) to S+M, and
      vii. free the old block.
   (b) Otherwise (reuse the same block)
      i. move the block of size S from offset fifo_start (2705) in the block, copying from left to right to avoid overwriting one portion of the block in its old location before copying it to its new location,
      ii. copy the message to offset S,
      iii. set fifo_start (2705) to 0, and
      iv. set fifo_end (2706) to S+M.
4. Otherwise there is space, therefore
   (a) copy the message to offset fifo_end (2706), and
   (b) increment fifo_end (2706) by M.

The fingerprint (408) of a nonleaf node is calculated by taking the sum, over all the messages in the node, of the fingerprints of the messages, further summing the fingerprints of the children nodes of the node. The system maintains a copy in each node of the fingerprint of each child in subtreefingerprint (2611). The fingerprint is calculated incrementally as the tree is updated. Alternatively, the fingerprint of a node can be updated when the node is written to disk (also updating the subtreefingerprint (2611) at that time).

The system maintains the fullhash (410) for a node and update the childfullhash (2614) of the node's parent so that the recalculation of the fullhash (410) of the child can be avoided when the system is requesting a child block from the buffer pool.

Messages

Figure 28:
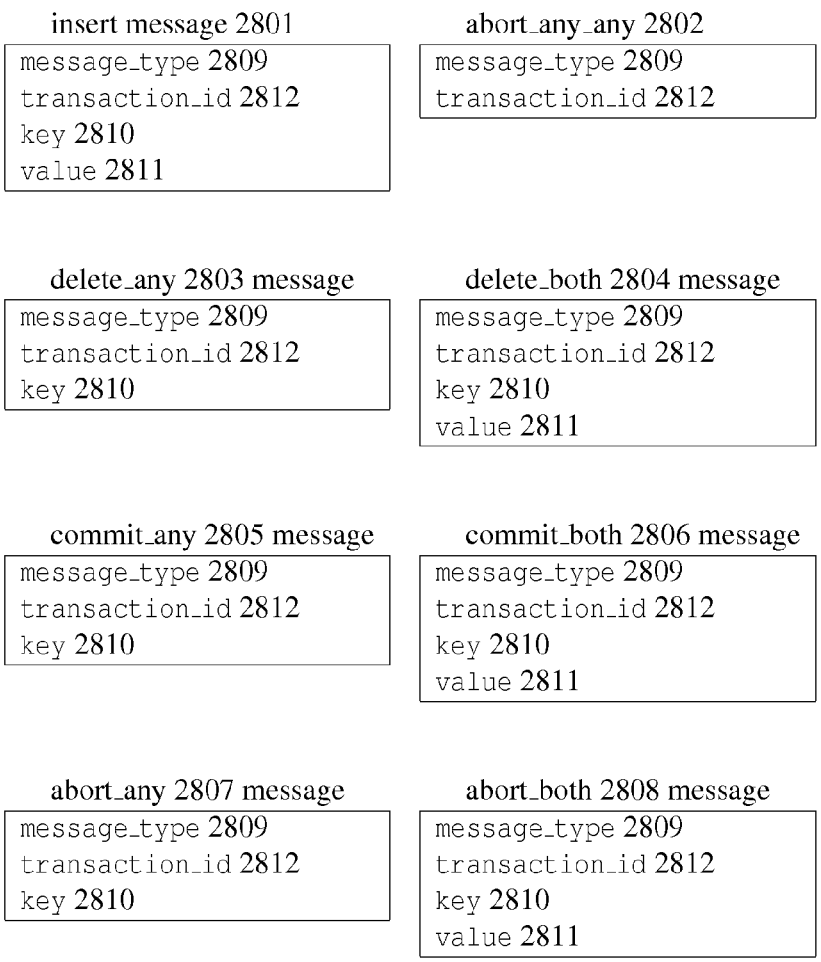
FIG. 28 depicts various messages in a message format.

FIG. 28 shows a message format. A message can be one of several types, including but not limited to the following:

An insert message (2801) message is a structure comprising
1. message_type (2809);
2. transaction_id (2812), an XID;
3. key (2810), a key; and
4. value (2811), a value.

A delete_any (2803) message is a structure comprising
1. message_type (2809);
2. transaction_id (2812), an XID; and
3. key (2810), a key.

A delete_both (2804) message is a structure comprising
1. message_type (2809);
2. transaction_id (2812), an XID;
3. key (2810), a key; and
4. value (2811), a value.

A commit_any (2805) message is a structure comprising
1. message_type (2809);

2. transaction_id (2812), an XID; and
3. key (2810), a key.

A commit_both (2806) message is a structure comprising
1. message_type (2809);
2. transaction_id (2812), an XID;
3. key (2810), a key; and
4. value (2811), a value.

An abort_any (2807) message is a structure comprising
1. message_type (2809);
2. transaction_id (2812), an XID; and
3. key (2810), a key.

An abort_both (2808) message is a structure comprising
1. message_type (2809);
2. transaction_id (2812), an XID;
3. key (2810), a key; and
4. value (2811), a value.

An abort_any_any (2802) is a structure comprising
1. message_type (2809); and
2. transaction_id (2812), an XID.

Each message is encoded into a block of RAM. The message_type (2809) discriminates between the various types of messages, for example, between a commit_any message and an abort_both message. The message format in RAM is organized so that the message_type (2809) is at the same offset in every message, so that the system can, given a block of memory containing an encoded message, determine which message type the message is, and the system can to determine the offset of each of the other fields. The message_type (2809) is 1 for an insert, 2 for a delete_any, 3 for a delete_both, and so forth.

A message is encoded into a block of memory by encoding each of its fields, one after the other. Thus the first byte of memory contains the message_type (2809). The XID, which is a 64-bit number, is stored in the next 8 bytes. The key is then stored using 4 bytes to store the length of the key, followed by the bytes of the key. The value, if present, is then stored using 4 bytes to store the length of the value, followed by the bytes of the value. Integers are stored in network order (most significant byte first).

FIG. 29 shows an example encoding (2901) of an insert message (2801) using this encoding. The key is "abc", which is of length three, and the value is "wxyz", which is of length four. The XID is 1042. The values in the figure are written in hexadecimal notation The message encoding example (2901) can be read as follows:

01: The message_type (2809).
00 00 00 00 00 00 04 12: The transaction_id (2812), which is 1042 encoded in hexadecimal.
00 00 00 03: The length of the key, which is 3.
61 62 63: The three bytes of the key. Note that the letter 'a' encodes as hexadecimal 61 in ASCII.
00 00 00 04: The length of the value, which is 4.
77 78 79 7A: The four bytes of the value.

When a data structure, including but not limited to a message, has been converted into an array of bytes we say the data structure has been serialized. In many other cases throughout this patent, when we describe a data structure as being serialized, we use a similar technique as shown here for message serialization.

The system identifies nodes by a block number. The system converts a block number to to a file offset (or a disk offset) and length via a block translation table. The file offset and length together are called a segment.

Alternatively, for some message types, the system could combine messages at nonleaf nodes. For example if two insert messages with the same key, value, and XID are found, then only one needs to be kept.

Alternatively, there are other types of operations that can be stored as messages. For example, one could implement a lazy query, in which the query is allowed to be returned with a long delay. Alternatively, one could implement an insertion of a key value pair (k,v) that is subject to different overwrite rules, i.e., different rules about when to overwrite a key-value pair (k, v') that was already in the dictionary. One could implement an update operation U(k,v,c), in which c is a call-back function that specifies how the value v is combined with the existing value of key k in the database. For example, this update mechanism can be used to implement a counter increment functionality. There can also be addition types of operations for the case when duplicates are allowed.

Block Translation Table

Figure 30:
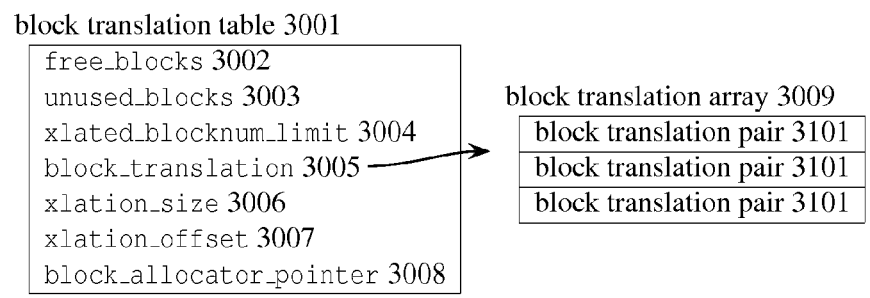
FIG. 30 depicts a block translation table.

FIG. 30 shows a block translation table (BTT) (3001). Block numbers comprise 64-bit values. The block translation table (3001) is a structure comprising
1. free_blocks (3002), a block number which implements the head of a free list;
2. unused_blocks (3003), a block number which indicates that all block numbers larger than the unused_blocks (3003) value are free;
3. xlated_blocknum_limit (3004), a number which indicates the number of block numbers that are translated;
4. block_translation (3005), a pointer to an block translation array (3009) stored in RAM;
5. xlation_size (3006), a number which indicates the size of the block translation array (3009) as stored on disk;
6. xlation_offset (3007), a number which indicates where on disk the block translation array (3009) is stored (thus the xlation_offset (3007) and xlation_size (3006) together identify a segment); and
7. block_allocator_pointer (3008), a pointer that points to a segment allocator (3201).

The block translation array (3009) comprises an array of block translation pairs.

FIG. 31 shows a block translation pair (3101), which is a structure comprising
1. offset (3102), a number which indicates the offset of the block on disk; and
2. size (3103), a number which indicates the size of the block.

A block translation pair (3101) thus contains enough information to identify a segment on disk.

To implement a free list, the free_blocks (3002) in the block translation table (3001) names a free block number. A free block has its size (3103) set to a negative value in its block translation pair (3101), and has the identity of the next free block is stored in its offset (3102). The last free block in the chain sets its offset (3102) to a negative value.

To allocate a new block number, the system first checks to see if free_blocks (3002) identifies a block or has a negative value. If it does, then the list is popped, setting free_blocks (3002) 805 from the identified block's offset (3102), and using the old value of free_blocks (3002) as the newly allocated block number. If there are no free blocks in the block list, then the block number named unused_blocks (3003) is used, and unused_blocks (3003) is incremented. If unused_blocks (3003) is larger than xlated_blocknum_limit (3004), then the block translation array (3009) is grown, by allocating a new array that is twice as big as xlated_blocknum_limit (3004), copying the old array into the new array, freeing the old array, and storing the new array into block_translation (3005).

To free a block number, the block is pushed onto the block free list by setting the block's offset (3102) to the current value of free_blocks (3002), and setting free_blocks (3002) to the block number being freed.

When the block translation array (3009) is written to disk, then a segment is allocated using the segment allocator (3201), and the block is written. The size of the segment is stored in xlation_size (3006), and the offset of the segment is stored in xlation_offset (3007).

Alternatively, other implementations of a set of free blocks can be used. For example, the set of free blocks could be stored in a hash table. Similarly, the translation array could be represented differently, for example in a hash table.

The segment allocator (3201) implements a segment allocator (3201) which manages the allocation of segments in a file. A segment allocator (3201) is a structure comprising
1. ba_align (3202), a number which indicates the alignment of all segments;
2. ba_nsegments (3203), a number which indicates how many allocated segments are on disk;
3. ba_arraysize (3204), a number which indicates the size of the array pointed to by ba_arrayptr (3205);
4. ba_arrayptr (3205), a pointer which points at an array of segment pairs; and
5. ba_nextfit (3206), a number which remembers in the array of segment pairs the system last looked for an allocated segment.

The system ensures that every segment's offset is a multiple of ba_align (3202). Whenever the array of segment pointers is discovered to be too small (based on ba_arraysize (3204)), the system doubles the size of the array by doubling ba_arraysize (3204), allocating a new array, copying the data to from the old array to the new array, and freeing the old array. The array of segment pairs is kept in sorted order, sorted by the segment offset. A segment pair comprises an offset and a size.

To find a new segment of size S, the system rounds S up to be a multiple of ba_align (3202), that is the system uses ba_align·⌈S/ba_align⌉. The system then looks at the segment pair identified by the ba_nextfit (3206). The system can determine that the size of the unused space between the segment named in that segment pair and the segment named in the next segment pair. If the unused space is size S or larger, then a all the segment pairs from that point are moved up in the array by one element, creating a new segment pair. The new segment is then initialized with size S and offset at the end of the original segment pair. If the unused space is smaller than S (possibly with no space) then ba_nextfit (3206) is incremented wrapping around at the end, and the system looks again. If the system makes one complete round looking at all the free slots without finding a large enough free segment, then the system allocates space at end.

The system does not allocate a segment that has offset between 0 and ba_reserve (3207), reserving that segment for file header information (including but not limited to information about where the block translation table is stored on disk).

In the segment allocator (3201) described above, the free space is stored implicitly by storing the in-use segments in sorted order. In some situations the system stores the free segments explicitly in an OMT sorted in increasing order by the size of the free segment. In this mode, the system allocates a segment of size S by performing a search to find the smallest free segment of size greater than equal to S. The found segment is removed from the OMT. If the found segment's size is equal to size S then that segment is used. If the found segment is larger than S then the system breaks the segment into two parts, one of size S which is used, and the other which is the remaining unused space. The unused segment is stored in the OMT.

When a node with block number b is written to disk, it is first serialized into a string of bytes of length U, then it is compressed, producing another string of bytes of length C. Then the 4-byte encodings of C and U are prepended to the compressed string, yielding a string of length C+8. Then a segment of size D=C+8 is allocated, and stored in the block translation table, recording the segment for block number b, along with the length of the segment (C+8). Then the sequence is written to disk at the segment.

To read a block from disk to RAM, the system consults the block translation table to determine the segment on disk holding the compressed data. The length, D, of the compressed block with the prepended lengths is also retrieved from the block translation table. A block of RAM of size D is allocated, and the data is read from the segment on disk into the RAM block. Then the size, U, of the uncompressed block is obtained from Bytes 4-7 of the retrieved block. Then a block of size U is allocated in RAM. The D-sized RAM block is decompressed into the U-sized RAM block. Then the D-sized RAM block is freed. The U-sized RAM block is then decoded into an in-RAM data structure. For leaf nodes, which have a memory pool, the U-sized block is used for the memory block (1006) of the memory pool.

For each dictionary, the system maintains a block translation table (BTT). In some modes of operation, the system maintains a checkpointed block translation table (CBTT). And in some modes of operation the system maintains a temporary block translation table (TBTT).

Pushing Messages

The system composes messages and then executes them on the root node of a dictionary. Executing a message on a node of the dictionary may result in the message being incorporated into the node, or other actions being taken, as follows.

To execute a sequence of messages on a nonleaf node N that is in RAM:
1. For each message in the sequence:
   (a) The system examines the pivotkeys (2610) to determine which child or children to which a copy of the message shall be sent.
      i. Insert messages (2801) are sent to the ith subtree where the i is the largest number such that ith pivot key is greater-than-or-equal to the message (note that for DUP trees comparing the pivot key involves comparing both the key and the value of the message). If all the pivot keys are less than the message, then the message is sent to the rightmost subtree.
      ii. Any of the "_both" messages (delete_both (2804), commit_both (2806), and abort_both (2808)) are sent to the same subtree that an insert message would be sent to.
      iii. In the case of an "_any" message (delete_any (2803), commit_any (2805), and abort_any (2807)) for NODUP trees, the message is sent to the same subtree that an insert message would be sent to.
      iv. In the case of an "_any" message (delete_any (2803), commit_any (2805), and abort_any (2807)) for DUP trees, the message may be sent to more than one subtree. The subtrees include any subtree i for which the key part of the ith pivot is greater-than or equal to the key of the message and the key part of the i−1st pivot key is less than or equal to the key of the message. The message is sent to the leftmost subtree if the first pivot key is greater than or equal to the message, and is sent to the last subtree is the last pivot key is less than or equal to the message.

v. For an abort_any_any (2802), the message is sent to all the subtrees.
(b) The system copies the message into the respective message buffers of all the children identified in Step 1a.
2. For each Child C of Node N:
   (a) If the node of Child C is in RAM and is dirty and is not temporarily locked or otherwise inaccessible, then
       i. Let B be the buffer in N corresponding to the child.
       ii. While B is not empty and the oldest message in B can fit into the child without exceeding the child's target size (even when the message is replicated many times in Step 1b):
           A. Dequeue the oldest message from B's FIFO.
           B. Construct a sequence of length one containing that message.
           C. Execute the sequence on the child of the node.
3. If node N is larger than its target size:
   (a) Find the child with the largest value of nbytesinbuf (2616) (which corresponds buffer with the most bytes in its FIFO). (If all the child FIFOs are empty, then the system is finished with N.)
   (b) Let B be the buffer of that child.
   (c) Construct a sequence of messages by dequeueing some (possibly all) of the messages 920 in B's FIFO, the first element of the sequence being the oldest message in the FIFO, and the last element of the sequence being the newest message in the FIFO. (Note: the FIFO is now empty.)
   (d) Bring the node of the child into RAM if it is not in RAM.
   (e) Execute the sequence of messages on the child node.

Alternatively, variants of these rules can be employed. For example, in Step 2a the system could ignore whether the child is dirty or temporarily inaccessible. Another example is that the system could, whenever it finds a nonempty buffer B in a node where the corresponding child is dirty unlocked and in memory, remove all the messages from B and execute them on the child.

Emptying a buffer in a node by moving messages to the child is called flushing the buffer.

It is possible that a node will be larger than their target sizes after executing a sequence of messages on the node. For example, an abort_any message may be replicated many times in Step 1b. Then in Step 3, the buffer of only one child is emptied. The node could still be larger than its target size, which is acceptable, because the system can empty additional buffers in future operations.

Figure 7:
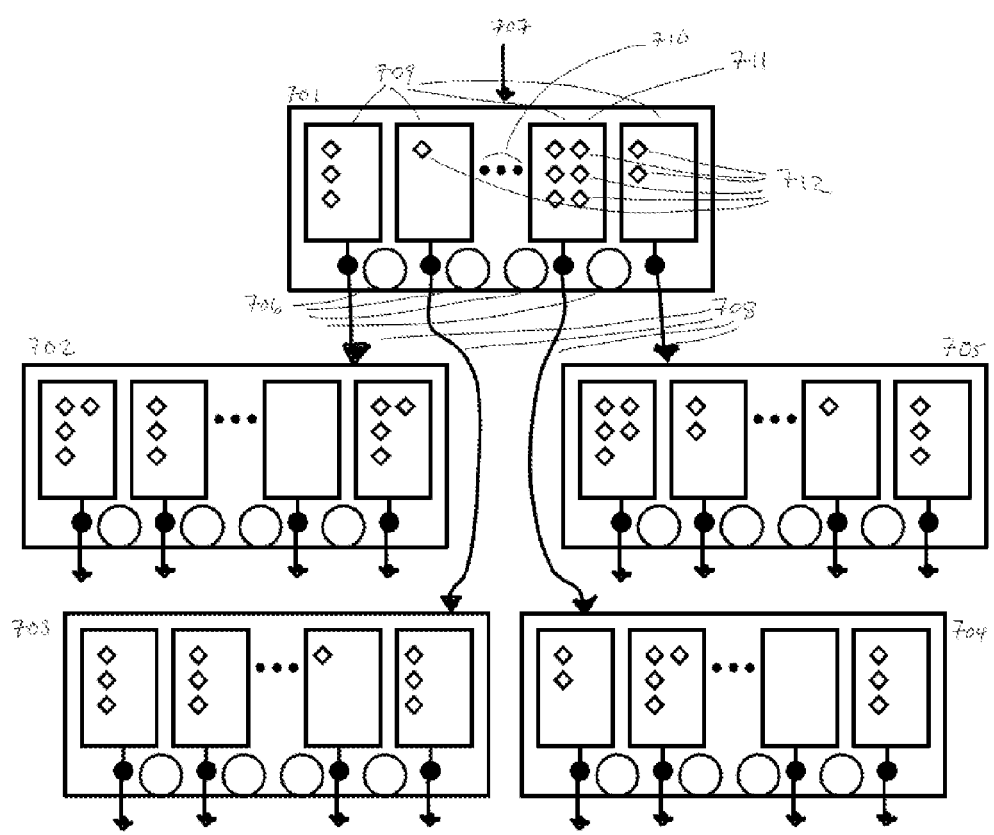
FIG. 7 depicts an example of two levels in the tree containing messages in buffers before messages have moved down the tree.

FIG. 7 depicts an example showing part of a tree that comprises two levels of nodes containing messages in buffers. Call the node highest in the tree u (701). The pivots in the node are drawn as circles (706). The buffers in the node are drawn as rectangles (709). Some of the buffers are indicated by an ellipsis (710). Denote the first and second of u's children as v (702) and w (703), respectively. Denote the penultimate and ultimate of u's children as x (704) and y (705). The child pointer from u's parent to u (707) and the child pointers from u to v, w, x, and y (708) are indicated by downward arrows. The messages in the buffers are drawn as diamonds (712).

Figure 8:
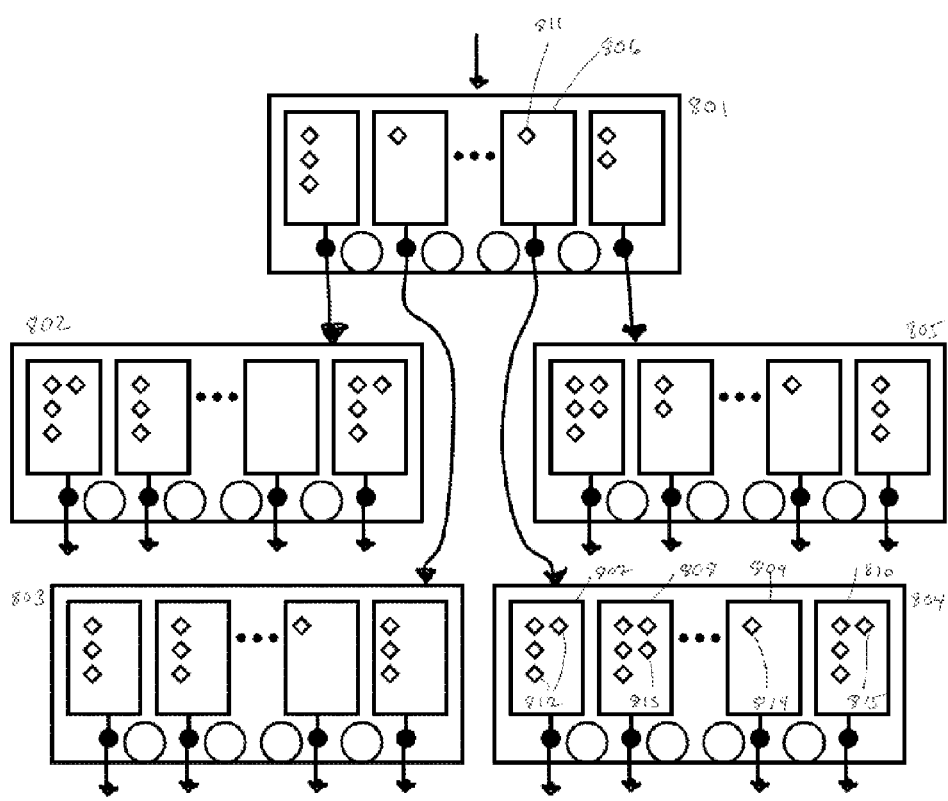
FIG. 8 depicts an example of two levels in the tree containing messages in buffers after messages have moved down the tree.

FIG. 8 depicts the same part of the tree as shown in FIG. 7, after messages have been moved down the tree. The penultimate buffer (806) in node u (801) has some of its messages removed and placed in the children. The buffers associated with the other children v (802), w (803), y (805) are not modified in this example. One element (811) remains in the buffer after the flush. The rest of the messages previously in that buffer are flushed to buffers in the associated child x (804). Two messages (812) are inserted into the first buffer (807), one message (813) is inserted into the second buffer (808), one message (814) is inserted into the penultimate buffer (809) and one message (815) is inserted into the last buffer (810). Alternatively, it is also possible to implement buffer flushes that empty out all buffers completely or so that some messages may remain.

Alternatively, there are other ways to accomplish the movement of messages to the child of a node nodes. For example, it is not necessary to actually construct the sequence of messages. Instead one could dequeue one message at a time and insert it into the child node.

Alternatively, there are many ways to implement the movement of messages in a data structure in which messages move opportunistically into nodes that are in RAM, but are sometimes delayed if the destination node is not in RAM. For example, the system could use part of main memory to store a balanced search tree or other dictionary. Most of the time, the balanced search tree remains in RAM. At each of the leaves of the dictionary is a reference to another dictionary. When a message is inserted, the balanced search tree sends the message to the appropriate dictionary. That is, when a message is inserted, the balanced search tree in RAM is used to partition the search space. Then, the message is inserted directly into a dictionary. In one mode the system does not use a tree-based structure in the leaves but instead uses a cache-oblivious lookahead array (COLA).

Figure 12:
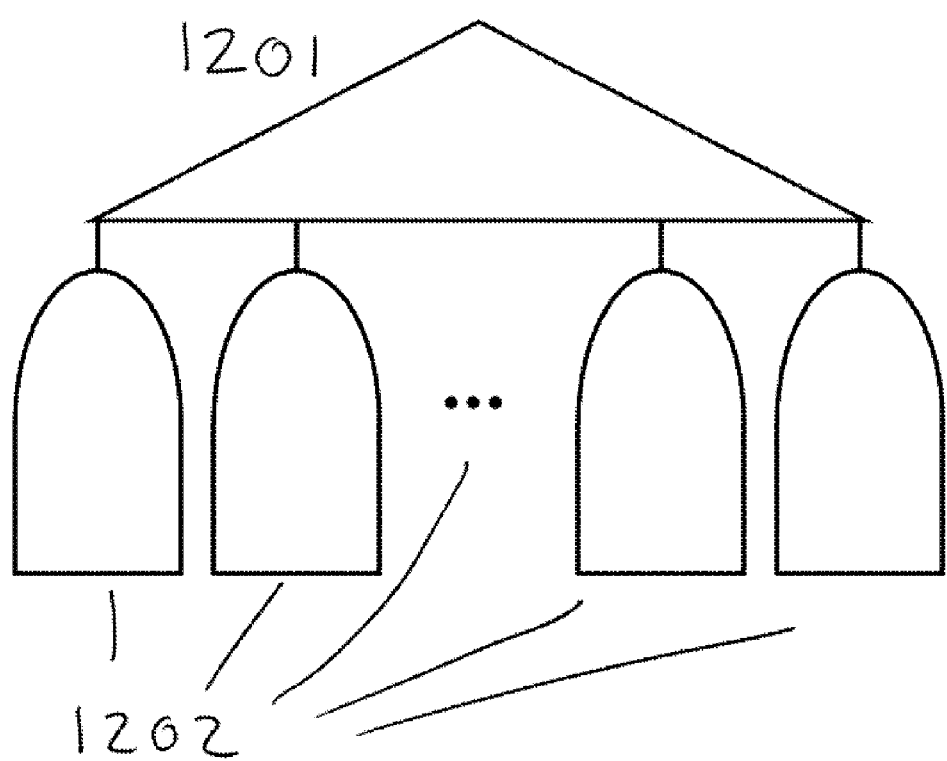
FIG. 12 depicts a system using two layers of dictionaries.

FIG. 12 illustrates an example of a two-level system. The system employs a dictionary near the root (1201), including but not limited to a balanced search tree, which is stored in RAM. All messages that are inserted travel through the dictionary to the leaves. At each leaf, there is a dictionary (1202), and the message is inserted into one of these dictionaries.

Alternatively, a system could move only some of the messages to the destination. For example if the destination fills up, the system could delay sending additional messages to the destination until some future time when the destination has forwarded its messages onward.

The process by which messages move directly down the tree without being stored in intermediate buffers is referred to as aggressive promotion.

Alternatively, a system can implement aggressive promotion that is adaptive, even when the particular data structure is not tree-based. For example, a COLA can implement aggressive promotion, as follows: Rather than putting the message directly in the lowest-capacity level of the COLA, put the message (in the appropriate rank location) in the deepest level of the COLA that is still in RAM and where space can be made. Thus, the system could use a packed-memory array to make space in the levels. The system could also use a modified packed-memory array where rebalance intervals are chosen adaptively to avoid additional memory transfers.

Figure 13:
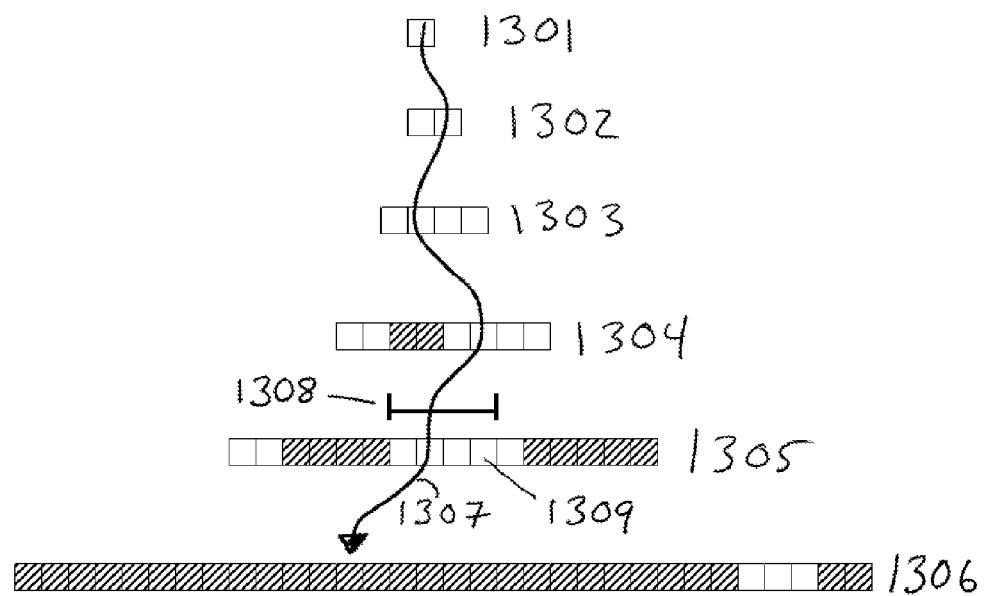
FIG. 13 depicts a system in which messages are placed according to what is in RAM in a on-tree-based dictionary.

FIG. 13 illustrates such a scheme in a non-tree-based streaming dictionary. The dictionary contains levels of geometrically increasing size. There is a first level (1301) that contains one array 980 position, a second level (1302) that contains two array positions, a third level (1303) that contains four array positions, a fourth level (1304) that contains eight array positions, a fifth level (1305) that contains 16 array positions, and a sixth level (1306) that contains 32 array positions. The hatched array cells are paged out to disk, and the nonattached array cells are paged into memory. The sinuous arrow (1307) from top to bottom identifies the search path for a message. In aggressive promotion, the message is inserted into a deep level that is paged into memory, one or more steps down the search path. In order to make room for new messages inserted into the arrays, packed-memory arrays or adaptive packed-memory arrays are used. Thus, each array stores messages in sorted order with a linear number of gaps between the arrays. There are lookahead pointers which can help to reduce the search cost per level to O(1).

In this picture, the new message is inserted directly into the fifth array with 16 array positions. In order to make room for the message, there is a rebalance, as indicated by a rebalance interval (1308). The rebalance interval is chosen so that it only involves array cells that are paged into memory. If such a rebalance interval had not been found on one level, then the element would be inserted into a higher level.

Alternatively, this structure can be modified to support messages with different lengths. For example, one could use a PMAVSE (which is described below). The structure can be modified so that the ratio between different levels is different from 2. Moreover, one could use a different structure from a PMA at each of the levels.

Alternatively, the paging scheme might depend on how messages move through the data structure. For example, the system may choose to preemptively bring into RAM a part of the data structure that is the destination of messages.

When a key-value pair is inserted into a dictionary, the system constructs an insert message (2801) containing the XID of the transaction inserting the message, and the key and the value. Then a sequence of length one is created containing that message.
1. If the root of the tree node is not in RAM, then the system brings it into RAM from disk.
2. The sequence is then executed on the node.

Alternatively, one can process the messages differently. For example, for each leaf, the system could maintain a hash table of all transactions which are provisional, indexed by XID. If, when an abort_any_any (2802) arrives at a leaf, the system could operate only on those leaf entries that mention the XID. Similarly, the system could maintain, for each non-leaf node, a hash table of all the uncompleted transactions in the subtree, so that an abort_any_any message would only need to be sent to certain subtrees. Alternatively, instead of using a hash table, the system could use another data structure, such as a Bloom filter, which would indicate definitively that a particular subtree does not contain messages or leaf entries for a particular transaction.

Messages on Leaves

To execute an insert message with XID x, key k, and value v on a leaf, the system looks up, in the OMT (1101) of the leaf, the leaf entry the key of which equals the key of the message (that is, the message key matches the leaf entry key) (for NODUP dictionaries) or matches both the key and the value (for DUP dictionaries).
1. If there is no matching leaf entry, then a LE_PROVVAL leaf entry is inserted into the OMT (1101) with key k, XID x, and value v.
2. If there is a LE_COMMITTED leaf entry with key k' and committed value c, then that leaf entry is replaced by a new LE_BOTH leaf entry with key k, XID x, committed value c, provisional value v.
3. If there is a LE_BOTH leaf entry with key k', XID x', committed value c, and provisional value p, then the system does the following:
    (a) If x=x' then replace the leaf entry with a new LE_BOTH leaf entry with key k, XID x, committed value c, and provisional value p.
    (b) Otherwise replace the leaf entry with a new LE_BOTH leaf entry with key k, XID x, committed value p, and provisional value v.
4. If there is a LE_PROVDEL leaf entry with key k', XID x' and committed value c, then the system does the following:
    (a) If x=x' then replace the leaf entry with a new LE_BOTH leaf entry with key k, XID x, committed value c, and provisional value v.
    (b) Otherwise replace the leaf entry with a new LE_PROVVAL leaf entry with key k, XID x, and provisional value v.
5. If there is a LE_PROVVAL leaf entry with key k', XID x', and provisional value p, then the system does the following:
    (a) If x=x' then replace the leaf entry with a new LE_PROVVAL leaf entry with key k, XID x, and provisional value v.
    (b) Otherwise replace the leaf entry with a new LE_BOTH leaf entry with key k, XID x, committed value p, and provisional value v.

To execute on an OMT a delete_any (2803) with XID x and key k, for each leaf entry in the OMT that has a key matching k the system does the following:
1. If the leaf entry is a LE_COMMIT TED leaf entry with key k and committed value c, then replace the leaf entry with a new LE_PROVVAL leaf entry with key k, XID x, and committed value c.
2. If the leaf entry is a LE_BOTH leaf entry with key k, XID x', committed value c, and provisional value p, then the system does the following:
    (a) If x=x' then replace the leaf entry with a LE_PROVVAL leaf entry with key k, XID x, and committed value c.
    (b) Otherwise replace the leaf entry with a LE_PROVVAL leaf entry with key k, XID x, and committed value p.
3. If the leaf entry is a LE_PROVVAL leaf entry with key k, XID x' and committed value c, then the system does the following:
    (a) If x=x' then replace the leaf entry with a LE_PROVDEL leaf entry with key k, XID x, and committed value c.
    (b) Otherwise remove the leaf entry without replacing it.
4. If the leaf entry is a LE_PROVVAL leaf entry with key k, XID x', and provisional value p, then the system does the following:
    (a) If x=x' then remove the leaf entry without replacing it.
    (b) Otherwise replace the leaf entry with a LE_PROVDEL leaf entry with key k, XID x, and committed value p.

To execute on an OMT a delete_both (2804) the system finds all leaf entries that match both the key and the value of the message, and for each such leaf entry performs the steps specified in the previous paragraph, just as if the message were a delete_any (2803).

To execute on an OMT a commit_any (2805) with XID x and key k, for each leaf entry in the OMT that has a key matching k the system does the following:
1. If the leaf entry is a LE_COMMITTED leaf entry with key k and committed value c, then replace the leaf entry with a new LE_COMMITTED leaf entry with key k, XID x, and committed value c.
2. If the leaf entry is a LE_BOTH leaf entry with key k, XID x', committed value c, and provisional value p, then replace the leaf entry with a LE_COMMITTED leaf entry with key k, XID x, and committed value p.

3. If the leaf entry is a LE_PROVDEL leaf entry with key k, XID x' and committed value c, then remove the leaf entry without replacing it.
4. If the leaf entry is a LE_PROVVAL leaf entry with key k, XID x', and provisional value p, then replace the leaf entry with a LE_PROVDEL leaf entry with key k, XID x, and committed value p.

To execute on an OMT a commit_both (2806), the system finds all leaf entries that match both the key and the value of the message, and for each such leaf entry performs the steps specified in the previous paragraph, just as if the message were a commit_any (2805).

To execute on an OMT an abort_any (2807) message with XID x and key k, for each leaf entry in the OMT that has a key matching k, the system does the following:
1. If the leaf entry is a LE_COMMITTED leaf entry with key k and committed value c, then replace the leaf entry with a new LE_COMMITTED leaf entry with key k, XID x, and committed value c.
2. If the leaf entry is a LE_BOTH leaf entry with key k, XID x', committed value c, and provisional value p, then
    (a) if x=x' then replace the leaf entry with a LE_COMMITTED leaf entry with key k, and committed value c.
    (b) otherwise replace the leaf entry with a LE_COMMITTED leaf entry with key k, and committed value p.
3. If the leaf entry is a LE_PROVDEL leaf entry with key k, XID x' and committed value c, then replace the leaf entry with a LE_COMMITTED leaf entry with key k and committed value c.
4. If the leaf entry is a LE_PROVVAL leaf entry with key k, XID x', and provisional value p, then remove the leaf entry without replacing it.

To execute on an OMT an abort_both (2808) message, the system finds all leaf entries that match both the key and the value of the message, and for each such leaf entry performs the steps specified in the previous paragraph, just as if the message were an abort_any (2807).

To execute on an OMT an abort_any_any (2802) message, the system finds all the leaf entries that have provisional states that match the XID of the message, and transforms those as if an abort_any (2807) were executed. For example
1. For LE_COMMITTED leaf entries, no change is made.
2. For LE_BOTH leaf entries, if the XID of the leaf entry matches the message, then replace the leaf entry with a LE_COMMITTED leaf entry using the previously committed value. If the XIDs do not match, then no change is made.
3. For LE_PROVDEL leaf entries, if the XID of the leaf entry matches, then replace the leaf entry with a LE_COMMITTED message using the previous committed value from the leaf entry. If the XIDs do not match, then no change is made.
4. For LE_PROVVAL leaf entries, if the XID of the leaf entry matches, then delete the leaf entry, otherwise no change is made.

In all the cases above, when a leaf entry is created its checksum is also computed.

In some conditions when a leaf entry is queried, the system can change the state. For example, the system maintains a list of all pending transactions. If a leaf entry is being queried, then all of the messages destined for that leaf entry have been executed. If the leaf entry reflects a provisional state for a transaction that is no longer pending, then the system can infer that the transaction committed (because otherwise an abort message would have arrived), and so the system can execute an implicit commit message.

The system maintains in each node statistical or summary information for the subtree rooted at the node. FIG. 33 shows a data structure that can maintain such summary statistics.

The statistics (414) structure comprises the following elements:
1. a number ndata (3301) representing an estimate of the number of key-value pairs in the subtree rooted at the node,
2. a number ndata_error_bound (3302) bounding the estimate error for ndata (3301),
3. a number nkeys (3303) representing an estimate of the number of distinct keys in the subtree,
4. a number nkeys_error_bound (3304) representing the estimate error for nkeys (3303),
5. a key or key-value pair (depending on whether the tree is a NODUP or DUP key respectively), minkey (3305), representing an estimate of the least pair in the subtree,
6. a key or key-value pair (depending on whether the tree is a NODUP or DUP key respectively), maxkey (3306), representing an estimate of the greatest pair in the subtree, and
7. a number dsize (3307) representing an estimate of the sum of the lengths of the leaf entries.

In a leaf node, the system can maintain a count of the number of leaf entries in the ndata (3301) field. If the system quiesces, and all transactions are committed or aborted, then this count is the number of rows in the node. If the system is not quiescent or some transactions are pending, then the count can be viewed as an estimate of the number of entries in the dictionary. The difference between the estimate and the quiescent value is called the estimate error, and the estimate error cannot be determined until the system quiesces and the relevant transactions are completed. Every time a leaf entry is added, the count is incremented, and every time a leaf entry is removed, the count is decremented.

The system maintains in each leaf node a count ndata_error_bound (3302) bounding the estimate error for ndata (3301)
1. Each LE_COMMITTED leaf entry contributes zero to the bound,
2. each LE_BOTH leaf entry contributes zero to the bound (because whether the transaction aborts or commits, the count will not change),
3. each LE_PROVDEL leaf entry contributes one to bound (because ndata (3301) is counting the leaf entry, but if the appropriate transaction commits, the leaf entry will be removed), and
4. each LE_PROVVAL leaf entry contributes one to the bound (because if the appropriate transaction aborts the leaf entry will be removed).

For nonleaf nodes, the system maintains the ndata (3301) field as the sum of the ndata (3301) 1150 fields of its children. The system maintains the ndata_error_bound (3302) as the sum of the ndata_error_bound (3302) fields of its children, plus the number of messages in the buffers of the node. If any of the entries are delete_any messages, then the ndata_error_bound (3302) is set to ndata (3301) of the node, since in some cases all the leaf entries could be deleted by those messages. Alternatively, tighter bounds for ndata_error_bound (3302) can be used. For 1155 example, a delete_any message can only delete one key, so if there are many unique keys, then the ndata_error_bound (3302) can sometimes be reduced.

Similarly, the system can maintain a count of the number of unique keys nkeys (3303) in a leaf node, along with correct values for minkey (3305) and maxkey (3306).

For nonleaf nodes, the system can combine results from subtrees to compute nkeys (3303). Given two adjacent subtrees, A and B, (A to the left of B), then if the maxkey (3306) of A equals the minkey (3305) of B, then the number of distinct keys in A and B together is the number of unique keys in A plus the number of unique keys in B minus one. If the maxkey (3306) of A is not equal to the minkey (3305) of B, then the number of unique keys in A and B together is the sum of the number of unique keys in A and B. Thus, by combining all the results from the children, the proper 1165 value of nkeys (3303) can be computed. The nkeys_error_bound (3304) can be computed in a way similar to the ndata_error_bound (3302).

For the data size estimate ds i ze (3307), each leaf can keep track of the sum of the sizes of its leaf entries, and a subtree can simply use the sum of its children.

In many cases an estimate of the number of rows or distinct keys or data size in a tree is useful 1170 even if the estimate has an error. For example, a query optimizer may not need precise row counts to choose a good query plan. In such a case, the summary statistics at the root of the tree suffice.

In the case where an exact summary statistic is needed, the system can compute the count exactly. To compute exact statistics, or to compute the statistics to within certain error tolerances, as viewed by a particular transaction, the system can perform the following actions:

1. Check ndata_error_bound (3302) for that subtree. If the error bound is tight enough (for example if it is zero), then ndata (3301) is the correct value and can be used. Also the if the ndata_error_bound (3302) is zero, then the dsize (3307) is exactly right. Similarly, the nkeys_error_bound (3304) can determine if the nkeys (3303) is accurate enough.
2. For any value that has too-loose error bounds, in a leaf node, the system iterates through the leaf entries, performing a query on each the key in each leaf entry. Assuming that the lock tree permits the queries to run without detecting a conflict, then after all the implicit commits operate, the number of leaf entries remaining in the node is the correct number, and the estimate error will be zero. (If the lock tree does not permit the queries, then there is a conflict, and the translation must wait or abort or try again.)
3. For nonleaf nodes, the system can iterate through the children performing this computation recursively. Any subtree with an accurate enough estimate can calculate it quickly, and otherwise the computation descends the tree summing up the statistics appropriately.

Alternatively, the statistics (414) field is a structure that can be incorporated directly into some other structure, as shown in FIG. 4 or FIG. 26, or it could be incorporated with a pointer, similarly to the memory pool (1001) in FIG. 4.

For each child of a nonleaf nodes, the system stores a copy of the child's statistics in the subtreestatistics (2612) field of the appropriate child information structure (2605). The system can use those cached values to incrementally recompute the statistics of a node when a child's statistics change.

Alternatively, additional statistical summary information could be added to the statistics (414). For example, if a dictionary comprises rows comprising fields, then the statistics could keep a summary value for some or all of the fields. Examples of such summary values are the minimum value of a field, the maximum value of a field, the sum of the field values, the sum of the squares of the field values (which could for example be used to compute the variance and standard deviation of the field values), the logical "and", logical "or", or logical "exclusive or" of fields treated as Booleans or as integers (where the logical operations operate bitwise on the values). The system could also be modified to maintain an estimate of the median value, or percentile values for particular percentile ranks (such as quartiles). A subtree fingerprint calculation can also be viewed as a kind of summary.

Alternatively, the summary information can be maintained incrementally as the tree is updated. For example, each parent's summary can be updated as soon as its child is updated. Alternatively, a parent's summary can be updated in a "lazy" fashion, waiting until the child is written to disk to update the parent. In this alternative case, when performing a query on the statistical summary, the system can walk the in-RAM part of the tree to calculate summary information, optionally updating the summary for the various nodes, and setting a Boolean to remember that the subtree has not been changed since the summary information was calculated.

To implement nested transactions, the system uses a different kind of leaf entry that comprises a stack of XIDs (described in more detail below). In this mode, transactions can be created, committed, and aborted. Given a transaction, operations can be performed within that transaction, including looking up values in the tree and inserting new values into the tree, and creating a child transaction. The child transaction is said to be inside the parent transaction. The system maintains a set of all the open transactions using an instance of an OMT. The set of open transactions can be held in another data structure, including but not limited to a hash table, using the least significant bits of the XID to select the hash bucket. Alternatively, one can implement implicit commits, and maintain the counters such as ndata_error_bound (3302) and ndata (3301) in a system with nested transactions.

Alternatively, one can reduce the number of accesses into the open-transaction set, for example, by employing an optimistic locking scheme. One implementation of such a scheme would be to maintain a global counter that is incremented every time a transaction begins, aborts, or commits. If the counter does not change between two XID look ups then the result can be assumed to be the same. If the counter does change, then another look up would be required. Another alternative is to record a pointer directly to the transaction record along with every XID, thus entirely avoiding the look up. Yet another alternative is to maintain a per-thread cache of recently tested XIDs that are known to be closed.

Nested Transactions

In a mode that implements nested transactions, the system operates as follows. A leaf entry comprises a key and a stack of transaction records. The bottom of the stack represents the outermost transaction to modify this leaf entry, the top of the stack represents the innermost transaction. Each transaction record comprises an XID and a value. The value in each transaction record is the value for the key if the transaction successfully commits. Each transaction also comprises some Boolean flags. When a transaction performs an insert, the new value is stored in the transaction record. When a transaction performs a delete, the value is replaced by a delete flag.

In this scheme each message (including but not limited to insert, delete, abort) contains the XID of the current transaction and also the XIDs of all enclosing transactions.

When a transaction aborts, an abort message is sent to every leaf entry modified by that transaction. When a transaction is committed, no messages are sent.

When a message arrives at a leaf entry, the list of transaction ids in the message is compared with the transaction records in the leaf entry to find the Least Common Ancestor (LCA). Any transactions in the leaf entry newer than the LCA could only be missing from the message if they had committed, so the system can promote the values in those transaction records to a committed state.

FIG. 34 shows an example of insertion with nested transactions (3401). In FIG. 34, $X_n$ is an XID, and k and j are keys, and $v_n$ is a value.

FIG. 35 shows the insert messages that are sent into the tree to the leaf entry with key k as a result of these transactions.

Each message contains the XIDs of the current transaction and of all enclosing transactions. For example, Transaction $X_3$ did not directly modify the entry at key k, so there is no message addressed to k with $X_3$ as its first XID. But the XID for $X_3$ is included in message (3504) because transaction $X_4$ is enclosed within $X_3$.

When these messages arrive at the leaf entry for key k, they are processed as shown in FIG. 36.

With the arrival of message (3501), the message contents are inserted into a new stack. The leaf contents (3601) mean that key k is now associated with the value $v_0$ and that if transaction $X_0$ successfully commits, then key k will have value $v_0$. Because there is no entry before the entry for transaction $X_0$, if transaction $X_0$ does not successfully commit then the leaf entry for key k will be destroyed.

After processing message (3502), the leaf entry stack reflects not only the value k it will have if $X_1$ commits successfully ($v_1$), but also the value it would have if transaction $X_1$ aborts but $X_0$ commits ($v_0$), as well as the value (none) if both $X_1$ and $X_0$ abort.

Upon processing message (3503), the system infers that transaction $X_1$ committed successfully by going up the list of enclosing transactions in message (3503) and comparing it with the list of enclosing transactions in leaf entry (3602). The system calculates that the LCA is transaction $X_0$. In the absence of an abort message, this implies that transaction $X_1$ committed successfully. Since transaction $X_1$ is now complete with $v_1$, the value that would be saved if $X_0$ were to commit successfully is now $v_1$. So the $v_1$ is copied from the stack entry for $X_1$ overwriting the value previously stored in the stack entry for $X_0$. This process of moving a value higher in the stack is called promotion.

Upon processing message (3504), two changes are made to the leaf. A new stack entry is created for transaction $X_4$ with a value of $v_4$, and a new stack entry is created for transaction $X_3$. Even though $X_3$ did not directly modify the value associated with this key, the enclosed transaction $X_4$ enclosed inside $X_3$ did. This is reflected in the stack of leaf entry (3604).

Figure 37:
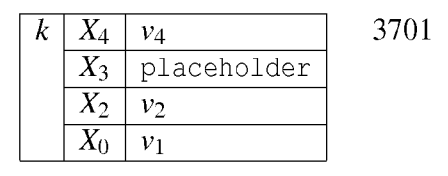

In this example, after processing message (3504), the stack of transaction records contains the value $v_2$ twice, once each for $X_2$ and $X_3$. The system employs a memory optimization to replace $v_2$ in the transaction record for $X_3$ with a placeholder flag, indicating that the value for transaction $X_3$ is the same as the value in the transaction record below it, in this case $X_2$. FIG. 37 shows a leaf entry (3701) representing the same information as leaf entry (3604), except that leaf entry (3701) contains a placeholder. Alternatively, the system could employ other representations the same information, including but not limited to creating a pointer to the same value instead of using a placeholder.

During a query, or look up of a key, the read lock for the leaf entry is not necessarily taken, since the system tests the lock after the read. If a transaction unrelated to the transaction issuing the query is writing to this leaf entry, then that unrelated transaction is open and the system does not implicitly promote the value. So any implicit promotions done during the query can be based solely on whether the transactions with XIDs that are recorded in the leaf entry are still open.

The system operates as follows when performing a look up. For every transaction in the leaf entry (starting with the innermost and going out), if the transaction is no longer open then implicitly promote it.

Each query is accompanied by a list of XIDs of all the enclosing transactions, similar to the stack of transaction ids that accompany each insert. The set of transaction ids is passed on the call stack as an argument to the query function, but it could be passed in other ways, for example as a message. While this list may not be sufficient to determine that a given transaction is definitely closed, it can prove that a transaction is still open. This information can be used as a fast test to determine whether a dispositive test is required. If a transaction is definitely open, then it is not necessary to look up its XID in the global set of open transactions.

FIG. 38 shows the same set of transactions as FIG. 34, except with a few queries added (3801)a.

FIG. 39 shows the state of the leaf after processing each message and query.

The query (3910) inside transaction $X_3$ is accompanied by the sequence of XIDs ($X_3$, $X_2$, $X_0$). When the query is processed, the XIDs in leaf entry (3903) are compared with the set of open transactions. Transaction $X_2$ is the innermost transaction in the leaf entry, so the system compares 1305 it with the list of XIDs accompanying the query message, and sees that $X_2$ is still open and no further action needs to be taken.

The query (3911) after the close of transaction $X_3$ is accompanied by the sequence of XIDs ⟨ $X_2$, $X_0$ ⟩. When the query is processed, the innermost XID $X_4$ of the leaf entry is compared with the sequence of transactions in the query message. Because $X_4$ is not in the sequence, it is possible that $X_4$ has committed, so the system examines the global list of open transactions. Since $X_4$ was committed, the system promotes the value for $X_4$ by copying it to the next inner transaction record (for $X_3$) and removing $X_3$. Then the system sees that $X_3$ was also committed because it is not in the global list of open transactions, so it promotes the value to the transaction record for $X_2$ (removing $X_3$). The system then sees that $X_2$ is still an open transaction and stops. At this point the value $v_4$ can now be found in the transaction record for $X_2$.

The query (3912) is performed after $X_0$ is committed, so when it is processed the set of open transactions is empty. The implicit promotion logic recognizes that transactions $X_2$ and $X_0$ have been committed and modifies the leaf entry to have only one transaction record marked as the committed value with a XID of zero. An XID of zero is the root transaction, and is shown as a "root" XID in both the query (3912) and the leaf entry (3907) of FIG. 39.

Deletes are handled in a manner that is similar to inserts. When a delete message arrives at a leaf entry, the same implicit promotion logic is applied as when an insert arrives. But instead of copying a value into the innermost transaction record, the system sets a "delete" flag.

Furthermore, if the next outer transaction record in the leaf entry is a delete, then the newly arrived delete is not recorded because no matter whether the transaction for the new delete is committed or aborted there will be no change to the leaf entry. The leaf entry will still be subject to to the delete issued by the enclosing transaction, and any query in this transaction (after the delete and before an insert) discovers no value. Alternatively, other approaches could be taken. For example the system could store transaction records for nested deletes and then remove up those records at a later time to facilitate the destruction of the leaf entry.

Also, if after the delete message is applied to the leaf entry, the only transaction record is a delete then the leaf entry is removed from the OMT. If the transaction is committed or if it aborts, the leaf entry will not exist, which can be represented by the absence of a leaf entry.

FIG. 40 shows an example of a set of transactions with insertions and deletions (4001). FIG. 41 shows how the operations of FIG. 40 are processed. The delete message (4110) modifies the leaf entry just as if it was an insert message, except that instead of a value in the transaction record there is a delete flag.

The arrival of message (4111) has no effect. It would be logically correct to add a transaction record $\langle X_4, \text{delete} \rangle$ on the top of the stack, but it is not necessary. Instead, the system leaves the leaf entry unchanged because if $X_4$ were to commit immediately after the arrival of message (4111), then it would look the same as if $X_4$ were to abort immediately after the arrival of the message. Also, any query issued within $X_4$ before the insert at Line 13 in FIG. 40 would find no value, with or without a transaction record for $X_4$.

When message (4112) arrives at the leaf entry, the leaf entry is destroyed. The implicit promotion logic causes the leaf entry to temporarily take on the value $\langle X_0, v_4 \rangle$, but then the transaction record for $X_0$ is modified to have a value of $\langle X_0, \text{delete} \rangle$. Since at that point the only transaction record is for a delete, the leaf entry can be destroyed.

The arrival of an abort message at a leaf entry, is similar to the arrival of an insert or delete, causing the implicit promotion of values set by transactions that have been committed. After performing that implicit promotion the system removes the transaction record for the aborted transaction in the leaf entry, and then removes any placeholders that are on the top of the transaction record stack.

FIG. 42 shows an example of a set of nested transactions where the innermost transaction aborts (4201). FIG. 43 shows how the operations of FIG. 42 are processed. With the arrival of message (4310), the transaction record for $X_4$ has been removed, leaving the placeholder for $X_3$ at the top of the stack. Then the placeholder for $X_3$ is removed, leaving the transaction record for $X_2$ at the top of the stack. Thus once $X_4$ is aborted, $X_2$ is the innermost transaction to have modified the leaf entry.

Alternatively, other variants of this strategy can be implemented. For example, when a transaction is committed, a message could be sent. As another example, if a message is sent whenever a transaction is committed, then the system can query the data without implicitly promoting leaf entries. As another example, the system could send commit messages when it is otherwise idle, in which case the system when querying would perform implicit promotion if needed.

Alternatively, the scheme can be adapted to support different isolation levels. For example, to support a read-uncommitted isolation level during a query the system can return the value at the top of the value stack if the top of the stack identifies a pending transaction.

Balancing

The system employs a parameter called the maximum degree bound, which is set to 32. If the number of children of n ever exceeds the maximum degree bound then the system splits the node in two. If two nodes are adjacent siblings (that is one is child i of a node and the other is child i+1 of the node) and the total number of children of two sibling nodes is less than half the maximum degree bound, then the system merges the two nodes.

Alternatively, the maximum degree bound could be set to some other number, which could be a constant or could be a function of some system or problem-specific parameters, or a function of the history of operations on the data structure, or a function of the sizes of the pivot keys, or according to other reasons. It may also vary within the tree.

When a nonleaf node has c children, numbered from 0 inclusive to c exclusive, then it can split a node in two as follows. The system allocates a new block number using the block translation table (3001). It moves the children numbered from c/2 inclusive to c exclusive to the new node, numbering them from 0 inclusive to c−c/2 exclusive in the new node. When moving a child, the buffer is moved too. The pivot keys, which are numbered from 0 inclusive to c−1 exclusive, are also reorganized. The pivot keys from c/2 inclusive to c−1 exclusive are moved, renumbering them from 0. Pivot key number c/2−1, called the new pivot, is removed from the old node, and is inserted into the pivot keys of the node's parent. If the node child number i of its parent, then the moved pivot key becomes numbered i in the parent, and the higher numbered pivot keys are shifted upward by one. If the node has no parent, then a new parent is created with a single pivot key. In the parent, the block number of the new child is inserted so that the new child is child number i+1 in the parent, and any higher numbered children are shifted up by one.

The buffer in the parent is also split. That is, if the parent existed, then the messages in buffer number i of the parent are removed from that buffer, and are copied into buffers i and i−1 as they would be during message execution in a nonleaf node. That is, each message is examined and if its key is less than or equal to the new pivot then it is copied into buffer i, and if its key is greater than or equal to the new pivot then it is copied into buffer i+1.

After splitting a node, the node may end up being larger than its target size. In that case, the system flushes some buffers. Alternatively, the system may wait until some future operation to flush some buffers.

After splitting a node, the parent node may have more children than the maximum degree bound. In that case, the system splits the parent. Alternatively, the system may wait until some future operation to split the parent.

When a leaf-node exceeds its target size, the system splits the leaf node creating a new node, and moving the greater half of the key value pairs to the new node. An appropriate pivot key is constructed which distinguishes between the lesser half and the greater half of the key values, and the pivot key and new node are inserted into the parent, and the corresponding buffer in the parent is split, just as for the case of splitting a nonleaf node. Similarly, if there is no such parent, then a new parent is created just as when splitting a nonleaf node.

To merge two nonleaf nodes that are adjacent siblings is essentially the opposite of splitting a node. If one node has $c_0$ children and is child i of its parent and the other node has $c_1$ children and is child i+1 then pivot key i in the parent is moved to be pivot key number $c_0$ in the first node, and the parent's higher numbered pivot keys shift down, and the pivot keys of the second node are set to be the pivot keys numbered from $c_0+1$ inclusive to $c_0+1+c_1$ exclusive. The child pointers and buffers from the second node are moved to the first node. And in the parent buffer i and buffer i+1 are merged together by dequeueing each item from buffer i+1 and enqueing it into buffer 1. Buffer i+1 is freed, and the buffer and child pointers are shifted downward.

To merge two leaf nodes that are adjacent siblings is similar. The parent node is changed in the same ways (merging buffers and shifting pivot keys, buffers, and child pointers down). The two children are merged by moving all the leaf entries from child i+1 to child i.

The now-unused child's block number is returned to the free list in the block translation table (3001).

After merging two nodes, the resulting node may be larger than the target size for that node. In that case system flushes buffers. Alternatively, the system may flush the buffers at a future time.

Alternatively, there are other ways of splitting and merging nodes. For example, the buffers that are to be split or merged may be flushed before the split or merge actually takes place.

Alternatively, there are other ways of implementing the tree. For example, the fanout and number of pivot keys in each node can be variable, and could depend on the size of the pivot keys. Some fixed amount of space could be dedicated to the pivot keys. For 1 MB blocks, this space could be between 1 KB and 4 KB, unless the pivot keys are larger than 4 KB. In this case, there might be only a single pivot key.

Alternatively, it is possible to place a maximum limit on the number of pivot keys, regardless of how small the keys are.

In each node the system keeps a counter of how many successive insertions have inserted at the rightmost edge of a node. When splitting a node, if that counter is more than half the number of leaf entries in the node, then instead of splitting the node in half, the system splits the node unevenly so that few or no leaf entries are moved into the new node. This has the effect of packing the tree more densely when performing sequential insertions.

Alternatively, the system can employ other ways of optimizing sequential insertions or other insertion patterns. For example, another way to detect sequential insertions is for the system to keep track of the last key inserted, and whenever an insertion is to the immediate left of the last insertion, and a node splits, the system splits the node just to the right of the last insertion. Furthermore, the system could keep a counter for each node, or for the whole tree, of how many successive insertions inserted just to the left of the previous insertion, and use that information to decide how to split a node. Similarly the system could detect and optimize for sequential insertions of successively smaller keys.

Alternatively, when merging nodes, the system could consider the node to the left or to the right of a node, and merge more than two nodes. The decision to merge could be based on a different threshold, including but not limited to that the combined size is less than 10% of a node's target size.

Alternatively, the system could adjust the target size of a node based on many factors. For example, the system could keep a time stamp on each node recording the last time that the node was modified. The system could then adjust the target size depending on the time since the node was modified.

Cursors

A cursor identifies a location in a dictionary. One way to identify a location is using the key-value pair stored in that location. A cursor can be set to the position of a given key-value pair, and can be incremented (moved to the next larger key-value pair) or decremented (moved to the next-smaller key-value pair) in the tree. The system employs Cursors to implement other query and update operations in the tree, as well as other functions, such as copying a tree for a backup.

The system implements cursors comprising:

1. A root-to-leaf path in the tree, where the cursor indicates one of the key-value pairs in that leaf. Multiple cursors are allowed to point to a single key-value pair in a given leaf node.
2. Each leaf node stores a set of all cursors pointing to key-value pairs in that leaf.

The root-to-leaf path for a cursor is stored as follows:
⟨ ⟨ root blocknum, child number ⟩,
⟨ nonleaf-node blocknum, child number ⟩,
. . .
⟨ nonleaf-node blocknum, child number ⟩,
leaf number ⟩

When the tree changes shape (e.g., because of tree-balancing operations) the system updates any affected paths.

A cursor points to leaf nodes that are in RAM. That is, a node containing a key-value pointed to by a cursor is pinned in RAM and is not ejected until the cursor is deleted or moves to another node.

The cursor implementation maintains the property that every buffer on the path of a cursor is empty. This means that setting a cursor to point to a given node triggers emptying of the buffers on the cursor's root-to-leaf path.

Each buffer maintains a reference count of the number of cursors that pass through that buffer. When the reference count of a buffer is nonzero, a message is sent directly to the child node of the buffer. When the reference count is nonzero, a message is stored in the buffer or passed down according to the buffer management rules outlined above.

Figure 9:
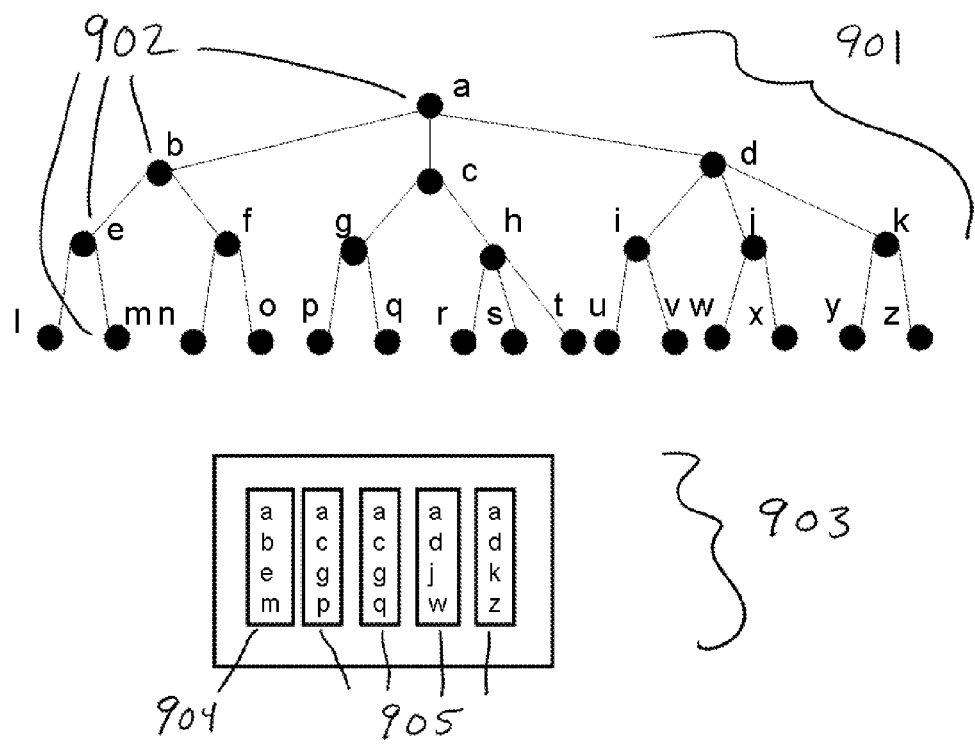
FIG. 9 depicts the structure of a path-based implementation of cursors.

FIG. 9 depicts a path-based implementation of cursors. The tree (901) storing all the data has depth four; there are 26 nodes, labeled with all the letters of the alphabet. There is a cursor dictionary (903) with five different cursor paths. The first cursor path (902, 904) is abem. There are four other cursor paths (905) stored in the cursor dictionary (903). Inserting a cursor causes a root-to-leaf path to be flushed, causing all of the elements pointed to by the cursors to be in the leaves.

Alternatively, there are other ways of implementing cursors. For example, rather than storing root-to-leaf paths, one could store the key-value pairs in an in-RAM dictionary. The cursor rootto-leaf paths are implicit, rather than explicit. The solution is efficient for enabling a node of the streaming dictionary to query whether any cursors travel through it by performing a query on the in-RAM dictionary. All cursor updates involve predecessor and successor searches in the dictionary. This solution also further decouples the paging from the cursors. The solution can be useful for cursors that operate on non-tree dictionaries.

Figure 14:
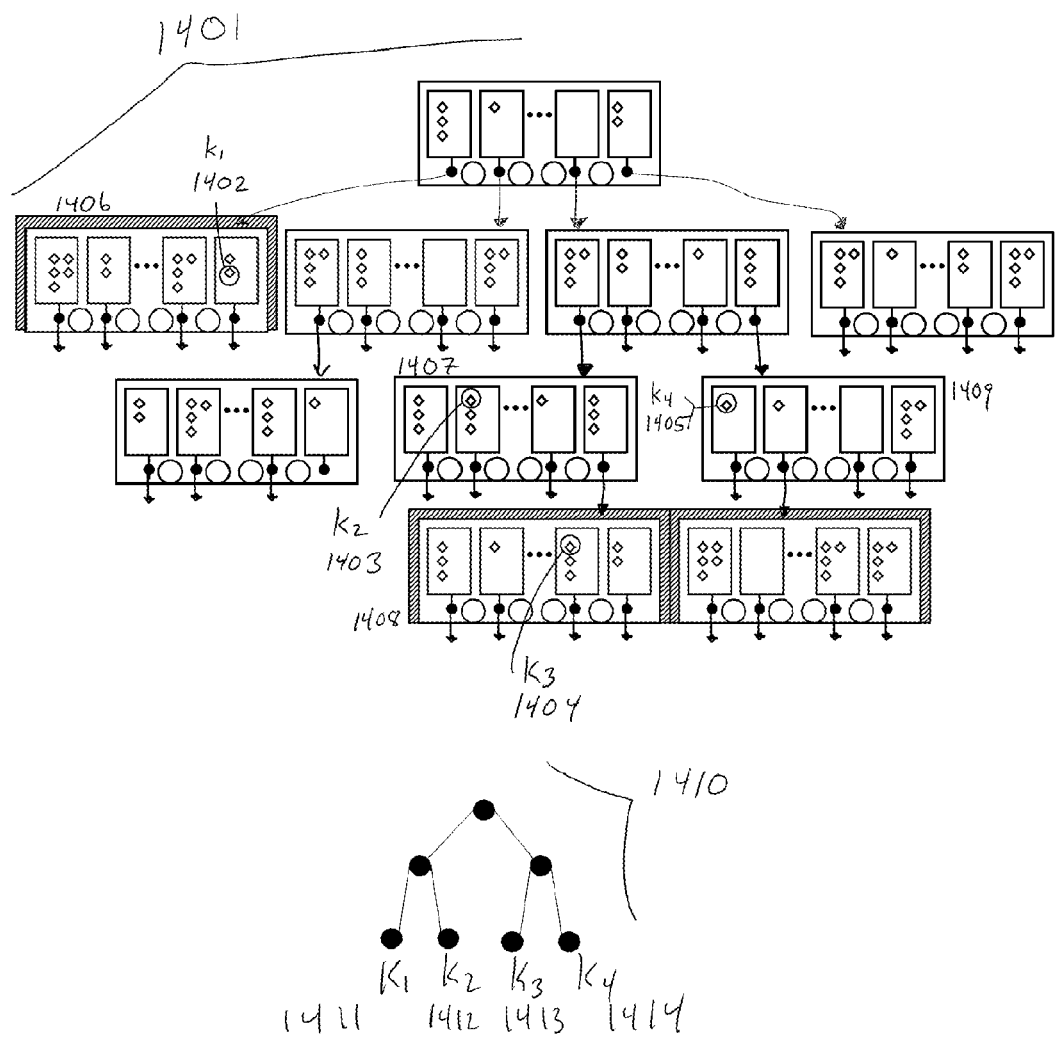
FIG. 14 depicts a key-value implementation of cursors.

FIG. 14 depicts an implementation of cursors in another mode of operation of the system. This cursor mode is implemented as key-value pairs in a smaller dictionary. The top part of the tree storing all of the elements is depicted above (1401). There are four cursors indicating key-value pairs $k_1$ (1402), $k_2$ (1403), $k_3$ (1404), and $k_4$ (1405). The cursors may indicate key-value pairs that are still in message form at nonleaf nodes in the tree. Moreover, the cursors may indicate key-value pairs in nodes that are paged out to disk. In particular, of the nodes indicated, those labeled (1406) holding $k_1$ and (1408) holding $k_3$ are paged out. In contrast, those labeled (1407) holding $k_2$ and (1409) holding $k_4$ are paged into RAM. Below is a small in-RAM dictionary (1410) storing key-value pairs $k_1$ (1411), $k_2$ (1412), $k_3$ (1413), and $k_4$ (1414). Only the keys need to be stored in this small dictionary. There are no pointers between the $k_i$s in the big streaming dictionary and the small in-RAM dictionary holding the cursors.

In another mode of operation, the a cursor is represented using a pointer at an OMT along with an index. The cursor also includes a pointer that points into the memory pool (1001) of the OMT, pointing at the key-value pair that the cursor is currently referencing. All of buffers are flushed on the root-to-leaf path from the root of the dictionary to the leaf node containing the OMT. The cursor provides a callback function to disassociate the cursor from the OMT. The callback function copies the key-value pair into a newly allocated region of RAM, and causes the cursor to stop referring to the OMT and the memory pool (1001). When the cursor is disassociated it contains a pointer to an allocated region of RAM containing the key-value pair. If any operation results in a message entering one of the buffers along the path, or if the OMT reorganizes itself in RAM, or if the pointer into the memory pool becomes invalid, or the pointer to the OMT or the index in the OMT become invalid, then the system invokes the dissociation callback function.

To advance the cursor, if the cursor is associated with an OMT, then the index is incremented, and the OMT is used to find the next value. If the cursor is disassociated, then the cursor finds the OMT by searching from the root of the dictionary down to a leaf, using an allocated copy in RAM, and then associates the cursor with the OMT. Whenever the cursor searches down the tree, it flushes the buffers it encounters.

To implement a point-query an associated cursor returns a copy of the key-value pair it points to. A disassociated cursor returns a copy of the allocated key-value pair it contains.

When a cursor searches, it operates as follows:
1. Let u denote the root node. First bring u into RAM, if it is not there already.
2. If u is a leaf-node, then look up the value in the OMT of leaf by finding the first value that is greater than or equal to the key-value pair being searched for. If looking for a matching key in a DUP database, then the system must skip any leaf entries that contain provisionally deleted values, and find the first non-deleted value. If that skipping proceeds off the end of the OMT, then the system sets u the parent, and tries to examine the next child of the parent. If there are no more children, then the system will return to the grandparent, and look at the next child, and so forth, in this way finding the next leaf node in the left-to-right ordering of the tree.
3. The system identifies the appropriate buffer and child of u where k may reside. To do so, identify the largest pivot key $p_i$ in that node less than or equal to key k.
4. If there is no such key, then proceed with the leftmost buffer and child of the root. Otherwise, proceed with the buffer immediately after pivot key $p_i$ and the child associated with that buffer. Now search in that buffer for a message M(k,z).
5. If there are messages in buffer i, then flush those messages to the next level of the tree. Flushing entails bringing the node for child i into RAM, and moving the messages into the appropriate buffers of the child.
6. The system sets u to the child i of u, and then proceeds to step 2.

Thus as a successor (or predecessor) query proceeds along a root-to-leaf search path, the system flushes each buffer that the search path travels through. Once the search path reaches the leaf, the smallest key just larger (or smaller) than k in the leaf is the successor (or predecessor), with appropriate care taken for boundary cases where k is the larger or smaller that all other keys in its leaf.

In more detail, when searching for k, the system first searches in the root $u_0$. The system compares pivot keys, identifying the appropriate buffer and child node $u_1$ to search next. The system flushes the buffer completely, and then searches in child node $u_1$. At that node, the system identifies the appropriate buffer and child node $u_2$ to search next, and so forth down the tree. When the leaf node $u_l$ is reached, the system inserts a cursor at an element in that node and scans forward and/or backward to return the predecessor and/or successor of k, visiting an adjacent leaf, as necessary.

Alternatively, there are other ways of satisfying predecessor and successor queries. For example, here is a way to do so in which buffers are not flushed. In the nonleaf nodes, the system could maintain a dictionary, including but not limited to a PMA (described below). The dictionary could store keys and messages so that successor/predecessor queries can be answered efficiently at each node. In effect, each logical cursor comprises a set of cursors, one at each node on the root-to-leaf path. A successor/predecessor query on the logical cursor comprises checking for a successor/predecessor at each node cursor and returning the appropriate value (which will be the minimum/maximum of the successors/predecessors so computed).

One way to satisfy range queries is by using cursors. To implement a range query between two keys $[k_1, k_2]$, first set a cursor to the key $k_1$, if it exists, and otherwise to the successor of $k_1$. Then increment the cursor, returning elements, until and element is found whose key is greater than $k_2$.

Alternatively, the system can employ any correct implementation of successor/predecessor queries to implement correct range query implementation. The system could avoid not flushing buffers when performing queries, or the system could always flush buffers when performing queries. Avoiding flushing buffers can be used when a query is read-only and do not change the structure of the tree. Alternatively, the system could preemptively flush all buffers affected by a query before answering the query.

Alternatively, range queries could be implemented in other ways. For example, the client could provide a function to apply to every key-value pair in a range, and so the system could iterate over the tree and the OMT data structures to apply that function. Some such functions admit a parallel implementation. For example, if the function is to add up all the values in the range, then since addition is associative, it can be performed in a tree-structured parallel computation.

Packed Memory Array Supporting Variable-Size Elements

In some modes of operation, the system can store key-value pairs in another dictionary data structure called a packed-memory array supporting variable-size elements (PMAVSE).

The packed memory array (PMA) data structure, is an array that stores unit-size elements in sorted order with gaps between the elements. A gap is an empty element in the array. A run of contiguous empty spaces constitutes a number of gaps equal to the length of the run. Let N denote the number of elements stored in a PMA. The value of N may change over time.

A PMA maintains the following density invariant: In any region of a PMA of size S, there are $\Theta(S)$ elements stored in it, and for S greater than some small value, there is at least 1 element stored in the region.

Note: the "big-Omega" notation is used similarly to the big-Oh notation described earlier. We say that f(n) is $\Omega(g(n))$ if g(n) is O(f(n)). The "big-Theta" notation is the intersection of big-Oh and big-Omega. f(n) is $\Theta(g(n))$ exactly when f(n) is O(g(n)) and f(n) is $\Omega(g(n))$.

Alternatively, a PMA could use both upper and lower density thresholds.

To search for a given record x in a PMA, the system uses binary search. The binary search is slightly modified to deal with gaps. In particular, if a probe of a cell in the array indicates that that array position is a gap, then the system scans left or right to find a nonempty array cell. By the density invariant, only a constant number of cells need to be scanned to find a nonempty cell.

Alternatively, there are other ways of searching within the array with gaps. For example, one might use a balanced search tree or any of a variety of search trees optimized for memory performance, including but not limited to a van Emde Boas layout, to index into the array. The leaves of the index could be associated with some cells of the array.

The system rearranges elements in a subarray in an activity called a rebalancing. Given a subarray with elements in it, a rebalancing of the subarray distributes the elements in the subarray as evenly as possible.

To insert a given record y into a PMA, the system first searches for the largest element x in a PMA that is less than y. If there is a gap in the array directly after x, then put y into this gap. If there is no gap immediately after x, then to make room for y, rebalance the elements in a certain subarray enclosing x.

To delete a given record x from a PMA as follows. First search for x and then remove it from a PMA, creating a new gap. Then scan the immediate neighborhood of x. If there are more than a certain number of gaps near x, then rebalance a certain subarray surrounding x.

If the entire PMA contains more than a certain number of elements then the system allocates a new array of twice the size of the old array, and copies the elements from the old array into the new array, distributing the elements into the array as evenly as possible. The old array is then freed.

Alternatively, the new array could be some other size rather than twice the size of the old array. For example the new array could be 3/2 the size of the old array.

If the entire PMA contains fewer than a certain number of elements then the system allocates a new array of half the size of the old array, and copies the elements from the old array into the new array, distributing the elements into the array as evenly as possible. The old array is then freed.

Figure 44:
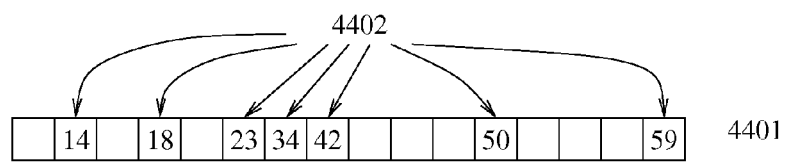
FIG. 44 depicts an example of a packed memory array.

FIG. 44 shows an example of a PMA (4401) containing 16 array positions and seven values (4402) distributed across the array.

Figure 45:
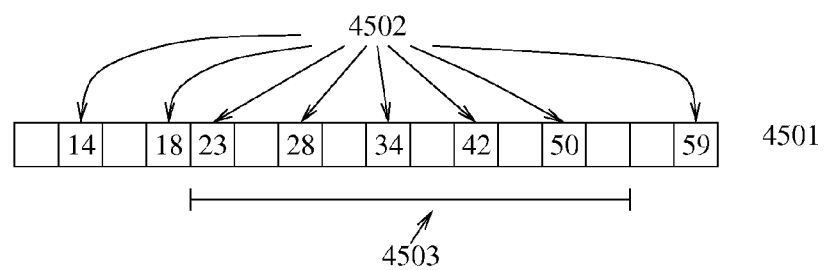
FIG. 45 depicts an example of the PMA from FIG. 44 after an additional key has been added and a subarray has been rebalanced.

FIG. 45 shows the same PMA from FIG. 44 into which an additional key (4502) with value equal to 28 has been inserted. There are now eight keys (4502) stored in the PMA. In order to make room for value 28, a region (4503) of the PMA was rebalanced, and the enclosed keys were distributed evenly.

The system sometimes rebalances so that there are additional gaps near areas that are predicted to have many insertions or few deletions in the future, and places fewer gaps near areas that are predicted to have fewer insertions or more deletions in the future.

The following terminology is used to describe the workings of a PMA in our system.

A subarray of a PMA is called a window. If W is a window then the following definitions apply.

1. Define $Capacity(W)$ = number of array cells in $W$.

2. Define $NumElements(W)$ = number of filled array cells in $W$.

3. Define $Density(W) = \dfrac{NumElements(W)}{Capacity(W)}$

When the array gets too sparse or too dense, it is either grown or shrunk by the factor of G, where G=2.

A smallest subarray that is involved in a rebalance is called a parcel. That is, an insertion that causes a rebalance must affect at least one parcel. The size of a parcel is P.

The parameter A denotes the size of the entire array. That is, A=Capacity (entire PMA).

The maximum and minimum allowed densities of a PMA are denoted D(A) and d(A), respectively.

The maximum and minimum densities allowed in any parcel are denoted D(P) and d(P), respectively.

Several relationships between parameters are maintained.

$$D(A) \geq G^2 \cdot d(A) \qquad 1.$$

This inequality says that if the elements are recopied from one array (at density D(A)) into a larger array, then the new larger array has density a factor of at least G larger than d(A) and a factor of at least G smaller then D(A). The same holds true if the elements are recopied from one array (at density d(A)) into a smaller array.

$$d(P) < d(A) < D(A) < D(P) \geq 1 \qquad 2.$$

$$P = \Theta(\log(A)). \qquad 3.$$

Alternatively, these parameters can be set to favor certain operations over others.

A rebalance window has an upper density threshold and a lower density threshold, which together determine the target density range of a given window. The density thresholds are functions of the window size. As the window size increases, the upper density threshold decreases and the lower density threshold increases.

When A is a power of two, the system can calculate density thresholds as follows.

$$G=2$$

$$P=2^c$$

$$A=2^{c+h.}$$

where c=Θ(loglogA) and h=(1 gA)−c, where 1 gA denotes the log-base-two of A.

Thus for various values of l the parameters are set as follows:

$$D(2^c 2^l) = (D(A) - D(P))\left(\frac{l}{h}\right) + D(P)$$

$$d(2^c 2^l) = (d(A) - d(P))\left(\frac{l}{h}\right) + d(P)$$

Consider a PMA having the following basic parameters:

$$G=2$$

$$A=512$$

$$P=16$$

$$D(P)=1.0$$

$$D(A)=0.5$$

$$d(A)=0.12$$

$$d(P)=0.07$$

The minimum and maximum density thresholds of subarrays are set as follows:

$$D(P)=D(2^3)=1.0$$

$$D(2^4)=0.9$$

$$D(2^5)=0.8$$

$$D(2^6)=0.7$$

$$D(2^7)=0.6$$

$D(A)=D(2^8)=0.5$ $d(A)=d(2^8)=0.12$ $d(2^7)=0.11$ $d(2^6)=0.1$ $d(2^5)=0.09$ $d(2^4)=0.08$ $d(P)=d(2^3)=0.07$

It can be verified that all above properties hold.

For arbitrary values of G>1 the density thresholds of an window of size W are set as follows:

$$D(W) = (D(A) - D(P))\left(\frac{lg(W/P)}{lg(A/P)}\right) + D(P)$$

$$d(W) = (d(A) - d(P))\left(\frac{lg(W/P)}{lg(A/P)}\right) + d(P)$$

A window is said to be within threshold if the density of that window is within the upper and lower density thresholds. Otherwise, it is said to be out of threshold.

An insertion of an element y into a PMA proceeds as follows. First, search for the element x that precedes y in the PMA. Then check whether the density of the entire array is above threshold. If so, recopy all the elements into another array that is larger by a factor of G. Otherwise check whether there is an empty array position directly after element x, and if so, insert y after x. Otherwise, rebalance to make space for y as follows. Choose a window size W to rebalance as follows. Choose a parcel that contains x, and consider the parcel to be a candidate rebalance interval. If that candidate is within threshold, then rebalance, putting y after x during the rebalance. If not, then arbitrarily grow the left and right extents of the candidate until the candidate is within threshold. Then rebalance, putting y after x during the rebalance.

A deletion of an element x proceeds as follows. First, search for the element x in the PMA and remove it. Then check whether the density of the entire array is below threshold. If so, then recopy all the elements into another array that is smaller by a factor of G. Otherwise choose a parcel that contained x, and call it a candidate rebalance interval. If the candidate is within threshold then the deletion is finished, otherwise grow the left and right extents of the candidate until the candidate is within threshold. Then rebalance the candidate.

Alternatively, there are many ways to choose candidate rebalance intervals. For example, the candidates could be drawn from a fixed set (e.g., the entire array, the first and second halves, the four quarters, the eight eighths, and so forth). Another example is to choose the rebalance window so that all the elements all move in the same direction (e.g., to the right) during the rebalancing.

Alternatively, there are several ways to implement a rebalance in-place. One way is to compress all the elements to one end of the rebalance interval and then put them in their final positions. This procedure moves each element twice.

The rebalance can also be implemented so that each element only moves once. The system divides the rebalance window into left-regions and right-regions. In a left region the initial position of the element is to the right of the final position and needs to be moved left. A right region is defined analogously. For each left region, move each element directly to its final position starting from the leftmost element. For each right region, move each element directly to its final position starting from the rightmost element.

Now we explain how a PMAVSE operates. A PMAVSE supports elements that can have different sizes and also supports cursor operations and a cursor set.

The PMAVSE comprises the following elements:
1. Cursor set—The set of cursors is stored as an unsorted array.
2. Record array—The record array is a PMA. Each element in this record array comprises two or more pointers and a small amount (also unit size) of auxiliary information. Each element thus has unit size. Each element in the record array represents a key-value pair stored in the PMAVSE. Specifically, the record array stores the following:
   (a) A pointer to the key $p_i.k$ and the length of key $p_i.k$. The pointer points to a particular location in another array, called the key array, in which the actual key is stored.
   (b) A pointer to the value $p_i.v$ and the length of the value. The pointer points to a particular location in another array, called the value array, in which the actual value is stored.
   (c) A flag indicating that the record has been deleted, but that there still exists one or more cursors pointing to the record. The record remains stored in the PMAVSE until all cursors point elsewhere.
3. Key array—The keys are stored in a PMA-type structure, modified to support different-length keys. The lower-bound density thresholds are set to zero as $d(A)=d(P)=0$.
4. Value array—The keys are stored in a PMA-type structure, modified, as with the key array, to support different-length keys. The lower-bound density thresholds are set to zero as $d(A)=d(P)=0$.

To search in the PMAVSE, perform a binary search on the record array. This binary search 1705 involves probes into the key array. To perform the binary search for a given key-value pair, $p_j$, use the record array to find the middle element. Call the middle element $p_i$. Then, use the key array to compare $p_j.k$ with $p_i.k$.

To perform an insert of a key $p_j.k$ once the predecessor key $p_i.k$ has been found, insert the new key into the key array and the new value into the value array. It remains to explain how to perform these new insertions, because the keys and values have variable lengths.

Insertions into the key and value arrays use the same computation, except for the minor differences between storing keys and values. The description here is for the key array. For example, in the system all keys can be divided into bytes, which are used as a unit-length chunk.

The system divides the keys into unit-length chunks. Each unit-length chunk is inserted or deleted independently. This representation, where keys are split into independent unit-length chunks, is called here a smeared representation. A rebalance in the smeared representation is called here a smeared rebalance.

Figure 5:
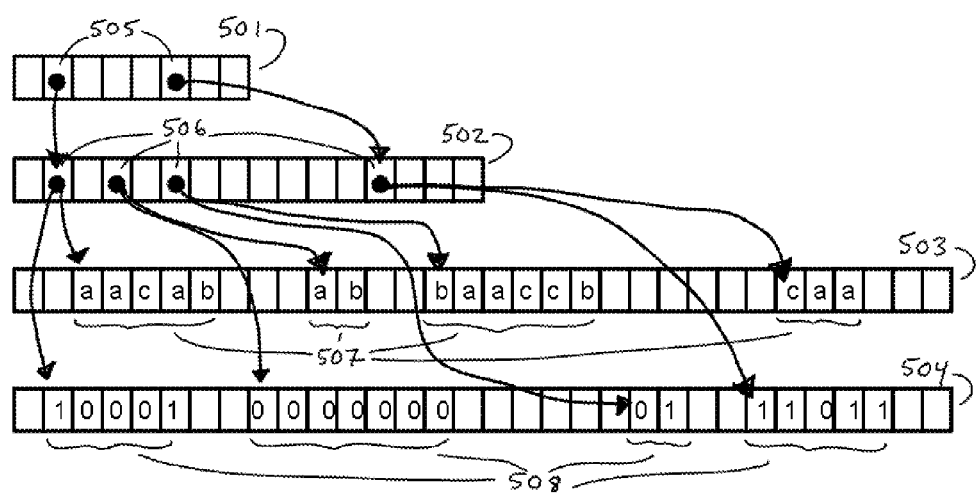
FIG. 5 depicts the structure of a packed-memory array supporting variable sized elements (PMAVSE).

Refer to FIG. 5 for an example of a PMAVSE. The first array from the top is the cursor set (501). The second array from the top is the record array (502). The third array from the top is the key array (503). The fourth array from the top is the value array (504). The cursor set stores two cursors (505), which indicate two of the four records 506 in the record array (502). There are four keys (507) stored in the key array, aacab, ab, baaccb, and caa. There are four values (508) stored in the record array, 10001, 0000000, 01, and 11011. The records, keys, and values are stored in sorted order, based on the keys.

The PMA insertion, deletion, and rebalance computations can be thus be used. To read keys and to perform functions including but not limited to string comparison on the keys, the system regroups key chunks together, with the gaps removed.

The system can also store different-length keys without splitting the keys into chunks. Instead, each key is stored in a single piece. This representation is called here a squished representation.

The system rebalances the PMA as follows. Find the appropriate rebalance interval. Proceed as in a PMA using smeared representation—grow a rebalance interval until it is within threshold. Then rebalance the elements in the smeared representation. Then squish the elements, i.e., store the unit-size chunks continuously, that is, with no gaps in between chunks. This rebalance of the elements in the smeared representation can be performed implicitly or explicitly.

Squish the gaps as follows. If the entire element is contained in the rebalance interval, then squish the smeared key evenly from both sides so that half of the gaps go before the squished element and half go after (up to a roundoff error if there is an odd number of chunks).

Figure 6:
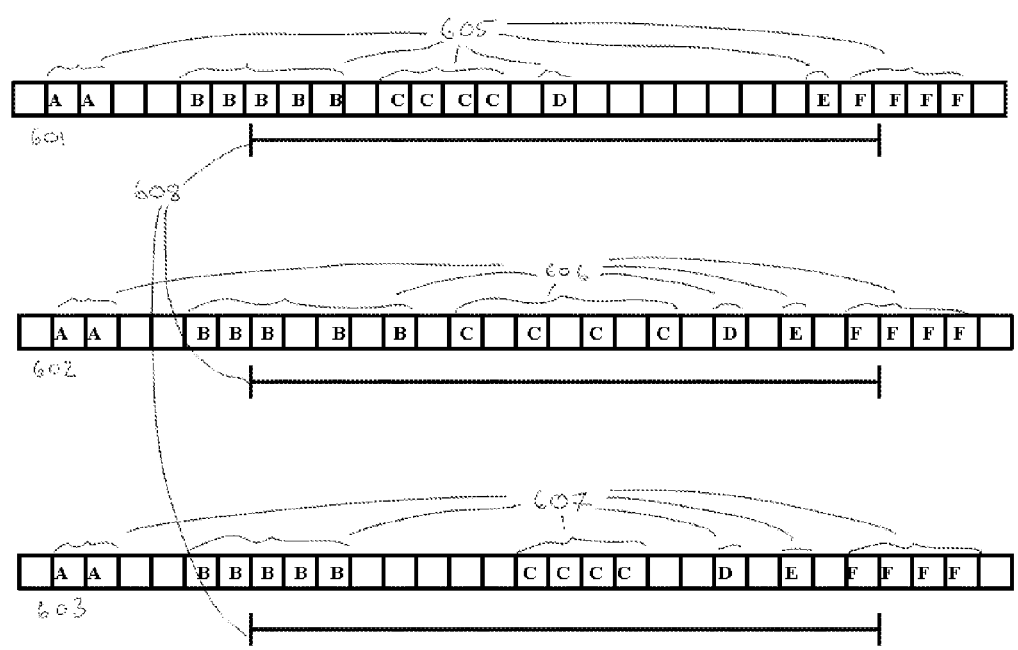
FIG. 6 depicts the structure of a smeared and squished representations of a PMAVSE.

Refer to FIG. 6 for an example of how to rebalance in the smeared and squished representations. The top array is a key array before a rebalance in the squished representation (601). The middle array is the key array after a rebalance in the smeared representation (602). The bottom array is the key array after a rebalance in the squished representation (603). The rebalance interval is indicated in all three arrays (608). There are six keys being rebalanced, AA, BBBBB, CCCC, D, E, and FFFF. Consider element CCCC which in the unbalanced array (601), is partially smeared (605). In the smeared representation (602), the element CCCC (606) is smeared into four chunks, with gaps between each chunk. In the squished representation (603), the gaps are squeezed out of the element (607), with roughly half before and half after. If only part of the element is in the rebalance interval then that element is not moved. Thus, all of the gaps are squeezed out on the size contained in the rebalance interval. See element BBBBB in the smeared representation (602). Only three chunks from this element are in the rebalance interval. Consequently, all of the gaps have to be squished out to the right, so that the element contains no gaps.

The smeared rebalance can be performed implicitly, rather than explicitly. An element that is only partially located within the rebalance interval does not move at all. To move an element that is entirely contained in a rebalance interval, place the middle unit-size chunk, or middle two unit-size chunks in the placement of the smeared representation. Next, place the rest of the chunks so that all the gaps are squeezed out.

The PMA stores a set of cursors. The system stores the cursors unordered in an array.

Whenever an element in the PMAVSE shifts around, all cursors pointing to that element are updated. This update involves a scan through the cursor set every time there is a rebalance. An element is not removed from the PMAVSE while there are one or more cursors pointing to it. Instead, the element remains in the PMA with a flag indicating that it has been deleted. Eventually, when no cursors point to the element, it is actually removed.

Alternatively, there are other data structures for storing cursors. For example, the cursors could be stored in an ordered list where the elements have back pointers to the cursor list. Then each element would contain a list of pointers to the cursors at that element. This representation guarantees that one never has to traverse many cursors to find all cursors that have to be updated on a rebalance.

Alternatively, the cursors could also be stored in any dictionary structure, including but not limited to a sorted linked list, a balanced search tree, a streaming disk-resident dictionary, or a PMA, ordered by the elements that they point to, with no back pointers.

File Header

The system stores each dictionary in a file. At the beginning of the file are two headers, each of which comprise a serialization comprising 1. a literal string "tokudata",
2. a version number,
3. a number indicating the size of the header, stored in a canonical order (most significant byte first),
4. a check sum,
5. a number used to determine whether the system is storing data in big-endian or little-endian order, or some other order,
6. a number indicating how many checkpoints are stored
7. an offset in the file at which a block translation table (BTT) is stored,
8. a number indicating the disk block number of the root of the tree,
9. a number encoding the LSN of the operation that most recently modified the tree rooted at the tree, and
10. a string that encodes dictionary-specific data (including but not limited to the type of each column in the dictionary).

The root block number along with the BTT provide information for an entire tree. The root block number can be translated using the BTT to a segment. The segment in turn may contain block numbers of children, which are translated by the BTT. Two completely different trees may be referred to by different headers, since the BTTs may map the same block numbers to different segments, and the two trees may share subtrees (or the entire trees may be the same), since their respective BTTs may map the same block number to the same segment.

Alternatively, multiple dictionaries can be stored in one file, or a dictionary can be distributed across multiple files, or several dictionaries can be distributed over a collection of files. For example, for implementations that use multiple files for one or more dictionaries, the block translation table can store a file identifier as well as an offset in each block translation pair of a block translation array (3009).

Alternatively, more than two headers can be employed. For example, to take a snapshot of the system, a copy of the BTT and header can be stored somewhere on disk, including but not limited to in a third header location. The system could maintain an array of headers to manage arbitrarily many snapshots.

Buffer Pool

The system employs a buffer pool which provides a mapping between the in-RAM and on-disk representations of tree nodes. When a node is brought into RAM, it is pinned. When a node is pinned, it is kept in RAM until it is unpinned. Pinning a node is a way of informing the system to keep a node in RAM so that it can be manipulated. A node can have multiple simultaneous pins, since multiple functions or concurrent operations can manipulate a tree node.

To pin a node in RAM, the system first checks whether that node is already in the buffer pool and if not, bring it into RAM. Then the system updates a reference count saying how many times 1810 the node has been pinned. A node can be removed from RAM when the reference count reaches zero.

When a node is transferred from disk into RAM, the size of the in-RAM representation is calculated. Then the system constructs the in-RAM representation of the node.

The buffer pool provides a function getandpin which given a block number pins the conesponding node in RAM, bringing it into RAM if it is not already there.

The buffer pool also provides a function maybegetandpin, which pins the node only if it is already in RAM. The system employs maybegetandpin to decide whether to move data from one node to another depending on whether the second node is in RAM.

The system also employs maybegetandpin to control aggressive promotion. In one mode, the system aggressively promotes messages into any in-memory node. In another mode, the system aggressively promotes messages only to dirty in-memory nodes.

When the total size of the nodes in RAM becomes larger than the buffer pool's allocated memory, the system may evict some nodes from RAM. The system can evict the least recently used unpinned node from the buffer pool. To evict a node, the node is deleted from RAM, first writing it to disk if the node is dirty.

A node, block, or region of RAM is defined to be dirty if it has been modified since being read from disk to RAM.

Alternatively, there are other ways to optimize the page-eviction strategy in the buffer pool. The decision of which node to unpin can be weighted by one or more factors, for example, the size of the node, the amount of time that the node has been ready to be ejected, the number of times that the node has been pinned, or the frequency of recent use.

A Buffer Pool (4601) is a structure comprising
1. n_in_table (4602), a number indicating how many nodes are stored in the buffer pool;
2. table (4603), an array of pointers to pairs (each array element is called a bucket, and the table itself acts as a hash table);
3. table_size (4604), a number indicating how many buckets are in the table;
4. lurlist (4605), a doubly linked list threaded through the pairs, ordered so that the more recently used pairs are ahead of the less recently used pairs;
5. cachefile_list (4606), a list of pointers to cachefiles;
6. size (4607), a number which is the sum of the in-RAM sizes of the nodes in the buffer pool;
7. size_limit (4608), a number which is the total amount of RAM that the system has allocated for nodes;
8. mutex (4609), a mutual exclusion lock (mutex);
9. workqueue (4610), a work queue; and
10. checkpointing (4611), a Boolean which indicates that a checkpoint is in progress.

A buffer pool pair is a structure comprising
1. a pointer to a cachefile;
2. a block number;
3. a pointer to the in-RAM representation of a node;
4. a number which is the size of the in-RAM representation of the node;
5. a Boolean, dirty, indicating that the node has been modified since it was read from disk;
6. a Boolean, checkpoint_pending, indicating that the node is to be saved to disk as part of a checkpoint before being further modified;
7. a hash of the block number;
8. a pointer, hash_chain which threads the pairs from the same bucket into a linked list;
9. a pair of pointers, next and prev, which are used to form the doubly linked list ordered by how recently used each node is;
10. a readers-writer lock; and
11. a work list comprised of work items, each item comprising a function and an argument.

A cachefile is organized so that it is in one-to-one correspondence with the open dictionaries. A cachefile is a structure comprising
1. ref count, a number, called a reference count, which is incremented every time a dictionary is opened, every time a rollback entry is logged, and any time any other use is made of the cachefile to prevent the cachefile from being closed until all uses of the cachefile have finished;
2. fd, a number which is a file descriptor for the file that holds the on-disk data;
3. filenum, a number which is used to number files in the recovery log;
4. fname, a string which is the name of the file;
5. a pointer to the header for the file;
6. a pointer to the BTT for the dictionary;
7. a pointer to the CBTT for the dictionary; and
8. a pointer to the TBTT for the dictionary.

A work queue is a structure comprising
1. a doubly linked list of work items;
2. a condition variable called wait_read;
3. a number called want_read;
4. a condition variable called wait_write;
5. a number called want_write;
6. a Boolean indicating that the work queue is being closed; and
7. a number which counts the number of work items in the list.

To enqueue a work item onto a work queue, the system performs the following operations:
1. Lock the work queue.
2. Increment the counter.
3. Put the work item into the doubly linked list.
4. If want_read>0 then signal the wait_read condition.
5. Unlock the work queue.

To dequeue a work item from a work queue, the system performs the following operations:
1. Lock the work queue.
2. While the work queue is empty and the Boolean indicates that the queue is not closed
   (a) Increment want_read.
   (b) Wait on the wait_read condition.
   (c) Decrement the want_read.
3. Decrement the counter.
4. Remove a work item from the doubly linked list.
5. Unlock the work queue.

In some cases the locking and unlocking steps are be skipped. For example, if the work queue is being filled before any worker threads are initialized.

When a buffer pool is created, a set of worker threads is created. Each thread repeatedly dequeues a work item from the work queue (waiting if there are no such items), and then applies the work item function to the work item. In some cases, the system decides that there is a large backlog of work items, and prevents additional writes into the buffer pool, using the want_write condition variable.

In some cases a thread writes a node to disk directly. In other cases, a thread schedules a node to be written to disk. For example, when reading one node, if the buffer pool becomes oversubscribed, the system schedules the recently used node to be written to disk by enqueuing a work item. That enqueued work item, when run, obtains a writer lock on the pair, and writes the node to disk.

When a dictionary is open in the buffer pool, a cachefile is associated with the dictionary. When a dictionary is opened, the system find the currently associated cachefile (in which case the reference count is incremented), or creates a new cachefile. In the case where a new cachefile is created, the system opens a file descriptor, and stores that in the cachefile. The system stores the file name in the cachefile. The system allocates a file number, and logs the association of the file number with the path name. If the file exists, then the header is read in, a header node is created, and the pointer to the header is established. If the file does not previously exist, a new header is created.

When a dictionary is closed, the reference count is decremented. When the reference count reaches zero, the system
1. flushes any pairs that belong to that cachefile, writing them into the file;
2. waits for any pairs in the work queue to complete;
3. writes the header to the file;
4. removes the cachefile from the linked list of cachefiles;
5. closes the file descriptor;
6. deallocates the RAM associated with the cachefile; and
7. performs any additional housekeeping that is needed to close the cachefile.

To perform a getandpin operation of a node, the system computes a hash on the block number, and looks up the node in the hash table. If the node is being written or read by another thread, the system waits for the other thread to complete. If the node is not in the hash table, the system reads the node from disk, decompressing it, and constructs the in-RAM representation of the node. Once the node is in RAM, the system modifies the least-recently-used list, and acquires a reader lock on the pair. If the checkpoint_pending flag is TRUE, then system
1. writes the node to disk (updating the BTT),
2. also updates the temporary BTT used for the node's dictionary, (the temporary BTT is created, for example, during a checkpoint), and
3. sets the checkpoint_pending to FALSE before returning from getandpin.

If the buffer pool hash table ever has more nodes in the buffer pool than there are buckets in the hash table, the system doubles the size of the hash table, and redistributes the values. Each pair p has a hash value h(p) stored in it. If the length of the table is n, then p is stored in bucket h(p) mod n.

When storing a node n from cachefile c that was previously not in the buffer pool, a buffer pool pair is created pointing at c and n. The pair is initialized to hold the block number of the node. The dirty bit is initially set to FALSE if the node is being read from disk, and set to TRUE if the node is being created for the first time (not previously on disk). The hash of the block number is stored, and the node is put at the head of the least-recently-used list. And the node is inserted into the appropriate bucket in the hash table.

For each nonleaf node in RAM, the system maintains the hashes of the each of the nodes' children (in childfullhash (2614)), which can help to avoid the need to recompute the hash function on the node.

Alternatively, the system could use different buffer-pool constructions. For example, the system could build a buffer pool based on memory mapping (e.g., the mmap( ) library call), or instead of using a hash table, an OMT could be used.

In some modes of operation the system maintains the invariant that if a node is pinned then its parent is pinned. The system maintains this invariant by keeping a count of the number of children of a node that are in RAM, and treating any node with a nonzero count as pinned. The children can maintain a pointer to the in-RAM representation of the parent.

Whenever the tree's shape changes (for example when a node is split) the counters and the parent pointers are updated.

This invariant can be useful when updating fingerprint and the estimates of the number of data pairs, the number of distinct keys, and the number of data pairs. The estimates are propagated up the tree when just before a node is evicted, rather than on every update to the node.

In some modes of operation, the system propagates data upward every time any node is updated, and does not need to maintain the invariant at all times, but only needs to maintain the invariant when a child node is actually being updated.

Data Descriptors

The system employs a byte string called a data descriptor that describes information stored in a dictionary. The descriptor comprises a version number and a byte string. Associated with each dictionary is a descriptor.

The system uses descriptors for at least two purposes.
1. For comparison functions. The system uses the same C-language function to implement comparisons in different dictionaries. The C-language function uses the descriptor associated with a dictionary two compare two key-value pairs from that dictionary. The descriptor includes information about each field in a key. For example, the descriptor could contain information that the first field of a key is a string which should be sorted in ascending order, and the second field is an integer which should be sorted in descending order.
2. For generated derived rows. In one mode, the system maintains at least two dictionaries. One dictionary is a primary dictionary, and a second dictionary is a derived dictionary. For each key-value pair in the primary dictionary, the system automatically generates a key-value pair for the derived dictionary. For example, if a primary dictionary pairs comprise a first name, a last name, and a social security number, then in a secondary dictionary the pairs might comprise the social security number then the last name.

Thus a descriptor describes the types and sort order for each field in a key-value pair, and for derived dictionaries, a descriptor further describes which fields from a primary row are used to populate a derived row.

The system upgrades descriptors incrementally. The system organizes each dictionary into one or more nodes. Each node contains the version number of the descriptor for rows stored in that node. If the users of the system need to change the descriptor for a dictionary, the old descriptor and the new descriptor are both stored in the header of the dictionary. When a node is read in, if the descriptor version for that node is an old version, then the system calls a user-provided upgrade function to upgrade all the pairs stored in that node.

On-Disk Encoding and Serialization

To write data to disk, the system first converts a node into a serialized representation (an array of bytes), in much the same way that messages are converted into an array of bytes. Then the data is compressed. Then a node header is prepended to the compressed data, and the node header and compressed data are written to disk as a single block.

A node, as written to disk, comprises the following serialized representation:
1. a literal string "tokuleaf" or "tokunode" depending on whether the node is a leaf node, or a nonleaf node;
2. a number indicating which file version the node is, which can facilitate changing the encoding of a block in future versions and can facilitate the reading of older versions of the block;
3. the dictionary's descriptor version;
4. nodelsn (411);
5. the compressed length of the compressed subblock that follows;
6. the uncompressed length of the compressed subblock that follows;

7. a compressed subblock, comprising the following information, that is then compressed as a block as
   (a) a target size of the node (which defaults to 4 megabytes),
   (b) isdup (403),
   (c) height (405),
   (d) randfingerprint (406), and
   (e) localfingerprint (407).

For leaf nodes, the statistics (414) can be represented on disk by recalculating all the values as the leaf node is read in from memory. That is, the system can encode a leaf nodes statistics using no bits on disk.

After the localfingerprint (407), leaf nodes are additionally serialized by encoding
1. the number of leaf entries in the node, and
2. for each leaf entry, from least to most in sorted order, the serialized leaf entry.

After the localfingerprint (407), nonleaf nodes are additionally serialized by encoding
1. statistics (414), which are encoded by
   (a) a number ndata (3301),
   (b) a number ndata_error_bound (3302),
   (c) a number nkeys (3303),
   (d) a number nkeys_error_bound (3304),
   (e) a number minkey (3305),
   (f) a number maxkey (3306), and
   (g) a number dsi ze (3307);
2. the subtree fingerprint, which is the sum of the fingerprints of the children; and
3. the number of children.
4. For each child the nonleaf nodes further encode
   (a) the subtreefingerprint (2611) of the child,
   (b) the stored statistics for child, encoded as for the node statistics (414) in Item 1 above,
   (c) the block number of the child,
   (d) the FIFO buffer of the child, represented by
      i. the number of entries in the FIFO buffer,
      ii. for each message in the FIFO buffer, from oldest to newest, the serialized representation of the message.
5. For each pivot key the nonleaf nodes further encode
   (a) the key of the pivot key (encoded as a length followed by the bytes of the key), and
   (b) for DUP dictionaries the value of the pivot key (encoded as a length followed by the bytes of the key).

After the previously encoded information, each node further encodes a checksum for the all of the data including the uncompressed node header and the compressed subblock. This checksum is computed on the compressed subblock before the data is compressed, so that the system can verify the checksum after the data has been decompressed after beginning read from disk. The checksum is the end of the compressed block.

Alternatively, data can be represented on disk in other ways. For example minkey (3305) can be eliminated from the on-disk representation if the system takes care to make sure that the pivot keys actually represent a value present in the left subtree.

In one mode of operation, the system compresses blocks using a parallel compression computation. In this case, instead of storing the compressed length and uncompressed of the subblock, the system divides the subblock into N sub-subblocks, and stores the value N. Each subsubblock can be compressed or decompressed independently by a parallel thread. The compressed and uncompressed lengths of the subsubblocks are stored.

Alternatively, the system can choose how much processing time to devote to compression. For example, if the system load is low, the system can use a compression computation that achieves higher compression.

In one mode, the system adaptively increases the target size of nodes depending on the effectiveness of compression. If a block has never been written to disk, the system sets the block target size to 4 megabytes (4 MB). When a block is read in, the system remembers the compressed size. For example, if the block was 3 MB of uncompressed data and required 0.5 MB after compression, then the block was compressed at 6-to-1, and so the system increases the target size from its default (4 MB) by a factor of 6 to 24 MB. When a block is split, both new blocks inherit the compression information from the original block. If later data is inserted that has more entropy, then when the data is written to disk, a new compression factor is computed, and the block will be split at a smaller size in future splits.

Alternatively, the system could use other ways to implement compression, depending on the specifics of the node representations. For example, each leaf entry or message could be compressed individually. Alternatively, the leaf entries or messages could be compressed in subblocks of the node. If the dictionary is used in a database organized as rows and columns, the keys and values may have finer structure (including but not limited to fields that represent columns). In such a case, a system can separate the fields and store like fields together before compressing them.

Alternatively, other representations of tree nodes could be used. For example, the data could be stored in compressed and/or encrypted form on disk. The data can be stored in a different order. The target node size need not be 4 MB or even any particular fixed value. It need not be constant over the entire tree, but could depend on the particular storage device where the node is located, or it could depend on other factors such as the depth of the node within the tree.

Alternatively, there are other ways of building in-RAM representations, permitting fast searches and updates of key-value pairs in nodes and nodes' buffers. For example, instead of using a FIFO queue in each buffer, one could use a hash table or OMT in a buffer, and merge messages at nonleaf nodes of the tree, and on look up to sometimes get values directly out of messages stored at nonleaf nodes. Two or more messages could be merged into one message. A packed-memory array could be used instead of a hash table or OMT.

A block translation table is serialized by encoding
1. a number indicating the size of the block translation table;
2. for each block translation pair
   (a) the disk offset of the block translated by the pair (encoded as −1 for unallocated block numbers), and
   (b) the size of the block (encoded as −1 for unallocated block numbers); and
3. a checksum.

That information is enough to determine all the information needed in the block translation table. For example, the set of free segments are those segments which are not allocated to a block.

For each dictionary, the system serializes the following information at the beginning of the file containing the dictionary:
1. The literal string "tokudata".
2. The layout version, stored in network order.
3. The size of the header, stored in network order.
4. A byte-ordering literal, which is a 64-bit hexadecimal number 0x0102030405060708 which the system uses to determine the byte order for the data on disk including but not limited to big-endian or little-endian. Many integers are stored in the byte order consistent with the byte-ordering literal.

5. A count of the number of checkpoints in which the dictionary is participating.
6. The target node size for the dictionary, which defaults to $2^{22}$, which is 4 megabytes.
7. The location of the BTT on disk.
8. The size of the BTT.
9. The block number of the root of the dictionary.
10. isdup (403).
11. A "old" layout version, used to maintain the oldest layout version used by any node in the dictionary.
12. A checksum.

File Names and File Operations

The system uses a level of indirection for dictionary file names. Associated with each dictionary are two names, a dname and an iname.

Dnames are the logical names of the dictionaries. Inames are the file names. The system maintains a dictionary called the dname-iname directory as a NODUP dictionary. The directory maps dname to iname, where dname is the key and iname is the value. A dname and an iname both of the syntax of a pathname.

An iname is a pathname relative to the root of a file directory hierarchy, which is the structure called an environment, containing all the dictionaries of a particular storage system. The iname is the name of a file in a file system. In most situations where a dictionary is renamed, the system does not rename the underlying file, but instead treats inames as immutable. Every iname is unique over the lifetime of the log. This uniqueness is enforced by embedding the XID of the file creation operation in the iname. In one mode, the iname is a 16-digit hex number with a .tokudb suffix. In another mode the name contains a hint to the original user name, for example
tablename.columnname.01234567890ABCDE.tokudb
where tablename is the name of the table, columnname is the name of a column being indexed, and 01234567890ABCDE is a hexadecimal representation of the XID.

Most file operations occur within transaction. The close operation is a non-transactional file operation.

The iname-dname directory uses the string comparison for its comparison function, and has no descriptor.

The iname-dname directory is a dictionary. The system applies checkpointing, logging, and recovery to the dictionary. The directory is recovered like any other dictionary.

The system logs fassociate (4703) entry in the recovery log when it opens the directory.

When performing file operations, the system typically takes on or more locks on the directory.

For example, when renaming a file, an exclusive lock on the old dname and the new dname is acquired. The lock is held until the transaction completes.

The recovery log contains dnames for the purposes of debugging and accountability, stored for example, in comment fields.

On system start up, the system receives three pathnames from a configuration file, command line argument, or other mechanism.
1. envdir, the environment pathname,
2. datadir, the pathname of the filesystem directory where the dictionaries are stored.
3. logdir, the pathanem of the filesystem directory which holds the recovery log files.

All new data dictionaries are created in datadir.

The datadir is relative to the environment envdir, unless it is specified as an absolute pathname.

All inames are created as relative to the envdir, inside the datadir. The pathname stored in datadir will be the prefix of the pathname in the iname.

The envdir is relative to the current working directory of the process running the system, unless it is specified as an absolute pathname.

If the system is shut down and then restarted with a new datadir then
1. New dictionaries are created in the new datadir.
2. Old dictionaries, accessed by iname, are still available in their original directories.
3. The implicit envdir prefixed to iname. That is, the full pathname is envdir/iname.
4. inames stored in log are of the form original_data_dir/original_iname.
5. inames stored in iname-dname directory are of the same form.

When the system performs a file operation, except for close, the system creates a child transaction in which to perform the file operation. If the child transaction fails to commit, then the file operation is undone, making the file operations atomic. Every file operation comprises the following steps:
1. Begin a child transaction.
2. Perform operation
3. If the operation failed, abort the child transaction.
4. if the operation succeeded, commit the child transaction without fsyncing the log.

There is no child transaction for file-close.

For all the operations described below, the commit actions are performed when the topmost ancestor transaction commits.

Create or Open Dictionary

Opening a dictionary inserts an fopen (4710) entry in the recovery log. There is no fopen entry in the rolltmp log. Creating a dictionary inserts fcreate (4709) entry in the recovery log, followed by a fopen (4710) entry if the dictionary is to be opened. When recovery is complete, all dictionaries are closed. After recovery, the iname-dname directory is opened before performing new postrecovery operations.

To create or open file the system performs the following operations:
1. Examine the iname-dname directory to see if dname exists.
2. Take a lock on the dname in the directory.
3. Take a write lock if the file is being opened in create-exclusive mode.
4. Take a read lock otherwise.
5. Terminate with an error if:
   (a) dname is found and the operation is to create the file in an exclusive mode, or
   (b) dname is not found the operation is to open an existing file.
6. If creating a file and dname is not found:
   (a) Take a write lock on dname in the iname-dname directory, if the write lock has not been acquired earlier.
   (b) Generate an iname using the XID of the child transaction.

(c) Insert a key-value pair in iname-dname directory, INSERT(dname, iname)
(d) Log the file creation:
  i. Generate an LSN.
  ii. Log a fcreate entry (with dname and iname).
  iii. fsync the log.
(e) Create the file on disk using iname.
(f) Make an fcreate entry in the rolltmp log.
7. Log the fopen, without fsync.
8. Open the dictionary.
9. If file was just created, take full range write lock on new dictionary.

When the system aborts an file-open operation, aborting the transaction implicitly will undo the operations on the directory.

To abort fcreate the system performs the following operations:
1. Delete the iname file.
2. The iname-dname directory will be cleaned up by the abort. It is not necessary to explicitly modify the directory.
3. The dictionary will be closed implicitly by aborting the transaction.

During recovery, in backward scan for fcreate, the system performs the following operation:
1. Close the file if it is open.

During recovery, in backward scan for fopen, the system performs the following operations
1. Close the file if it is open.

During recovery, in forward scan for fcreate, the system performs the following operations:
1. If transaction does not exist (because topmost parent XID is older than oldest living transaction) do nothing.
2. Else
  (a) Before reaching the begin-checkpoint record for the oldest complete checkpoint.
    i. If file does not exist, then the file has been deleted, so do nothing.
    ii. If file does exist, record create in transaction's rollback log and open the file.
  (b) After reaching begin-checkpoint record: (The file creation was after the checkpoint, so the file may not even exist on disk in the event of certain kinds of system failures.)
    i. Delete the file if it exists.
    ii. Create and open the file, recording the creation in transaction's rollback log.
  (c) The iname-dname directory will be recovered on its own.

During recovery, forward scan for fopen, the system performs the following operations:
1. Open the dictionary (using iname for pathname). If the file is missing, then ignore the fopen and ignore any further references to this file.

Close Dictionary

To close a dictionary the system performs the following operations:
1. Log the close operation.
2. Close the dictionary.

Delete Dictionary

To delete a dictionary the system performs the following operations:
1. Find the relevant entry in the directory and get the iname. This operation takes a write lock on the key/name pair in the directory by passing in the a read-modify-write flag called DB_RMW.
2. If dictionary is open, return error.
3. Delete the entry from the iname-dname directory.
4. Make an entry in the rolltmp log.
5. Mark the transaction as having performed a delete.
6. Log an entry in the recovery log.

To commit, the system performs the following operations:
1. If this transaction deleted a dictionary, write an commit-txn (4705) entry to the recovery log and fsync the log.
2. Delete the iname file if it exists.

To abort requires no additional work. The directory will be cleaned up by the abort. It is not necessary to explicitly modify the directory.

During recovery, forward scan, the system performs the following operations:
1. If transaction does not exist do nothing.
2. Else create a rolltmp log entry. (The file will be deleted when the transaction is committed.)

4.0.1 Rename Dictionary

To rename a dictionary the system performs the following operations.
1. Record the rename as a comment in the log.
2. If dictionary is open, return error.
3. Delete the old entry from the directory. This operation fails if the dname is not in the directory and otherwise it take a write lock on the entry using the DB_RMW flag.
4. Insert the new entry into the iname-dname directory.

To abort requires no additional work. The directory will be cleaned up by the abort. It is not necessary to explicitly modify the directory.

SQL Database Operations

When the system is operating as a SQL database, the database tables are mapped to dnames, which are in turn mapped to inames. In a database, a table comprises one or more dictionaries. One of the dictionaries serves as the primary row store, and the others serve as indexes.

The SQL command RENAME TABLE is implemented by the following steps:
1. Begin a transaction.
2. Create a list of dictionaries that make up the table.
3. For each dictionary:
  (a) Close the dictionary if open.
  (b) Rename the dictionary.
4. Commit the transaction.
5. If dictionaries are expected to be open, open them.

The SQL command DROP TABLE is implemented by the following steps:
1. Begin a transaction.
2. Create a list of dictionaries that make up the table.
3. For each dictionary:
  (a) Close the dictionary if open.
  (b) Delete the dictionary.
4. Commit the transaction.

The SQL command CREATE TABLE is implemented by the following steps:
1. Begin a transaction.
2. Create a list of dictionaries that make up the table.
3. For each dictionary:
  (a) Create the dictionary.
  (b) Close the dictionary.
4. Commit the transaction.
5. If dictionaries are expected to be open, open them.

The SQL command DROP INDEX is implemented by the following steps:
1. Begin a transaction.
2. Delete the dictionary corresponding to the index.
3. Commit the transaction.

The SQL command ADD INDEX is implemented by the following steps:
1. Begin a transaction.
2. Create a dictionary for the index.
3. Populate the dictionary with index key-value pairs.
4. Close the dictionary.
5. Commit or abort the transaction.
6. If successful, open new dictionary.

The SQL command TRUNCATE TABLE, when there is no parent transaction, is implemented by the following steps:
1. Begin a transaction.
2. Acquire metadata (including dname, settings, descriptor).
3. For each dictionary in the table:
   (a) Close the dictionary if open.
   (b) Delete the dictionary.
   (c) Create a new dictionary with same metadata.
   (d) Close the dictionary
4. If success, commit the transaction, else abort the transaction.
5. If dictionaries are expected to be open, open them.

Logging and Recovery

The log comprises a sequence of log entries stored on disk. The system appends log entries to the log as the system operates. The log is implemented using a collection of log files to form the log. The log files each contain up to 100 megabytes of logged data. As the system operates, it appends information into a log file. When the log file becomes 100 megabytes in size, the system creates a new log file, and starts appending information to the new file. After a period of operation, the system may have created many log files. Some of the older log files are deleted, under certain conditions described below. Some of the log files may be stored on different disk drives, some may be backed up to tape. The system thus divides the log into small log files, naming each small log file in a way that will make it possible to identify the logs during recovery, and manages the log files during normal operation recovery. The large abstract log can also be implemented by writing directly to the disk drive without using files from a file system. In this description, we often refer to a single log, with the understanding that the log may be distributed across several files or disks. The log data could be stored on the same disk drive or storage device as the other disk-resident data, or on different disks or storage devices. We distinguish the log file from the other disk-resident data by referring to the log separately from the disk. In some cases, log entries are stored in the same files that contain the other data.

The log is a sequence of log entries. A log entry is a sequence of fields. The first field is a single byte called the entry type. The remaining fields depend on the entry type. Every log entry begins and ends with the length, a 64-bit integer field which indicates the length, in bytes, of the log entry. The system can traverse the log in the forward or reverse direction by using the length, since the length field at the end makes it easy, given a log entry, to find the beginning of the previous log entry.

Every log entry further includes a checksum which the system examines when reading the log entry to verify that the log entry has not been corrupted.

The system defines the following log entry types which are serialized using similar techniques as for encoding messages. Every log entry begins with a LSN (4722), then includes a entrytype (4723). The system implements the log entries depicted in FIGS. 47-51. In those figures, the length information at the beginning and end of each log entry are not shown, nor is the checksum shown.

1. The system logs a checkpoint_begin (4701) when a checkpoint begins. It includes a timestamp (4724) field which records the time that the checkpoint began.
2. The system logs a checkpoint_end (4702) when it completes a checkpoint. This log type comprises lsn_of_begin (4725), which is the LSN of the checkpoint_begin (4701) entry that was recorded when the checkpoint began, and a timestamp (4724), which records the time that the checkpoint ended. We say that the previous checkpoint_begin (4701) entry corresponds to the checkpoint_end (4702) entry.
3. The system logs a fassociate (4703) when it opens a file. Also when the system performs a checkpoint, the system records a fassociate (4703) for every open file. This log entry comprises a file number filenum (4726) and a file name filename (4729). The system uses the filenum (4726) in other log entries that refer to a file. This log entry further comprises an integer flags (4727), which is an integer, to record information about the file, for example whether the dictionary contained in the file allows duplicate keys.
4. The system logs a txnisopen (4704) when a checkpoint starts, for each open transaction. This log entry type records the fact that a particular transaction, identified by transaction_id (2812), is open. This log entry comprises transaction_id (2812), which is the same as the LSN (4722) of the begintxn (4707) log entry that was logged when the transaction was opened. This log entry further comprises another XID parenttxn (4728), which is the XID of the transactions parent if the transaction is has a parent in a nested transaction hierarchy. If the transaction has no parent then a special NULL XID is logged in the parenttxn (4728) field.
5. The system logs a committxn (4705) when it commits a transaction. This log entry comprises transaction_id (2812), which identifies the transaction that is being committed.
6. The system logs a aborttxn (4706) when it aborts a transaction. This log entry comprises transaction_id (2812) which identifies the transaction that is being aborted.
7. The system logs a begintxn (4707) when it begins a transaction. The transaction can thereafter be identified by the LSN (4722) value that was logged. This log entry comprises the XID parenttxn (4728) of the parent of the transaction, if the transaction is a child in a nested transaction hierarchy. If there is no parent, then a special NULL XID is logged in the parenttxn (4728) field.
8. The system logs a fdelete (4708) when it deletes a file. This log entry comprises transaction_id (2812) which indicates which transaction is performing the deletion. This log entry further comprises a file name filename (4729) indicating which file to delete. If the transaction eventually commits, then this deletion will take effect, otherwise this deletion will not take effect.
9. The system logs a fcreate (4709) when it creates a file. This log entry comprises a file name filename (4729) which is the name that the file will be known as when it is operated on in the future, an iname, iname (4730) which is the name of the underlying file in the file system, an integer mode mode (4736) which indicates the permissions that the file is created on (including, but not limited to, whether the file's owner can read or write the file and whether other users can read or write the file), an integer flags flags (4727), an integer descriptor_version (4737), and a byte string descriptor (4738).

10. The system logs a fopen (4710) when it opens a file. This log entry comprises a file number filenum (4726) which is used when referring to the file in other log entries, an integer flags (4727) to record information about the file for example whether the dictionary contained in the file allows duplicate keys, and a file name filename (4729) which names the file being opened.

11. The system logs a fclose (4711) when it closes a file. This log entry comprises filenum (4726), flags (4727), and filename (4729), similarly to the log entry for fopen (4710). When traversing the log backwards during recovery the system uses the flags (4727) and filename (4729) to open the file.

12. The system logs a emptytablelock (4712) when it locks a table for a transaction, in the case where the table was created by the transaction, or the table was empty when the transaction began. This log entry comprises a transaction_id (2812) and a file number filenum (4726).

13. The system logs a pushinsert (4713) when it inserts a key-value pair into a dictionary and if there is a previous matching key-value pair, then the new key-value pair is to overwrite the old one. This record comprises a file number filenum (4726) indicating the dictionary into which pair is being inserted, transaction_id (2812) indicating the transaction that is inserting a pair, and the pair compromising key (2810) and value (2811).

14. The system logs a pushinsertnooverwrite (4714) when it inserts a key-value pair into a dictionary when, if there is a previous matching key-value pair, the new pair should not replace the old one. The fields are similar to those of pushinsert (4713).

15. The system logs a pushdeleteboth (4715) when it deletes a key-value pair from a dictionary, where the system is deleting any key-value that matches both the key and the value. If no such pairs match, then the deletion has no effect. This log entry comprises a filenum (4726), transaction_id (2812), key (2810), and value (2811).

16. The system logs a pushdeleteany (4716) it deletes a key-value pair from a a dictionary, where the system is deleting any key-value that matches the key. For dictionaries with duplicates, this can result in deleting several pairs if several pairs match. If there are no such pairs, then deletion has no effect. This log entry comprises a filenum (4726), transaction_id (2812), and key (2810).

17. The system logs a pushinsertmultiple (4717) when it inserts key-value pairs into one or more dictionaries, where there is a master key-value pair that can be used to compute the key-value pair to be inserted into each corresponding dictionary. For example if one dictionary is indexed by first-name and then last-name, and another dictionary is indexed by last-name and then first-name, then the master record might contain both names, and the pairs to be inserted into the respective dictionaries can be derived from the master record. The system uses a descriptor, descriptor (4738), to encode how the derived pairs are computed. This log entry comprises a file number, filenum (4726), which identifies a master dictionary, and an sequence of file numbers, filenums (4731), which respectively identify a sequence of derived dictionaries. This log entry further comprises an XID, transaction_id (2812), and the master key-value pair comprising key (2810) and value (2811).

18. The system logs a pushdeletemultiple (4718) when it deletes key-value pairs from one or more dictionaries, in a situation similar to that used by pushinsertmultiple (4717). Deletion from several dictionaries can be specified with a single master key-value pair. This log entry comprises fields filenum (4726), transaction_id (2812), key (2810), value (2811), 2420 and filenums (4731).

19. The system logs a comment (4719) when the system writes an byte string to the log, for example to note that the system rebooted at a particular time. Typically the byte string has meaning for the humans who maintain the system, but that is not required. The system also records this type of log entry to align the log end (for example, to a 4096-byte boundary), choosing the comment length to force the desired alignment. This log entry comprises a time stamp timestamp (4724) and a comment comment (4732), which is byte string.

20. The system logs a load (4720) in some situations when the system performs a bulk load from a data file, including but not limited to files in which rows comprise comma-separated values. In these situations, the system constructs a new dictionary file, and then replaces an old dictionary file with the new one. The system starts with the old dictionary file, and it constructs a new dictionary file without modifying the old one. If the transaction enclosing the bulk load commits, the old file is deleted. If the transaction does not commit then the system deletes the new file. As part of the load, the system inserts a modified record into the iname-dname dictionary, which is committed or aborted similarly to any other dictionary insertion. Thus, when a transaction commits, the iname-dname dictionary refers to the new file, and the old file is deleted, and when a transaction aborts, the iname-dname dictionary refers to the old file, and the new file is deleted.

The load (4720) log entry comprises a timestamp (4724) which notes the time at which the load was performed, a filenum (4726) which notes which dictionary is being updated, transaction_id (2812), and two file names oldfname (4733), and newfname (4734), which specify the old and the new file names respectively.

The system also records other log entries, at certain times, for example logging dictionary headers or writing an entire dictionary node into the log.

Alternatively, other encodings of the log can be used. For example, the length field could be omitted, since in principle one could scan the log from beginning to end to find the beginning of every log entry. Alternatively, the length of a log entry may be computable from other information found in the log.

The log data is compressed when written to the log. The compression is performed on one or more log entries together. The system assembles an in-RAM array of a sequence of log entries, then compresses them into a block. The compressed block is written to disk, as 1. the length of the compressed block, and
2. the length of the uncompressed data in the block,
3. the LSN of the first entry in the block,
4. the LSN of the last entry in the block,
5. a Boolean indicating whether there is a checkpoint_begin (4701) log entry in the block,
6. a Boolean indicating whether there is a checkpoint_end (4702) log entry in the block,
7. a Boolean indicating that the compression table was reset when compressing the block,
8. the compressed bytes, and
9. the compressed length again.

The log file itself further comprises a header that indicates that the file is a log file, which may help the system avoid treating a log as though it were a data file (similarly the data files also have a header which may help prevent such confusion). The compressed length at the end of the block can help the system read log files backward, by starting at the end of a log file, reading the compressed length, and then skipping back to the beginning of the log. The system employs the Booleans that indicate whether there are checkpoint records in the block to find checkpoint records during recovery without examining or uncompressing blocks that have no checkpoint record.

The system uses a compression library that constructs a table as it compresses data. The table initially starts out empty, and as more data is compressed, the table grows. The system, when compressing several blocks to the log, does not always reset the table between compressing blocks. The table-reset Boolean indicates whether the system started with a new table when compressing a block, or whether it used the previously accumulated table. The first compressed block in a file has the table-reset Boolean set to TRUE.

To decompress a compressed block of log sequence entries, the system starts at the compressed block, and checks to see if the table-reset Boolean is TRUE. If not, the system skips backward until it finds a compressed block that has a TRUE table-reset Boolean. Then it decompresses the blocks, scanning forward, decompressing each block until the decompressed block is found. The system maintains a cache of recently decompressed blocks.

Certain operations, including but not limited to committing a transaction that has no parent, comprise logging entries into the log and then synchronizing the log to disk using the fsync system call. The system implements such operations by writing the log entries to an in-RAM data structure, possibly appending them to some previous log entries, compressing the block, and writing the compressed block to disk, and then calling fsync. In some conditions, the system resets the compression table, and in some conditions it does not. For example, if the compression block ends up a the beginning of a log file, the system resets the table. If more than one million bytes of data have been compressed since the table was reset, the system resets the table.

If the in-RAM data structure exceeds a certain size, the system compresses the data and writes it to the log file as a block. Depending on the situation, the system may or may not perform an fsync or a compression table reset.

The system maintains a count of how much compressed data has been written to a log file. After a fixed number of compressed bytes have been written, the system resets the compression table at the next time that a block is compressed.

The system maintains two in-RAM log buffers. At any given time, one of the log buffers is available to write log entries into. The other log buffer can be idle or busy. When a thread creates a log entry, it appends the log entry into the available log buffer. To write or synchronize the log to disk, a thread waits until the other log buffer is idle. At that point, there may be several threads waiting on the newly idle buffer. One of the threads atomically
1. sets the available buffer to be busy,
2. sets the idle buffer to be available, and
3. resets the newly available buffer so that it is empty.

and then proceeds to compress the busy buffer, write it to disk, and call fsync if necessary. The other threads that were waiting for that buffer to become idle all start waiting until the fsync has complete, at which point their log entries having been written to disk, they continue.

In some cases the available log buffer becomes so full that the system forces threads to wait before appending their log entries to disk.

In some conditions commits several transactions with a single call to fsync.

When the system performs a checkpoint, the system, for each dictionary,
1. saves all the dirty blocks of the dictionary to disk, not overwriting blocks saved at last checkpoint,
2. records their locations on the disk in a new BTT,
3. saves the new BTT on disk, not overwriting the BTT saved at last checkpoint,
4. saves a new header that points to the new BTT, not overwriting the header saved at last checkpoint, and
5. writes other relevant information in the log.

One thread can perform a checkpoint even when other threads are running concurrently by performing the following steps:
1. Write a checkpoint_begin (4701) record.
2. Obtain a lock on the buffer pool.
3. For each pair in the buffer pool, if the pair is dirty, then set its checkpoint_pending Boolean to TRUE and add the pair to a list of pending pairs, otherwise set its pending flag to FALSE.
4. For each open dictionary,
    (a) copy the dictionary's BTT to a temporary BTT (the TBTT),
    (b) copy the dictionary's header to a temporary header, and
    (c) log a the association of the file to its file number using a fassociate (4703) log entry.
5. For each transaction that is currently open and has no parent, log the fact that the transaction is open using a txnisopen (4704) log entry.
6. Release the lock on the buffer pool.
7. Establish a work queue.
8. For each pair in the list of pending pairs:
    (a) Wait until the work queue is not overfull.
    (b) Obtain the lock on the buffer pool.
    (c) If the pair's checkpoint_pending is TRUE then schedule the node to be written to disk by putting the node into a work queue. (The checkpoint_pending could be FALSE because, for example, another thread could have performed a getandpin operation, which would have caused the pending pair to be processed at that time.) The system updates the TBTT as well as the BTT when writing a node to disk.
    (d) Release the lock on the buffer pool.
9. Wait for all the writes to complete.
10. For each open dictionary
    (a) Allocate a segment for the dictionary's TBTT, and write it to disk.
    (b) Set the temporary header's BTT to point at the newly allocated TBTT, and write the temporary header to disk.
11. Synchronize the disk-resident data to disk using the f sync function.
12. Write the checkpoint_end (4702) to the log.
13. Synchronize the log to disk using the f sync function.

The system frees segments when they are no longer in use. A segment is given to the dictionary's segment allocator (3201) for deallocation when the segment is not used in the BTT, the CBTT, or in a TBTT, and when the segment is not used to hold the on-disk representation in the header, the checkpointed-header, or the temporary header. The system can determine a segment is no longer in use when it writes a block as follows:
1. When writing a block number for the BTT, the system allocates a new segment.
2. If the old segment is not used for the same block number in either the CBTT or a TBTT, then the segment can be added to a list of segments to deallocate.

If the system is writing a block for a checkpoint, then it updates both the TBTT and the BTT. In this case the old segments identified in both TBTT and the BTT can each be added to the list of segments to deallocate if each respective old segment is not used in the CBTT.

When a checkpoint completes, the TBTT becomes the CBTT, and the segments in the old CBTT are candidates for deallocation. The system, for each translated block number, examines the old CBTT, the TBTT, and the BTT to see if the corresponding segment is no longer in use. If so, then it add that segment to the list of segments to deallocate.

Alternatively, the system could a node to the log when a node is modified for the first time after a checkpoint. If the underlying data files are copied to a backup system, and then the log files are copied to a backup system, the system could use those copied files to restore the dictionaries to a consistent state.

The system maintains two copies of the dictionary header and two copies of the block translation table. The system maintains the two copies in such a way that they are distant from each other on disk or on separate disks. The system maintains the LSN on each header as well as a checksum on each header.

In a quiescent state, the system has written both copies of the headers as with same LSN, the same data, and with correct checksums. When updating the header on disk, the system first checks to see if there are two good headers that have the same LSN (that is, whether the system is in a quiescent state). If they both exist, then the system
1. overwrites one header,
2. synchronizes the disk with the fsync ( ) system call, and then
3. overwrites the other header.

If two good headers exist but they have different LSNs, then the system
1. overwrites the older header,
2. synchronizes the disk, and then
3. overwrites the newer header.

If only one header is good, then the system
1. overwrites the bad header,
2. synchronizes the disk, and then
3. overwrites the other header.

This sequence of steps is called a careful header write.

When opening a dictionary for access, the system reads the two headers, selecting the good one if there is only one good header, and selecting the newer one if there are two good headers. If neither header is good then the system performs disaster recovery, obtaining a previously backed-up copy of the database and reapplying any operations that have been logged in a logging file.

Thus, the system has the option of selecting a header from the log, or can retrieve a header from one of the two copies stored on disk.

Alternatively, the details of the disk synchronization and writes can be changed. For example, in some situations it suffices to perform a careful header write and not write a copy of the header to the log. In some situations it suffices to write the header to the log and not maintain two copies of the header on disk. Another alternative is to write segments to the log device instead of to the disk, so that the snapshot is distributed through the log. Another alternative is to take a "fuzzy snapshot" in which the segments are saved to disk at different times, and enough information is stored in the log to bring the segments into a consistent state.

To start the system after a crash the system reads the log backwards to find the most recent checkpoint_end (4702) log entry. That log entry includes the LSN of checkpoint_begin (4701) entry that was performed at the beginning of the checkpoint. When a header is being read from a dictionary, if there are two good headers, the system chooses the header that has the LSN matching the beginning of the checkpoint.

Figure 52:
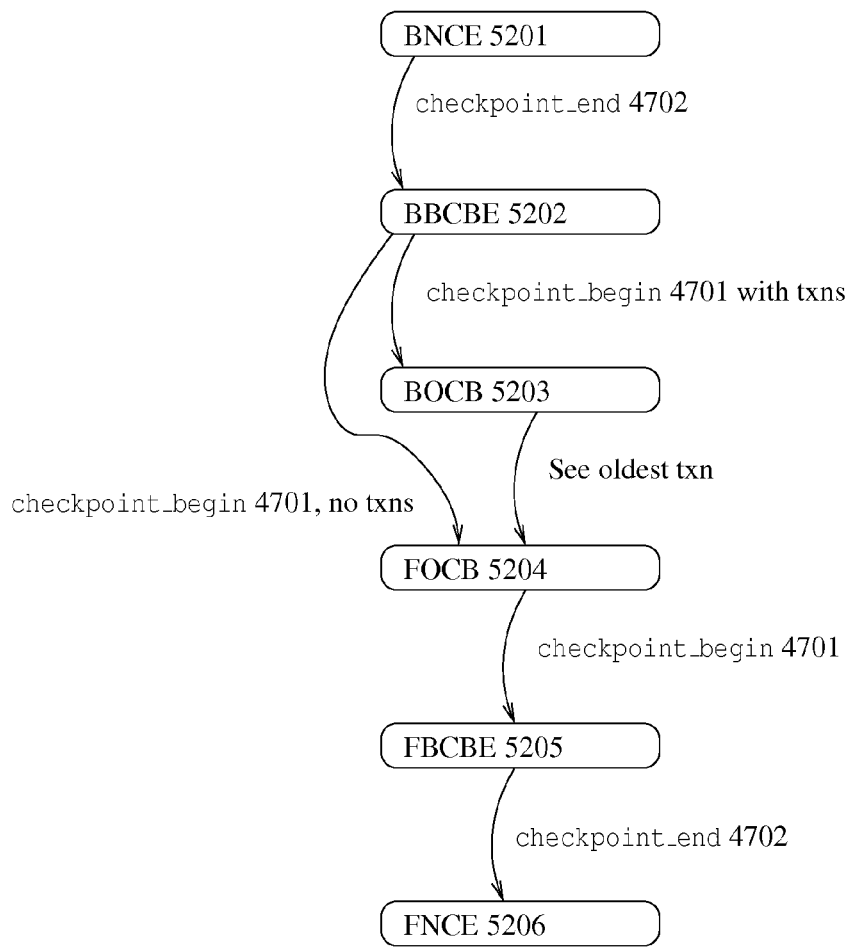
FIG. 52 depicts recovery states

When recovering from a crash, the system maintains a state variable, illustrated in FIG. 52. The state variable is changed as log entries are processed during recovery. In FIG. 52 the state variable is shown changing as an arc with a label.

When recovering from a crash, the system performs the following operations:
1. Acquire a file lock (for example, using the flock ( ) system call on Linux and FreeBSD, and a fcntl in Solaris, and a _sopen with locking arguments in Windows).
2. Delete all the rolltmp files.
3. Determine whether recovery is needed. If there are no log files or there is a "clean" checkpoint (that had no open transactions while running), at the end of the log file, then recovery is not needed.
4. Create an environment for recovery (creating a buffer pool, and initializing the default row comparison and row generation functions.
5. Write a message to the error log indicating the time that recovery began.
6. Find the last log entry in the log. The system skips empty log files during recovery, and if there is a partial log entry at the end of the last log file, the system skips that. There are many reasons why a log file might be empty or a log entry might be incomplete, including but not limited to the disk having been full when the log entry was being written.
7. Scan backward from the last log entry, for each log entry encountered, do the following operation depending on the log entry:
    (a) checkpoint_begin (4701):
        i. If the system is in the BBCBE (5202) state, then if there were no live transactions recorded, then go to the FOCB (5204) state and start scanning forward, otherwise go to the BOCB (5203) state. The system prints an error log message indicating that recovery is scanning forward.
        ii. Otherwise continue.
    (b) checkpoint_end (4702): If the system is in the BNCE (5201) state, then go to the BBCBE (5202) state and record the XID of the checkpoint (that is the LSN of the corresponding checkpoint_begin (4701)).
    (c) fassociate (4703): If the system is in the BBCBE (5202) state then open the file.
    (d) txnisopen (4704): If the system is in the BBCBE (5202) state then increment the number of live transactions, and if the XID is less than any previously seen one (or if there is no previously seen one) then remember the XID.
    (e) committxn (4705): Continue.
    (f) aborttxn (4706): Continue.
    (g) begintxn (4707): If the system is in the BOCB (5203) state and the XID of this log entry is equal to the oldest transaction mentioned in a txnisopen (4704) log entry in the BBCBE (5202) state then go to the FOCB (5204) state and start scanning forward
    (h) fdelete (4708): Continue.
    (i) fcreate (4709): Close the file if it is open.
    (j) fopen (4710): Close the file if it is open.
    (k) fclose (4711): Continue.
    (l) emptytablelock (4712): Continue.
    (m) pushinsert (4713): Continue.
    (n) pushinsertnooverwrite (4714): Continue.

(o) pushdeleteboth (4715): Continue.
(p) pushdeleteany (4716): Continue.
(q) pushinsertmultiple (4717): Continue.
(r) pushdeletemultiple (4718): Continue.
(s) comment (4719): Continue.
(t) load (4720): Continue.
(u) txndict (4721): Merge the log entries from the identified dictionary into the recovery logs, and process them.

8. Scan forward from the point identified above. For each log entry encountered, do the following operation depending on the log entry:
   (a) checkpoint_begin (4701): If the system is in the FOCB (5204) state then go to the FBCBE (5205) state.
   (b) checkpoint_end (4702): If the system is in the FBCBE (5205) state then go to the FNCE (5206) state.
   (c) fassociate (4703): Continue.
   (d) txnisopen (4704): Continue.
   (e) committxn (4705): If the transaction is open, then execute the commit actions for the transaction, and destroy the transaction.
   (f) aborttxn (4706): If the transaction is open, then execute the abort actions for the transaction, and destroy the transaction.
   (g) begintxn (4707): Create a transaction.
   (h) fdelete (4708): If the file exists and the identified transaction is active, then create a commit action that will delete the file when the transaction commits.
   (i) fcreate (4709): If the system is in not in the FOCB (5204) state then unlink the underlying file from the file system (if the file exists) and create a new one, updating the iname-dname dictionary.
   (j) fopen (4710): Open the file.
   (k) fclose (4711): If the file is open, then close it.
   (l) emptytablelock (4712): If the file is open, then obtain a table lock on the file.
   (m) pushinsert (4713), pushinsertnooverwrite (4714), pushdeleteboth (4715), pushdeleteany (4716): If the transaction exists and the file is open then perform the identified insertion or deletion as follows. Establish commit and abort actions for the operation. If the LSN of the dictionary is older than the LSN of this log entry, then push the operation's message into the dictionary.
   (n) pushinsertmultiple (4717), pushdeletemultiple (4718): If the transaction exists then generate each required row and for each generated row perform the actions that would have been done if that row were found in a pushinsert (4713) or pushdeleteany (4716) message.
   (o) comment (4719): Continue.
   (p) load (4720): If the transaction exists, then establish a commit action to delete the old file, and an abort transaction to delete the new file.
   (q) txndict (4721):

9. Clean up the recovery environment by closing the dictionaries.
10. Release the file lock.

When the end of the log has been reached, the system performs a checkpoint, and has recovered from a crash.

Once every 1000 log entries, the system prints a status message to the error log indicating progress scanning backward or forward.

The list of segments to deallocate is maintained until the data file is synchronized to disk with an fsync, after which the system deallocates unneeded segments and the disk space is used again.

A segment is kept if any of the following
1. the new segment has not been written to disk,
2. the BTT has not updated on disk, or
3. the segment is needed to represent some active version of the dictionary.

There may be other reasons to keep segments. For example, during backup, old segments are kept in an allocated state until the backup completes.

The system trims unneeded log files by deleting the files that are no longer needed. A log file is needed if
1. the log file contains the checkpoint_begin (4701) corresponding to the most recently logged checkpoint_end (4702),
2. some uncompleted transaction has a log entry in the log, or
3. an older log file is needed.

There may be other reasons that a log file is needed. For example, during backup, all the log entries that existed at the beginning of the backup are kept until the backup completes. After a log file is deleted, the system can reuse the storage space for other purposes, including but not limited to writing more log files or writing dictionary data files.

In one mode of operation, the system, for each dictionary modified by a transaction, allocates a segment in the dictionary. Log entries that mention a file number are logged in the segment of the dictionary corresponding to the file number instead of in the log. An additional txndict (4721) log entry is recorded after the checkpoint_begin (4701) and before the checkpoint_end (4702) to note the existence of this segment. The txndict (4721) entry records the XID of the relevant transaction in transaction_id (2812), the filenum (4726) which denotes which file contains the segment, the blocknum (404) which denotes which block contains the segment, the block number being translated using the BTT to identify where in the file the segment is stored. In this mode, all information needed for recovery can be found in log entries subsequent to the checkpoint_begin (4701) corresponding to the most recent checkpoint_end (4702).

Lock Tree

The system employs a data structure called a lock tree to provide isolation between different transactions. The lock tree implements row-level locks on single rows and ranges of rows in each dictionary. A lock is said to cover a row if the lock is a lock on that row or on a range that includes that row. In some situations, the system employs exclusive locks, and in some situations the system employs reader-writers locks. In the system, only one transaction can hold a writer lock that covers a particular row, and if there is such a transaction, then no reader locks may be held that cover that row. Multiple reader locks may be held by different transactions on the same row at the same time.

Transactions read and write key-data pairs. For the purpose of locking, we refer here to those key-data pairs as points. For a DUP database, a point can be identified by a key-value pair. For a NODUP database, the key alone is enough to identify a point. In either case, a point corresponds to a single pair in the dictionary. The locking system defines two special points, called '∞' and '−∞'. These two special points are values that are not seen by the user of the locking system. Points can be compared by a user-defined comparison function, which is the same function used to compare pairs in the dictionary.

A transaction t holds a lock on zero, one, or more points. For example, when providing serializable isolation semantics, if a transaction performs a query, and the transaction doesn't change any rows, then the transaction can perform the same query again and get the same answer. In one mode of operation, the transaction acquires reader locks on at least all the rows it reads so that another transaction cannot change any of those rows.

For example, in some isolation modes, if a transaction performs a query to "retrieve the smallest element of a dictionary" and obtains P, the system acquires a reader lock on the range [−∞,P], even though the query only actually read P. This prevents a separate transaction from insert pointing $P_2$<P before the first transaction finishes, violating the isolation property, because if the first transaction were to ask again for the smallest element, it would get $P_2$ instead of P.

As this example indicates, a transaction acquires locks on ranges of points. In this document, when we say "range," we mean a closed interval. A range of points is a set identified by its endpoints x and y, where the x≤y. When x=y, the set is of cardinality one. Otherwise, the set may contain one or more finite or infinite values. The system treats both −∞ and ∞ as possible endpoints of ranges.

For each transaction and each database, the lock tree maintains a set of closed ranges that have been read, the read set and a set of points (which are 1-point ranges) that have been written, the write set. Ranges in the read set represent both points that have been read, and those that needed to be locked to ensure proper isolation.

In some situations, the system escalates locks, so the write set can sometimes contain ranges that are not single points. If a transaction holds locks on two ranges [a,b] and [c,d], where a≤b≤c≤d, and no other transaction holds conflicting locks in the range [a,d], the system may replace the two ranges with the larger range [a,d]. The system may escalate locks in this way in order to save memory, or for other reasons, including but not limited to speeding up operations on the locks.

The lock tree can determine if the read set of one transaction intersects the write set of another transaction, and if the write set of two transactions intersect. If there are any such intersections, then the lock tree is conflicting. The lock tree operates as follows:

1. The system attempts to add a set of points to a read or write set. The added set can be either a single point added to the write set or a closed range added to the read set.
2. If the resulting lock tree would be conflicting, the set is not added. Instead an error is returned. If the resulting lock tree is not in conflict, then the lock tree is updated and the addition is successful.

When a transaction completes, it releases all the locks it holds.

A lock tree comprises a set of range trees. There may be zero, one, or more range trees.

A range tree maintains a set of ranges, and for each range, an associated data value. Specifically, a range tree S maintains a finite set of distinct pairs of the following form: ⟨ I,T ⟩ where I=[L, H] is a closed range of points which are locked, and T is the associated data item. In this system, T is the XID of the transaction that has locked the range.

The system categorizes range trees into four groups: range trees are considered either overlapping or non-overlapping. Independently, range trees are considered homogeneous or heterogeneous.

In a non-overlapping range tree, the ranges do not overlap. Ranges in an overlapping range tree sometimes overlap.

Ranges in a homogeneous range tree have the same associated data item. The system uses homogeneous range trees to store ranges all locked by the same transaction.

Ranges in a heterogeneous range tree may store the same or different associated data items for different ranges. The system uses heterogeneous range trees to store ranges that can be locked by multiple transactions.

The system can perform the following operations on range trees:
1. FINDALLOVERLAPS(S,I) returns all pairs in S that overlap a given range I.
2. FINDOVERLAPS(S,I,k) returns all K pairs from range tree S whose ranges overlap range I, unless K>k. If so, the function returns only k of these pairs, arbitrarily chosen.
3. INSERT(S,I,T) inserts a new pair ⟨ I,T ⟩ into range tree S, modifying S. A non-overlapping range tree does not allow an insert that causes an overlap, returning an error instead. Similarly a homogeneous range tree does not allow an insert with an associated data item that is different from any others already in S.
4. DELETE (S,I,T) removes range I with associated data item T from S if such a pair exists.

Non-overlapping ranges can be ordered, which therefore induces a total order on pairs in a non-overlapping range tree. The system defines [a,b]<[c,d] if an only if b<c. This ordering function also defines a partial order on arbitrary ranges, even those that overlap.

There is a partial order on points and ranges. The system defines a<[b,c] if and only if a<b, and [b,c]<a if and only if c<a.

The system performs the following additional operations on non-overlapping range trees:
1. PREDECESSOR (S,P) returns the greatest ⟨ I,T ⟩ in range tree S, where range I<P, or else returns "not found" if no such pair exists.
2. SUCCESSOR (S,P) returns the least ⟨ I,T ⟩ in range tree S, where range P<I, or "not found" if no such pair exists.

The non-overlapping range tree can be implemented using a search data structure, which includes but is not limited to an OMT, a red-black tree, an AVL tree, or a PMA. Non-overlapping range trees can also be implemented using other data structures including but not limited to sorted arrays or non-balanced search trees.

In the search tree, the system stores the endpoints of all ranges, and an indication on each endpoint whether it is a right or a left endpoint.

The overlapping range tree can also be implemented using a search tree, where some additional information is stored in the internal nodes of the tree. The system stores the intervals in a binary search tree, ordered by left endpoint. In every node in the tree, the system stores the value of the maximum right endpoint stored in the subtree rooted at that node.

For the purpose of the lock tree, each database is handled independently, so we can describe the representation as though there is only one database.

The system employs a collection of zero or more range trees to represent a lock tree. The ranges represent regions of key space or key-value space that are locked by a transaction.

The lock tree comprises,
1. For each pending transaction t
    (a) a LOCALREADSET range tree $R_t$, and
    (b) a LOCALWRITESET range tree $W_t$;
2. a GLOBALREADSET range tree GR; and
3. a BORDERWRITE range tree B.

Each $R_t$ comprises a homogeneous non-overlapping range tree. The system employs $R_t$ to maintain the read set for transaction t. The presence of a pair $\langle$ [x,y],t $\rangle \in R_t$ means that transaction t holds a read lock on range [x,y].

Each $W_t$ comprises a homogeneous non-overlapping range tree. The system employs $W_t$ to maintain the write set for transaction t. The presence of a pair $\langle$ [x, y], t $\rangle \in W_t$ means that transaction t holds a write lock on range [x,y].

GR comprises a heterogeneous overlapping range tree that maintains the union of all read sets. The system employs range tree GR to contain information that can, in principle, be calculated from the LOCALREADSET trees. A pair $\langle$ [x, y], t $\rangle \in$ GR means that transaction t holds a read lock on range [x,y].

B comprises a heterogeneous non-overlapping range tree. The system employs B to hold maximal ranges of the form $\langle$ [x,y], T $\rangle$. The system stores $\langle$ [x, y], T $\rangle$ in B when following conditions hold:
1. Transaction t holds locks on points x and y. All points in the range [x, y] are either locked by transaction t or are unlocked.
2. The largest locked point less than x (if one exists) and the smallest locked point greater than y (if one exists), are locked by transactions other than t.

In principle, all the information in the BORDERWRITE tree can be calculated from the LOCAL-WRITESET trees.

The system performs range consolidation on some insertions, meaning that when a transaction T locks two overlapping ranges X and Y, the system replaces those two ranges with a single combined range X$\cup$Y. If ranges are consolidated then all distinct ranges stored in a range tree for the same transaction are nonoverlapping.

Range consolidation is implemented in a homogeneous range tree as follows. Before $\langle$ I,T $\rangle$ is inserted into a homogeneous range tree S, the system uses FINDOVERLAPS (S,I,k=$\infty$) query, which returns all ranges that overlap with the new range I. The system deletes those ranges from the range tree, and then creates a new range that is a union of all these ranges including I and inserts this new range into the lock tree.

In a heterogeneous range tree, range consolidation is similar, except that the system checks that only ranges corresponding to the same T are consolidated. One way to maintain range consolidation on a heterogeneous range tree, is to maintain separate (homogeneous) range trees for each associated T. The system uses GR in this fashion. The system identifies which intervals to consolidate in the heterogeneous range tree, GR, by first doing range consolidation on the homogeneous range tree $R_T$.

As an example, consider range tree S={$\langle$ [0,1],t $\rangle$,$\langle$ [2,4],t $\rangle$}. If the $\langle$ [1,3],t $\rangle$ is added, then, after range consolidation, the range tree stores S={$\langle$ [0,4],t $\rangle$}.

We say that an interval I (or a point P) meets a range tree if one of the intervals stored in the range tree overlaps I (or P).

We say that an interval I (or point P) meets a range tree at T if I (or P) overlaps an interval in the range tree associated with T.

We say that an interval I (or point P) is dominated by a range tree if the interval T is entirely contained in one of the intervals stored in the range tree.

As an example, consider [0,5] and range tree {$\langle$ [−6,5],$T_1$ $\rangle$,$\langle$ [4,6],$T_2$ $\rangle$,$\langle$ [7,10],$T_3$ $\rangle$}. Interval [0,5] meets the range tree. Specifically, [0,5] meets the range tree at $T_1$ and meets the range tree at $T_2$, but does not meet the range tree at $T_3$. Interval [0,5] is also dominated by this range tree, because [0,5] is entirely contained in [−6, 5].

The system employs the lock tree to answer queries about whether an interval I meets or is dominated by a range tree and at what transaction. The system implements those queries using procedure FINDOVERLAPS, either with k=1 or k=2. Examples include, but are not limited to, the following queries:
1. Does an interval I meet a range tree S?
   The system uses a FINDOVERLAPS query with k=1.
2. Given a point P, a transaction T, and a range tree S, does the point P meet the range tree S at a transaction different from T?
   The system uses a FINDOVERLAPS query with k=2.
3. Given an interval I, a transaction T, and a range tree S, does more than one interval in S overlap I? If so, return "more than one overlap." Otherwise, if exactly one interval overlaps, and its associated transaction is different from T, then return the name T' of that transaction. Otherwise return "ok".
   The system performs this three-way test using a FINDOVERLAPS query with k=2.
4. Given an interval I and a range tree S, does S dominate I?
   The system uses a FINDOVERLAPS query with k=2 taking advantage of range consolidation.

In more detail, the lock tree operates as follows.
1. For transaction T to acquire a read lock on a closed range I:
   (a) If I is dominated by $W_T$ then return success.
   (b) Else if I is dominated by $R_T$ then return success.
   (c) Else if I meets the border write tree B at a transaction $T_2 \neq T$ and I meets the write $W_{T_2}$ then return failure.
   (d) Else insert $\langle$ I,t $\rangle$ into GR and into $R_t$, consolidate ranges if necessary, and return success.
2. For transaction T to acquire a write lock on point P:
   (a) If P is dominated by $W_T$ then return success.
   (b) Else if P meets GR at transaction $T_2 \neq T$ then return failure.
   (c) Else if P meets B at $T_2 \neq T$ and P meets $W_{T_2}$ then return failure.
   (d) Else insert $\langle$ [P,P],T $\rangle$ to $W_T$ and consolidate ranges if necessary. Then update the BOR-DERWRITE tree B to include $\langle$ [P,P],T $\rangle$ and return success.
3. For transaction T to release all of its locks (which happens when the transaction commits or aborts):
   (a) Release the read set.
      i. For each range I$\in R_T$:
         A. Delete $\langle$ I,T $\rangle$ from the GLOBALREADSET tree GR.
      ii. Delete the entire LOCALREADSET tree $W_T$ for transaction T.
   (b) Release the write set.
      i. For each range I$\in$LOCALWRITESET $W_T$:
         A. If I meets BORDERWRITE tree B at T then update the BORDERWRITE tree B to exclude $\langle$ I,T $\rangle$.
      ii. Delete the entire LOCALWRITESET tree $R_T$ for transaction T.

To update the BORDERWRITE tree B to include $\langle$ I=[P,P],T $\rangle$:
1. Run a FINDOVERLAPS (B,I,k=1) query to retrieve set F. Either F={$\langle$ $I_F$,$T_F$ $\rangle$} or F=$\phi$.
2. If |F|=1 $\wedge$ $T_F$=T then return success.
3. Else if |F|=1 $\wedge$ T$\neq$T then:
   (a) Remove the overlapping range from B: DELETE (B,$I_F$, $T_F$).
   (b) Split $I_F$ into two ranges for transaction $T_F$ as:
      i. Run STRICTSUCCESSOR ($W_F$,P) to retrieve $\langle$ $I_S$,f $\rangle$.
      ii. Run STRICTPREDECESSOR ($W_F$,P) to retrieve $\langle$ $I_p$,f $\rangle$.
      iii. Insert the lower end of the split range into the B as INSERT (B,[$I_{f_L}$,$I_{P_H}$], f).
      iv. Insert the upper end of the split range into the B as INSERT (B,[$I_{S_L}$,$I_{f_H}$],f)

(c) Insert the new range into the BORDERWRITE tree as INSERT (B,I,t).
(d) Return success.
4. Else (|F|=0) then:
   (a) Extend I if necessary:
      i. Run STRICTSUCCESSOR (B,P) to retrieve ⟨ $I_S,t_2$ ⟩.
      ii. If a successor is found and $t=t_2$ then extend I to include $I_S$ in the BORDERWRITE table:
         A. Remove the successor range from B as DELETE (B,$I_S$,t).
         B. Insert an extended range to cover both I and $I_S$ as INSERT (B,[P,$I_{S_H}$],t).
         C. Return success.
      iii. Run STRICTPREDECESSOR (B,P) to retrieve ⟨ $I_p,t_3$ ⟩.
      iv. If a predecessor is found and $t=t_3$ then extend I to include $I_p$ in the BORDER-WRITE table:
         A. Remove the predecessor range from B as DELETE (B,$I_P$,t).
         B. Insert an extended range to cover both I and $I_p$ as INSERT (B,[$I_{P_L}$,P], t)
         C. Return success.
   (b) Insert I into B as INSERT (B,I,T).
   (c) Return success.
To update the BORDERWRITE tree B to exclude ⟨ [P,P],t ⟩:
1. Let I=[P,P].
2. Run a FIND OVERLAPS (B,I,k=1) query to retrieve set F where either F={⟨ $I_F,t_F$ ⟩} or F=φ.
3. If |F|=0 return success.
4. Else if |F|1∧$t_F$≠t then return success.
5. Else (|F|=1∧$t_F$=t), so:
   (a) Remove the overlapping range from B as DELETE (B,I,t).
   (b) Run STRICTSUCCESSOR (B,P) to retrieve ⟨ $I_S,t_2$ ⟩.
   (c) Run STRICTPREDECESSOR (B,P) to retrieve ⟨ $I_P,t_3$ ⟩.
   (d) If a predecessor is found and a successor is found and $t_2=t_3$ then merge $I_S$, $I_P$ and the set of points between them as:
      i. Remove the successor range from B as DELETE (B,$I_S$, $t_2$).
      ii. Remove the predecessor range from B as DELETE (B,$I_P,t_2$).
      iii. Insert the extended range as INSERT (B,[$I_{P_L},I_{S_H}$],$t_2$).
   (e) Return success.

The system escalates locks when running short on memory to hold the lock table. To escalate locks, the system finds one or more adjacent ranges from the same transaction, and merges them. If no such ranges can be found, then the system allocates more memory to the lock table, and may remove memory allocated to other data structures including but not limited to the buffer pool.

To implement serializable transactions:
1. When inserting a pair, the system obtains a write lock on the pair. If the lock is obtained, the pair is inserted.
2. When looking up a pair, the system obtains a read lock on the pair. If the lock is obtained, the pair is looked up in the dictionary.
3. When querying to find the smallest pair q greater than or equal to a particular pair p, the system performs the following:
   (a) Search to find q.
   (b) If no such value exists, then find the largest value r in the dictionary, and lock the range [r,∞]. If the lock cannot be obtained, then the query fails. Otherwise the query succeeds, and returning an indication that there is no such value.
   (c) If p=q then the system acquires a read lock on [q,q]. If the lock is obtained, the query succeeds, else it fails.
   (d) Else search to find the successor s of q. If such successor exists, then lock [q,s], otherwise lock [q,∞]. If the lock cannot be acquired, then the query fails, otherwise the query succeeds.
4. When querying to find the successor q of p, where p has already been returned by a previous search (for example in a cursor NEXT operation), the system performs the following
   (a) Search to find q. If no successor exists, then let q=∞.
   (b) Lock the range [p,q].

The system also performs other queries, including but not limited to finding the greatest pair less than or equal to a given value, and finding the predecessor of a value.

Alternatively, instead of failing when a lock conflict is detected, the system could perform another action. For example, the system could retry several times, or the system could retry immediately, wait some time, retry again, wait a longer time, and retry again, eventually timing out and failing. Or the system could simply wait indefinitely for the conflicting lock to be released, in which case the system may employ a deadlock detection computation to kill one or more of the transactions that are deadlocked.

The system also provides other isolation levels. For example, to implement a read-committed isolation level, the system acquires read locks selected data but they are released immediately, whereas write locks are released at the end of the transaction. For read uncommitted, read locks are not obtained at all. In another mode, the system implements read-committed isolation by reading the committed transaction record from a leaf entry (described below), and implements read-uncommitted by reading the most deeply nested transaction record from a leaf entry, in both cases without obtaining a read lock. For repeatable read isolation levels, instead of locking ranges, the system can lock only those points that are actually read. For snapshot isolation the system can keep multiple versions of each pair instead of using locks, and return the proper version of the pair in response to a query.

Transaction Commit and Abort

When a transaction commits or aborts, the system performs cleanup operations to finish the transaction. If a transaction commits, the cleanup operations cause the transactions change to take permanent effect. If a transaction aborts, the system undoes the operations of the transaction in a process called rollback.

The system implements these transaction-finishing operations by maintaining a list of operations performed by the transaction. This list is called the rolltmp log.

For example, each time the system pushes an insert message (2801) into the dictionary, it remembers that. If the transaction aborts, then an abort_both (2808) is inserted into the dictionary to cleanup. If the transaction commits, then a commit_both (2806) is inserted.

For each operation, the system stores enough information in the rolltmp log so the proper cleanup operations can be performed on abort or commit.

In the case where the system crashes before a transaction commits, then during recovery transactions are created and a rolltmp log is recreated. When recovery completes, if there are any incomplete transactions, then recovery aborts those transactions, executing the proper cleanup actions from the rolltmp log.

Error Messages, Acknowledgments, and Feedback

The system can return acknowledgments and error messages depending on the specific settings in the dictionary.

For example, the operations INSERT(k,v) or DELETE(k) in the NODUP case can return an additional Boolean indicating whether, at the time that the command was issued, there already existed a key k in the database. A return value of FALSE means that the key k did not exist in the database at the time of the insert, and a return value of TRUE means that it did. For the INSERT(k,v) operation, depending on the operating mode, an old value v' can be overwritten by the value v or the insertion of value v can be disallowed by the system because of the existence of old value v'.

The operations INSERT(k,v) or DELETE(k) in the DUP case can return an additional Boolean indicating whether, at the time of the insertion, there already existed a key k in the database. For the operation INSERT(k,v), there can be an additional Boolean indicating whether the key-value pair (k,v) already existed in the database. For the operation DELETE(k), the number of key-value pairs that were deleted can be returned.

One way to determine a status Boolean is to perform an implicit search when performing INSERT(k,v). That is, before starting INSERT(k,v), perform the operation Search(k) to determine whether k already appears in the dictionary.

In another mode the system returns these status Booleans by filtering out some of the search operations by using a smaller dictionary, or an approximate dictionary, that can fit within RAM, thus avoiding a full Search(k).

The system uses ten different filters that store information about which keys are in the streaming dictionary. Alternatively, the system could use a different number of filters.

The filter is implemented using a hash table. Denote the hash function as h(x). Suppose that there are N keys. Then the filter stores $\Theta(N)$ bits, where the number of bits is always at least 2N. Then H[t]=1 if and only if there exists a key k stored in the dictionary such that h(k)=t.

This filter exhibits one-sided error. That is, the filter may indicate that a key k is stored in the dictionary when, in fact, it is not. However, if the filter indicates that a key k is not in the dictionary, then the key is absent. Each filter has a constant error probability. Suppose that the error probability is ½. Then the probability that all 10 filters are in error is at most $2^{-10}$.

The total space consumption for all filters can be less than 32 bits per element, which will often be more than one or two orders of magnitude smaller than the total size of the dictionary.

Observe that in this specification uses a variation on the filter that supports deletions. One such variation is called a counting filter.

If for a given key all filters say that the key may be in the dictionary, then the system searches for it to determine whether it is. If one or more say that it is not in the dictionary, then the system does not search for it. Even if a single filter of the ten indicates that a key k is not in the dictionary, then it is not necessary to search in the actual dictionary. Thus, the probability of searching in the dictionary, when the key is not present, is approximately $2^{-10}$.

Thus, the cost to insert a new key not currently in the dictionary can be reduced by an arbitrary amount by adding more RAM, to well below one disk seek per insertion. The cost to insert a key already in the dictionary still involves a full search, and thus costs $\Omega(1)$ memory transfers.

In some situations, the system makes all insertion operations give feedback in o(1) memory transfers by storing cryptographic fingerprints of the keys in a hash table. The data structure uses under 100 bits per key, which is often orders of magnitude smaller than the size of the streaming B-tree.

Figure 15:
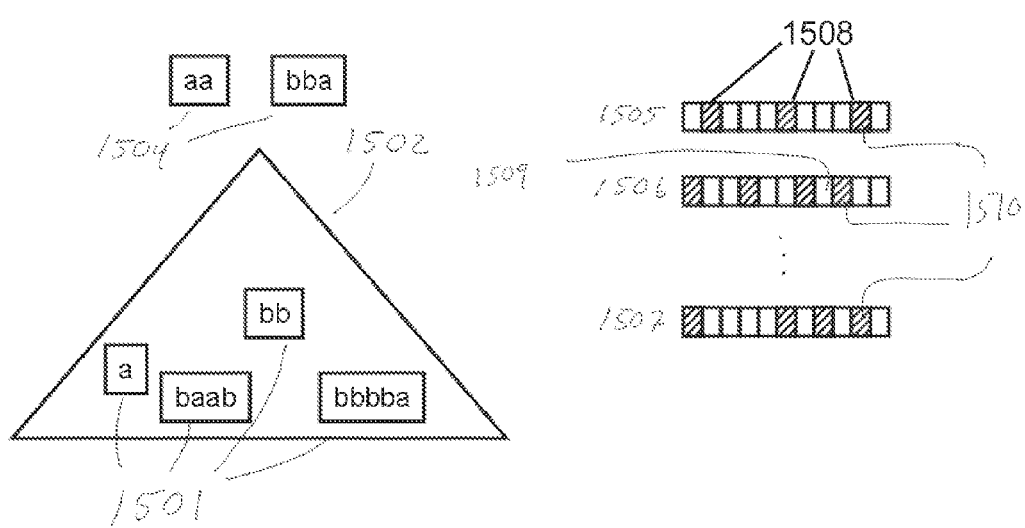
FIG. 15 depicts a system providing additional acknowledgments and feedback upon updates.

Refer now to FIG. 15 in which there is additional feedback provided to the users upon updates. In this figure, there are four keys (1501) in the tree (1502), a, baab, bb, and bbbba. The hash tables have 11 array positions and are indexed from 0 to 10. Two keys (1504) are to be inserted in the tree, aa and bba.

The first table (1505), $T_1$, has hash function $h_1(x)$, which hashes the four values in the tree as follows:

$h_1(a)=5$ $h_1(baab)=9$ $h_1(bb)=9$ $h_1(bbbba)=1$, and hashes the two new values as follows:

$h_1(aa)=5$ $h_1(bba)=9$.

The second table (1506), $T_2$, has hash function $h_2(x)$, which hashes the four values in the tree as follows:

$h_2(a)=8$ $h_2(baab)=0$ $h_2(bb)=6$ $h_2(bbbba)=3$, and hashes the two new values as follows:

$h_2(aa)=7$ $h_2(bba)=8$.

The last table (1507), $T_{10}$, has hash function $h_{10}(x)$, which hashes the four values in the tree as follows:

$h_{10}(a)=0$ $h_{10}(baab)=9$ $h_{10}(bb)=7$ $h_{10}(bbbba)=5$.

and hashes the two new values as follows:

$h_{10}(aa)=3$ $h_{10}(bba)=9$.

In all tables, hash marks indicate that an element is hashed to that array position (1508). Upon insertion of a key, the data structure returns whether that keys already exists in the tree or not.

In this example, the two keys (1504) are to be inserted in the tree, aa and bba, and neither one already exists. Inserting aa does not require a search in the tree because $T_2[h_2(aa)]=T_2[7]=0$, as shown at (1509), meaning that aa cannot already be stored in the dictionary. In contrast, to determine whether bba is in the dictionary uses a search because for all i in the hash table $T_i[h_i(bba)]=1$ as shown at (1510).

Alternatively, other feedback messages can be returned to the user. For example, one could give feedback to the user that is approximate or has a probability of error.

Alternatively, there are other parameter settings that can be chosen. For, example, the sizes and number of approximate dictionaries could vary.

Alternatively, other compact dictionaries and approximate dictionaries can be used. For example, one can use other filter and hash-table alternatives.

Alternatively, there are other ways to return error messages and acknowledgments to users without an immediate full search in many cases. For example, the feedback can be returned with some delay, for example, after inserted messages have reached the leaves. Another example is that after a load has completed, an explicit or implicit flush can be performed—an implicit flush, say, by a range query—to ensure that all messages have reached the leaves, and all acknowledgments or error messages have been returned to the user.

Concurrent Streaming Dictionaries

The system provides support for concurrent operations. The system allows one or more processes and/or processors to access the system's data structures at the same time. Users of the system may configure the system with many disks, processors, memory, processes, and other resources. In some cases the system can add these resources while the system is running.

The system employs when a message M(k,z) is added to the data structure, does not necessarily insert it into the root node u. Instead, M(k,z) is inserted into a deeper node v on M(k,z)'s root-to-leaf path, where v is paged into RAM.

This "aggressive promotion" can mitigate or avoid a concentrated hot spot at the top of the tree. When a message M(k,z) is inserted into the data structure, there is a choice of many first nodes in which to store M(k,z). Moreover, the system's data structures automatically adapts to the insertion and access patterns as the shape of the part of the tree that is stored in RAM changes.

Several examples help explain this adaptivity.

Figure 16:
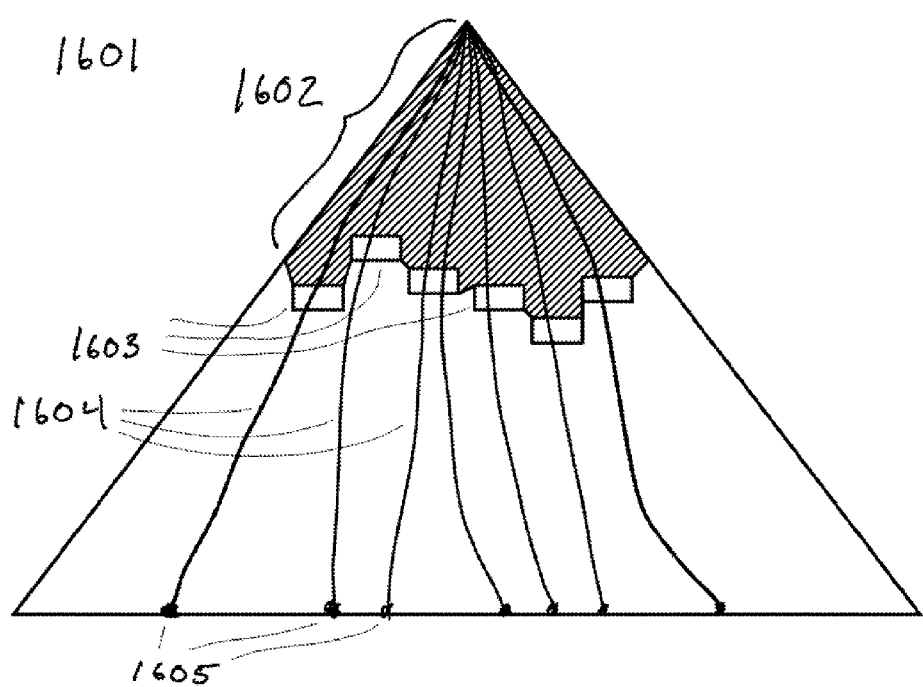
FIG. 16 depicts a system in which there are concurrent insertions which are uniformly randomly distributed in the keyspace.

FIG. 16 depicts the case of updates from a uniform distribution of random keys into a dictionary (1601). Suppose that there are concurrent insertions of uniformly distributed random keys. The lines (1604) down the tree represent paths that the keys are to take down the tree and the dots (1605) at the leaves of the tree represent the ultimate locations for the keys in the tree.

At a particular time some of the nodes in the tree that are closest to the root are paged into memory. The part of the tree that is paged into memory is indicated by hash marks (1602). In this figure the paged-in part of the tree is nearly balanced. Messages are inserted into the leaves (1603) of the part of the tree that is kept in main memory.

Figure 17:
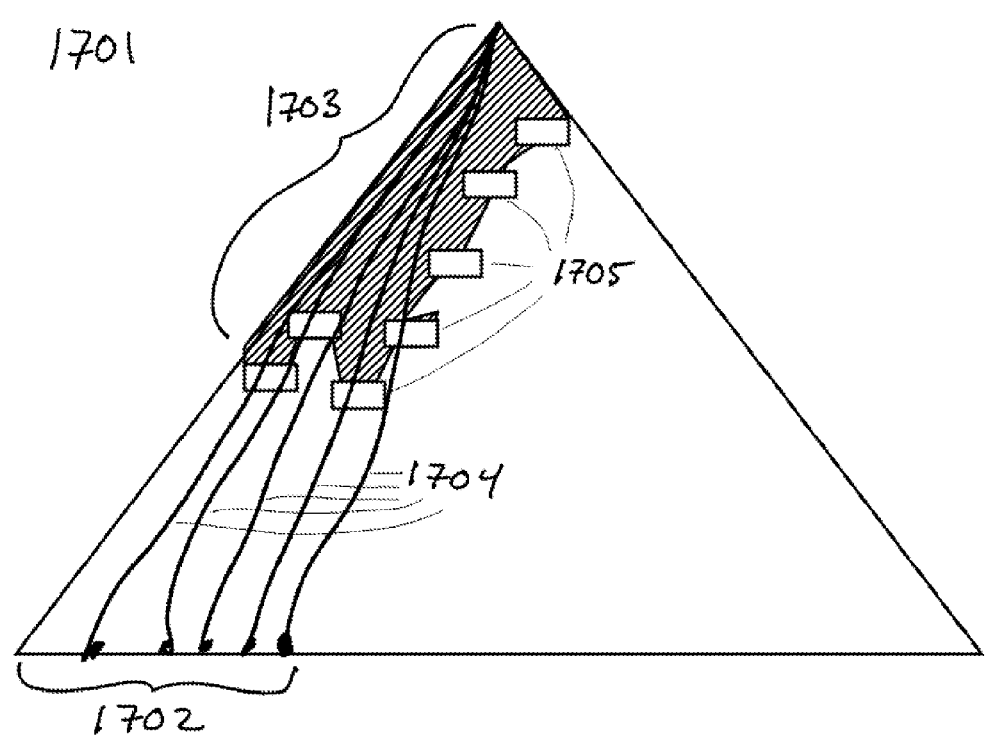
FIG. 17 depicts a system in which concurrent insertions exhibit a skewed distribution.

Refer now to FIG. 17, which depicts a skewed case of insertions into the data structure (1701). Suppose that there are concurrent insertions at random locations in the leftmost 1% of the tree (1702), rather than in the whole tree.

The top part of the tree that is paged into memory is be skewed towards the beginning of the database. This part of the tree is indicated by hash marks (1703). Thus, this top part of the tree will be deep on leftward branches and shallow on rightward branches, so that, again, the paging system will adaptively diffuse what would otherwise be an insertion hotspot. As before, the vertical lines (1704) emanating from the root represent insert paths in the tree and the locally deepest nodes paged into memory are represented by rectangles (1705). The messages will be inserted into these locally deepest nodes 1705.

The system obtains a write lock on a node when it inserts data into a node, and so by inserting into different nodes, the system can reduce contention for the lock on a given node.

Alternatively, there are other ways to achieve concurrency through adaptivity. For example, if a tree node is a hot spot, the system could explicitly choose to flush the buffers in the node and bring the children into RAM, if it reduces the contention on that node. Also, the system may choose to deal with a given node differently, depending on whether it is clean or dirty.

Alternatively, there are other ways of using aggressive promotion to help achieve a highly concurrent dictionary. For example, one could use aggressive promotion for a non-tree-based streaming dictionary, such as a cache-oblivious lookahead array, to avoid insertion bottlenecks.

Alternatively, there are other ways of avoiding bottlenecks and achieving high concurrency. For example, one could use a type of data structure with a graph structure having multiple entrances into the graph, e.g., a tree with multiple roots or roots and some descendants or a modification of a skip graph. For example, one may replace the top $\Theta(\log\log N)$ levels of the tree or other data structure with a skip graph. This would reduce the concurrency without changing the asymptotic behavior of the dictionary.

Alternatively, additional concurrency can be achieved by having multiple disks. For example, one could use striping across all disks to make effectively bigger tree blocks. Alternatively, one could divide up the search space according to keys so that different keys are stored on different disks.

DUP and NODUP

The system can handle both NODUP and DUP dictionaries.

1. No duplicate keys allowed (NODUP). This means that no two key-value pairs that are stored in the dictionary at the same time can have keys that compare as identical.
2. Duplicates keys allowed (DUP). This means that two key-value pairs that are stored in the dictionary at the same time are allowed to have keys that compare as identical, but when the keys compare as identical, the associated values must not compare as identical.

Duplicates are stored logically in sorted order. Specifically, key-value pairs are first sorted by key. All elements with the same key are sorted in order by value.

The following are examples of functions that are supported with duplicate keys.

1. INSERT (k,v): Inserts a key-value pair (k,v). If there already exists a key-value pair (k', v'), where k'=k and v'=v, then there are several choices depending on how flags are set. Either (k', v') is overwritten or it is not. In either case, a call-back function may be called. Although v and v' are compared as equal, their values considered as byte strings may be different.
2. DELETE(k): Deletes a key k. In this case, all key-value pairs (k',v) such that k'=k are deleted.
3. DELETE(k,v): Delete a key-value pair (k,v). Any key-value pair (k',v') in the dictionary with k'=k and v'=v is deleted.
4. Cursor delete. The key-value pair that the cursor points to is deleted.
5. Cursor replace with V. If the key-value pair (k,v) that is pointed to by the cursor has v'=v, then it is replaced with (k,v').
6. Search for a particular key k. The first or last key-value pair (k', v), where k'=k, is returned (if one exists) for one setting of flags. For another setting of flags, the search returns a cursor that points to (k', v).
7. Search for a particular key-value pair (k,v). If a key-value pair (k', v') is in the dictionary, such that k'=k and v'=v, then return (k', v').
8. Find the predecessor or successor of key k or a key-value pair (k,v), if it exists. The search could also find a predecessor or successor key-value pair, if it exists.

In one mode the system employs PMAs that operate in a DUP or a NODUP mode. For example, when duplicate nodes are inserted into a PMA, they are put in the appropriate place in the PMA, as defined by the ordering of pairs.

In one mode the system employs hash tables that operate in a DUP or a NODUP mode. In a NODUP mode, the hash tables stores messages. In a DUP mode, the system employs an extra level of indirection in hash tables, storing doubly-linked lists of messages. Messages are be hashed by key k and all messages associated with the same key k are stored in the same doubly-linked list. The hash function used maps keys k and k' to the same bucket if k=k'.

In DUP mode the system allocates a hash table with a number of buckets proportional to the number of distinct key equivalence classes.

In another mode, the system uses a hash table in DUP mode, in which the system hashes both the key and the value.

The system stores key-value pairs in search trees. In a search tree, the system employs pivot keys that are comprise in a NODUP mode and that comprise key-value pairs in a DUP mode.

In DUP mode, the subtrees to the left of a pivot key contain pairs that are less than or equal to the pivot key. The subtrees to the right of the pivot key contains pairs that are greater than or equal to the pivot key. The nodes of the tree further comprise two additional Booleans, called equality bits. The equality bits indicate whether there exist any equal keys to the left and to the right of the pivot respectively.

To search, the system uses both the pivots and equality bits to determine which branch to follow to find the minimum or maximum key-value pair for a given key.

When a delete message is flushed from one buffer, the message is sent to all children that may have a matching key. All the duplicates are removed. For a cursor delete, the system deletes the item that is indicated by the cursor.

To insert, the system can use both the key and values to determine the correct place to insert 3195 key-value pairs.

In one mode the system handles duplicates with identical values, called DUPDUP pairs. In DUPDUP mode when a key-value pair is inserted, where that key-value pair is a DUPDUP of another key-value pair in the dictionary, then there are one or more cases for what can happen, depending on how flags are set. For example:
1. Overwrite: One DUPDUP pair overwrites a previous one.
2. No overwrite: One DUPDUP pair does not overwrite a previous one, instead the previous one is kept, and the new one is discarded.
3. Keep: both pairs are kept.

Alternatively, there are other ways of storing DUP and DUPDUP pairs. For example, duplicates could be stored in sorted order according to the time that they were inserted or they could be stored in an arbitrary order. For example, if the size of two rows with the same key is different, then a larger or smaller row might be pushed in preference to the other.

Alternatively, these other orders can be maintained with minor modifications to the system described here. For example, to store pairs in sorted order based on insertion time, add a time stamp, in addition to the key and the value, and sort first by key, then by time stamp, and then by value, thereby organizing duplicate duplicates for storage. Other types of unique identifiers, time stamps, and very minor modifications to the search function also can be used in other ways of storing duplicates.

Multiple Disks

The system can use one or many disks to store data. In one mode the system partitions the key space among many disks. Which disk stores a particular key-value pairs depends on which disk (or disks) is responsible for that part of the key space.

This scaling is achieved partially through a partition layer in the system. The partition layer determines which key-value pairs get stored on which disks.

The partition layer uses compact partitioning, or partitioning for short. In compact partitioning, the key space is divided lexicographically. For example, if there are 26 processor-disk systems and the keys being stored are uniformly distributed starting with letters 'A'-'Z', then the first processor-disk could contain all the keys starting with 'A', the second could contain the keys starting with 'B', and so forth. In this example, the keys are uniformly distributed. We describe here compact partitioning schemes that are designed to work efficiently even when the keys are not distributed uniformly.

Figure 53:
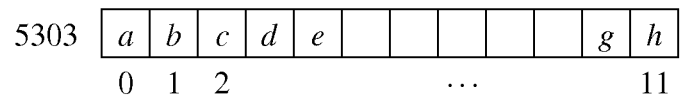
FIG. 53 depicts two disks implementing compact partitioning.
Figure 53:
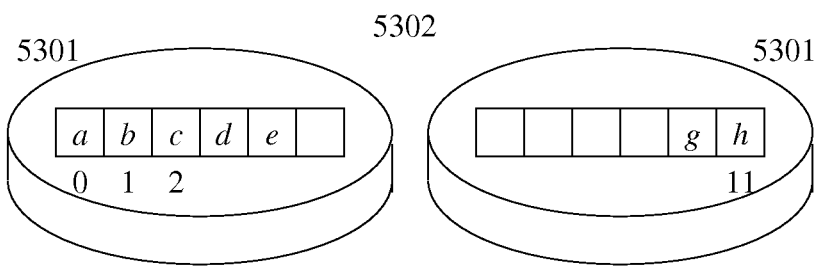
Figure 53:
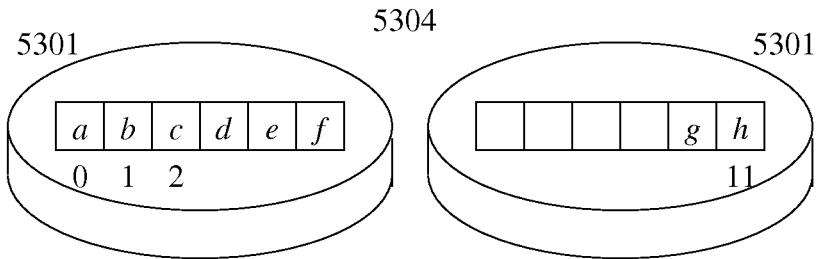
Figure 53:
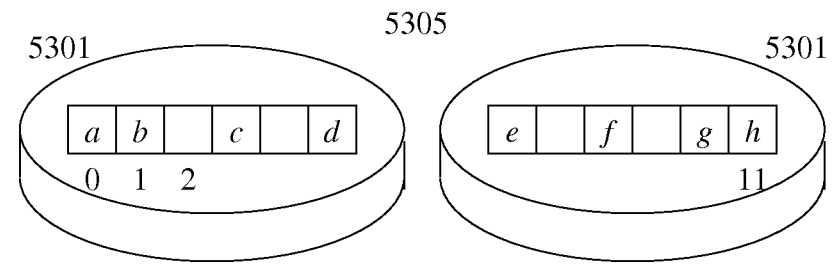

FIG. 53 illustrates compact partitioning for a system with two disks (5301). A PMA (5303) is distributed across the disks (5301) as shown at (5302). In this case, the values a through e are stored at offsets 0-4 respectively (all in the first disk), and the values g and h are stored at offsets 10 and 12 respectively (at the end of the second disk). If the system inserts f at offset 5, (as shown at (5304)) then the first disk is determined to be above its density threshold, and the system redistributes data (as shown at (5305)).

In one mode the system employs PMA-based compact partitioning. In this mode the key space is partitioned lexicographically, assigning each partition to one disk cluster. Recall that a PMA is an array of size $\Theta(N)$, which dynamically maintains N elements (key-value pairs) in sorted order. The elements are kept approximately evenly spaced with gaps.

The system establishes a total order on the disks compatible with the dictionary, meaning that if disk A is before disk B in the total order, then all elements (key-value pairs) stored on disk A are lexicographically before all elements stored on disk B. These disks in order form a virtual array of storage whose length is the capacity of a disk system or subsystem. We treat this virtual array as a PMA storing all elements. When an element moves from part of the array associated with one disk to part of the array associated with another disk, then that element is migrated between disks.

The system chooses the rebalance interval so that it only overlaps the boundary between one disk and the next if that disk is nearly full. Alternatively, the rebalance interval can be chosen so that it crosses the boundary between one disk and the next when one disk has a substantially higher density than a neighbor.

The system's linear ordering of the disks takes into account the disk-to-disk transfer costs. For example, it is often cheaper to move data from a disk to another disk on the same machine than it is to disks residing elsewhere on a network. Consider a transfer-cost graph G, in which the nodes are disks, and the weight on edge is some measure of the cost of transferring data. This weight can take into account the bandwidth between two disks, or the weighted bandwidth that is reduced if many disks need to share the same bus or other interconnect link. Alternatively, the system could also take into account the latency of transfer between disks. For example, the weighting function can decrease with increasing connectivity.

Alternatively, one disk could simulate several smaller disks in the PMA of disks. For example, if large disks are partitioned into smaller virtual disks, and then the disks are ordered for the PMA layout, one might choose for different virtual disks from the same disk not to be adjacent in the PMA order. Thus, the PMA could be made to wrap around the disks several times, say, for the purposes of load balancing. Such wrapping could, for example, allow the system to employ some subset of disks serve as a RAID array, with data striping across the RAID.

Alternatively, the system could accommodate disks of different sizes.

Alternatively, there are many choices for choosing a linear order on the disks. For example, a traveling salesman problem (TSP) solution for G (or an approximate TSP solution) can be used to minimize the total cost of edges traversed in a linearization. Or a tour on a minimum (or other) spanning tree of G can be used. Or the system could choose an ordering that is approximately optimal, for example an ordering that can be proved to be within a factor of two of optimal.

In one mode, the system employs "disk recycling". In this mode, the system does not keep a total order on disks. Instead, a total order is kept on a subset of disks and other disks are be kept in reserve. If a region of key space stored on a disk becomes denser than a particular threshold, a reserved disk is deployed to split the keys with the overloaded disk. If another region of key space stored on a disk becomes sparser than a particular threshold, elements are migrated off the underused disk, and the newly empty disk can be added to the reserve.

Figure 54:
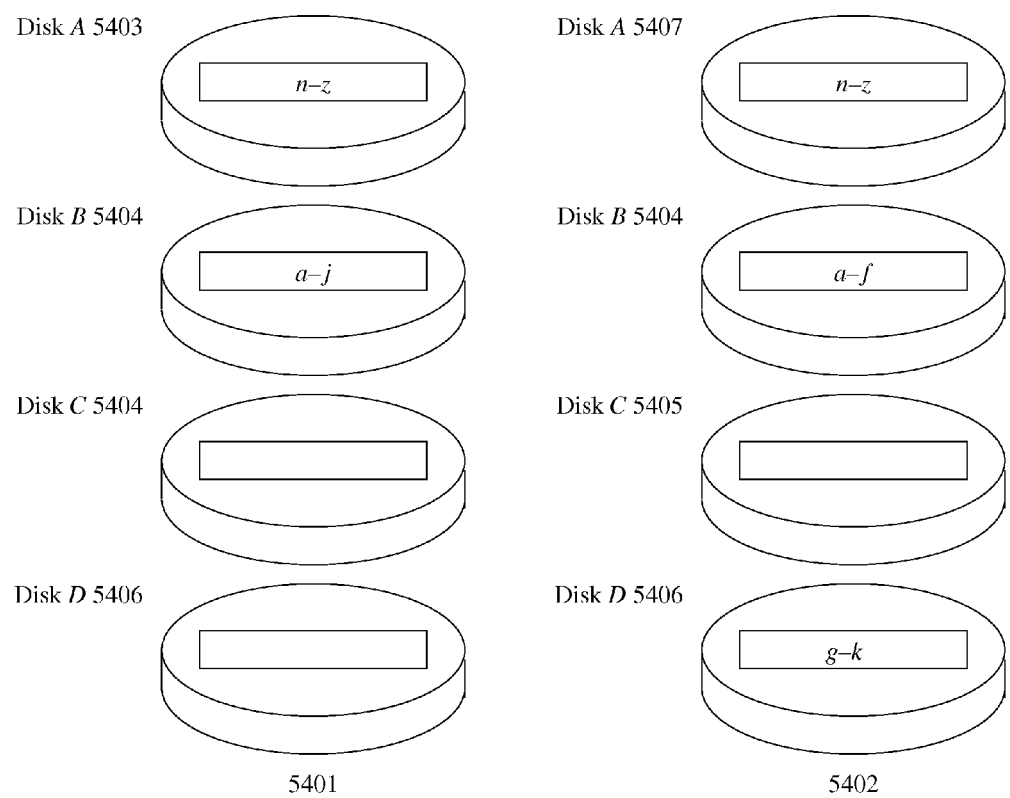
FIG. 54 depicts disk recycling.

FIG. 54 illustrates disk recycling. Disks are labeled A, B, C, and D. The first column (5401) shows the state of the disks before inserting, and the second column (5402) shows the state of the disks after inserting and rebalancing. Initially Disk B (5404) holds keys a through j. Disk A (5403) holds keys n through z. Disks C (5405) and D (5406) are free. This illustrates that the ordering of the disks imposed by the operating system or file system (A, B, C, D) may be different than the order imposed by the PMA (B,A, with C and D not ordered). If k is inserted into disk B (5408) and it becomes overfull, then disk D (5410) can be used, so that the PMA-induced ordering is B,D,A, with disk B (5408) holding a through f, disk D (5410) holding g through k, and disk A (5407) still holding n through z, and disk C (5409) free, as shown at (5402).

In one mode the system employs an adaptive PMA (APMA). In an APMA, the system keeps a sketch of recent insertion patterns in order to learn the insertion distribution. The sketch allows the system to leave extra space for further insertions in likely hot spots.

In one mode the system replaces the PMA over the entire array with an APMA. In the case of disk recycling, the system uses an APMA over all the disks, rather than the elements, to predict where to deploy spare disks. Since an APMA rebalances intervals unevenly, leaving some interval relatively sparse, the recycled disks can take the role of sparse intervals.

Figure 55:
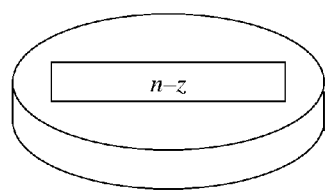
FIG. 55 depicts disk recycling in an APMA mode.
Figure 55:
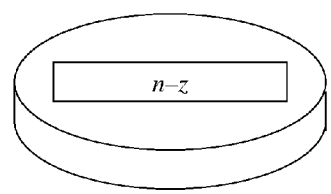
Figure 55:
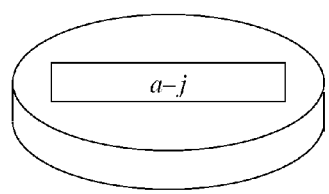
Figure 55:
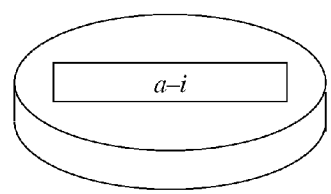
Figure 55:
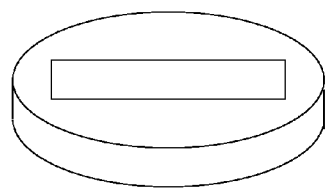
Figure 55:
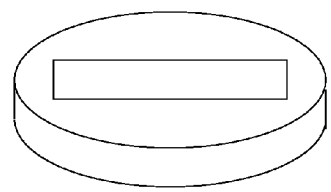
Figure 55:
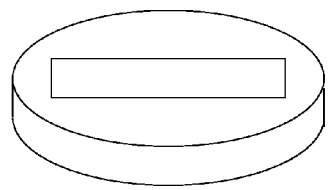
Figure 55:
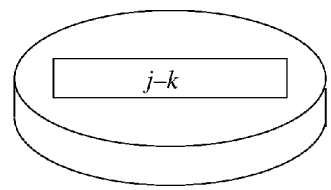

FIG. 55 illustrates disk recycling in an APMA mode. This figure is the same scenario as for FIG. 54, except that in this example, the system expects that there will be many insertions between k and n, so it moved little data from disk B to disk D so that disk D can accept more insertions without migrating data. Initially the disks (5501) are in the same state as for the initial state (5401) in FIG. 54. That is disks A (5503), B (5504), C (5505), and D (5506) are in the same state as disks A (5403), B (5404), C (5405), and D (5406) respectively.

After rebalancing (5502) disk D (5510) contains keys j-k instead of g-k. Disk B (5508) contains keys a-i, and Disk A (5507) contains keys n-z. Disk C (5509) is free.

Alternatively, the disk-to-disk rebalancing system could move elements in the background, during idle time, during queries, or at other times, for example to improve hot-spot dissipation.

Alternatively, the system could group together several smaller disks to simulate a larger disk. For example, these disk groups can divide up their allotted key space by consistent hashing (hashing for short), where keys are hashed to disks at random, or nearly at random, and an streaming dictionary could be maintained on each disk.

When keys are hashed this way, host spots are diffused across all disks participating in the hashing scheme. If the system cannot predict where a successor or predecessor lies, then the system can replicate queries across all the disks when performing successor or predecessor queries.

In a hybrid scheme, if each group has k disks, the system can employ the bandwidth of all k disks to diffuse a hot spot, and the system can limit the replication of queries to these k disks. When the dynamic partitioning scheme changes a partition boundary, thus causing items to move from one partition to another, the system can delete the items from k disks and insert them onto k other disks. The parameter k is tunable, and the system can increase insertion scaling by increasing k, whereas the system can increase query scaling by decreasing k. Finally, the parameter k need not be fixed for all clusters.

An alternative approach is to reserve j disks as a buffer. Keys are first inserted into the buffer disks, and these are organized by hashing. The remaining disks are organized by partitioning. As keys are inserted into the buffer, keys are removed from the buffer and into the partitioned disks. If the system detects a particularly large burst of insertions into a narrow range of keys, it can recycle disks into that part of the key space to improve the performance of the partitioned disks.

In this approach, queries can be performed once on the partitioned disks, and replicated j-fold in the hashed buffer disks.

Alternatively, compact partitioning can be used for other kinds of dictionaries and data storage systems.

Buffer Flushing as Background Process

In one mode, the system performs buffer flushing as a background process. That is, during times in which the disks and processors are relatively idle, the system selects buffers and preemptively flushes them.

To implement background buffer flushing the system maintains a priority queue, auxiliary dictionary, or other auxiliary structure storing some or all of the buffers in the tree that need to be flushed. When the CPU, memory system, and disk system have spare capacity (e.g., because they are idle), the system consults the auxiliary structure, bringing nodes into RAM, and flushing the relevant buffers.

This auxiliary structure is maintained along with the tree, but it is much smaller. When the buffers in the tree are changed, then so does the auxiliary structure. The auxiliary structure could be stored exclusively in RAM, or in some combination of RAM and disk.

Alternatively, there are many ways to prioritize the buffers that need to be flushed. Examples include, but are not limited to 1. giving higher priority to buffers that contain more elements,
2. giving higher priority to buffers that are fuller,
3. giving higher priority to nodes that contain less available space,
4. giving higher priority to buffers that were modified or read recently,
5. giving higher priority to nearly full buffers that are higher up in the tree,
6. giving higher priority to nodes whose flushes would not overflow their children, and
7. combinations of those priorities.

Alternatively, there are other ways of keeping track of which nodes need flushing. For example, the system could keep not all nodes from the main tree in the auxiliary structure, but instead, only keep those buffers that are getting full and in need of flushing. Then, when there is idle time, the system could consult this smaller structure. The buffers could be flushed in one of the orders described above or in an arbitrary order. Other strategies could also be used.

Alternatively, background buffer flushing can apply to other streaming dictionaries, including but not limited to those that are not tree-based, including but not limited to a COLA, a PMA, or an APMA. For a COLA, the system can preemptively flush regions of levels that are getting dense. A PMA or an APMA might selectively flush a level of the rebalancing hierarchy.

Overindexing

In one mode the system implements overindexing. Recall that a nonleaf node has a sequence of keys $\langle k_1, \ldots, k_a \rangle$ and pointers $\langle p_0, \ldots, p_a \rangle$ to children. All keys $k<k_1$ belong on the path going through the child pointed at $p_0$. All keys $k$, $k_i \le k < k_{i+1}$, belong on the path going through the child pointed at $p_i$.

In an overindexing mode, a node that is the parent of leaves keeps a larger sequence $$\langle k_{0,1}, k_{0,2}, \ldots, h_{0,b}, k_{1,1}, \ldots, k_{a,b} \rangle$$

of monotonically increasing keys, where $k_{i,1} = k_i$ above. Similarly the pointers are augmented to the sequence $$\langle p_{0,1}, p_{0,2}, \ldots, p_{0,b}, p_{1,1}, \ldots, p_{a,b} \rangle$$

where $p_{i,1} = p_i$ above. For every i, pointers $p_{i,1}$ to $p_{i,b}$ point to different places in the same leaf. If some element (k,v) in child c has the smallest k such that $k_{i,j} \le k < k_{i,j+1}$, then $p_{i,j}$ points to the location of (k,v) in c.

The choices of keys $k_{i,j}$ are made so as to split the elements of each leaf into parts that are sized within a factor four of each other.

In a system with overindexing, the system fetches only an approximately 1/b fraction of a leaf that contains the element of interest.

Alternatively, the pivots keys might be chosen not to evenly split by the number of elements in a leaf, but to approximately evenly split the sums of their sizes, or the probability of searching between two keys, or the probability of searching between two keys, weighted by the sizes of the elements, where the probability of accessing elements or subsets of elements can be given or measured or some combination thereof.

Furthermore, b need not be the same constant for each leaf.

Alternatively, nodes higher than leaf-parents can have overindexing, and in this case, the overindexing pointers might point to grandchildren. In this case, the buffers in overindexed nodes might be partitioned according to the overindexing pivot keys. Then, if some such subbuffer grows large enough, the elements in a subbuffer could be flushed to a grandchild, rather than to the child.

Loader

The system includes a loader that can load a file of data into a collection of dictionaries. The system also sometimes uses the loader for other purposes, including but not limited to creating indexes and rebuilding dictionaries that have been damaged.

The loader is a structure that transforms a sequence of rows into a collection of dictionaries.

The loader is given a sequence of rows; information that the loader uses to build a set of zero or secondary indexes; and a sort function for the primary rows and for each secondary index. The loader then generates all of the key-value pairs for the secondary indexes; sorts each index and the primary row; forms the blocks, compressing them; and writes the resulting dictionary or dictionaries to a file. The system uses multithreading in two ways: (1) The system overlaps I/O and computation, and (2) the system uses parallelism in the compute-part of the workload. The parallelizable computation includes, but is not limited to compressing different blocks, and implementing a parallel sort.

The loader can create a table comprising a primary dictionary and zero or more secondary dictionaries. A table row is a row in a SQL table, which is represented by entries in one or more dictionaries. To insert a table row can require inserting many dictionary rows, including but not limited to the primary dictionary row and for each index a secondary dictionary row. Thus, for example, in a table with five indexes, a single table insertion might require six dictionary insertions.

When inserting data, the system passes the primary row to the loader. The loader constructs the various dictionary rows from the primary row, sorts the dictionary rows, and builds the dictionaries.

Figure 56:
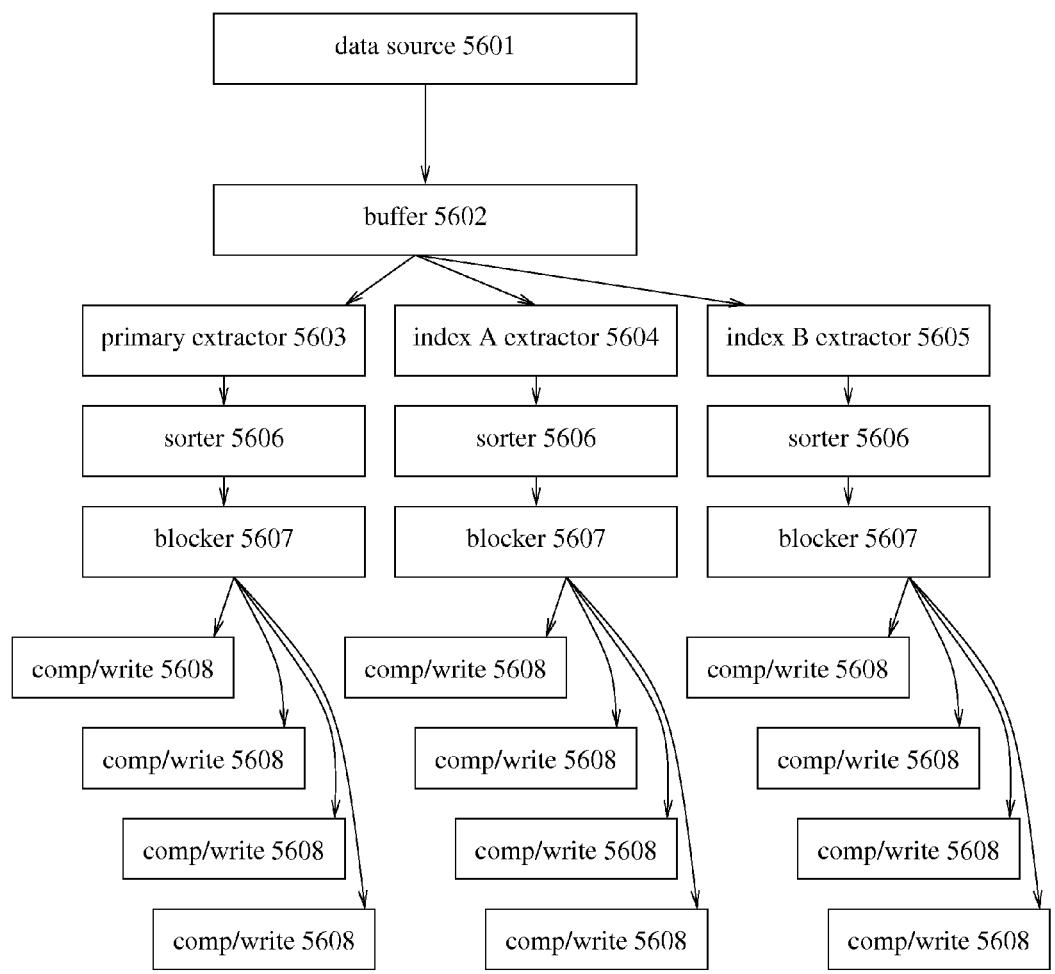
FIG. 56 depicts a loader pipeline.

One way to understand how the loader fits into a database SQL is as a data pipeline illustrated in FIG. 56. The pipeline illustrated is creating one primary dictionary and two secondary dictionaries. Data starts in a data source (5601), and is fed to a buffer (5602) one row or more at a time. In parallel there are three extractors: the primary extractor (5603) extracts a primary key-value pair for each row; the index A extractor (5604) extracts a key-value pair for a first index, called index A, for each row; and the index B extractor (5605) extracts a key-value pair for a second index, called index B, for each row. For each dictionary, after data has been extracted by its respective extractor, the data enters a sorter (5606), which sorts the data into the order specified by the dictionary. After being sorted, the data enters a blocker (5607) which forms data into nodes of a dictionary. Each node is then passed to a comp/write (5608) module which compresses the data and writes it out. All of the comp/write (5608) modules can run in parallel. The pipeline illustrated here specifies the abstract parallelism of the computation, and the system employs a scheduler to schedule the various modules onto particular processors. For example, in a system that has four processors, the scheduler might choose to actually run only 4 modules in parallel at a given time. There is parallelism within the modules, for example, within the sorter (5606), the system employs a parallel merge sort. In the example above with four processors, the scheduler might allocate two processors to the sorter (5606) and run two other modules in parallel. If a module completes, the scheduler might take the processor that was working on that module and apply it to a previously unscheduled module, or it might apply the processor to a module that can employ more parallelism, including but not limited to the sorter (5606). The scheduler dynamically allocates processors to work on the modules, adapting the number of processors allocated to a particular module even as the module is running.

Having described the preferred embodiment as well as other embodiments of the invention it will now become apparent to those of ordinary skill in the art that other embodiments incorporating these concepts may be used.

What is claimed is:

1. A computer program product, comprising a non-transitory computer usable medium having a computer readable program code embodied therein, said computer readable program code adapted to be executed to implement a method for storing data, said method comprising:

providing a system, wherein the system comprises distinct software modules, and wherein the distinct software modules comprise a front-end module, a buffer-pool module, a recovery module, a logging module, a locking module, and a file-maintenance module;

one or more data files being maintained by the file-maintenance module;

where a data file comprises a header, and one or more blocks;

where one or more of the blocks comprise bytes encoding a block translation table, and one or more of the blocks comprise bytes encoding leaf nodes, and one or more of the blocks comprise bytes encoding nonleaf nodes;

where a header comprises a root block number identifying a root block and a set of one or more block numbers identifying block translation table blocks;

where a block translation table comprises a number and an array, the number specifying the length of the array, the array indexed by a block number, each element of the array comprising a translation entry;

where a translation entry comprises a file offset and a size, the file offset and size identifying a block of one or more bytes in the file, the block number indexing the entry thus identifying the block;

where the block identified by the root block number comprises an encoding of a leaf node or a nonleaf node;

where a nonleaf node comprises
(a) a fingerprint seed,
(b) a fingerprint,
(c) a counter c,
(d) one or more child block numbers, where the number of child block numbers equals c, each child block number identifying a block comprising a leaf node or nonleaf node, the children being numbered consecutively from 0 to c−1,
(e) one or more pivots, where the number of pivots equals one less than the number of child block numbers, the pivots being numbered consecutively from 0 to c−2,
(f) one or more message queues, where the number of message queues equals c, the message queues being numbered consecutively from 0 to c−1, and
(g) a descriptor version number;

where a leaf node comprises
(a) a fingerprint seed,
(b) a fingerprint,
(c) a log sequence number,
(d) a sorted array of one or more leaf entries,
(e) a checksum, and
(f) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node the child block numbers of the node identify the respective children of the node;

where a value comprises a length and a sequence of one or more bytes;

where a pivot comprises a key;

where a key comprises a length and a sequence of one or more bytes;

where a key-value pair comprises a key and a value;

where a message queue comprises a FIFO (first-in-first out) of one or more messages;

where the FIFO of messages comprises a counter f and a sequence of one or more messages;

where the number of messages in the sequence equals f;

where the FIFO of messages supports operations comprising enqueueing a message and dequeueing the least recently enqueued message;

where a message comprises
(a) a message operation,
(b) a key,
(c) a value,
(d) a transaction-identifier-sequence length, and
(e) a sequence of one or more transaction identifiers, where the number of transaction identifiers equals the transaction-identifier-sequence length;

where a leaf entry comprises
(a) a transaction-record count, and
(b) a key;

where for a leaf entry in which the transaction-record count equals one, the leaf entry further comprises a value;

where for a leaf entry in which the transaction-record count is greater than one, the leaf entry further comprises a sequence of transaction records equal in length to the transaction-record count;

where a transaction record comprises a transaction record type, a transaction identifier, and a value;

where a transaction record type comprises an operation comprising an insert operation, a delete operation, and a placeholder operation;

where a transaction identifier comprises a log sequence number;

where a message operation comprises an insert operation, a delete operation, an abort operation, and a commit operation;

where, when the front-end module executes an insert of a key-value pair into a file in a transaction, the front-end module causes the locking module to acquire an exclusive lock on the key, and the front-end module creates a message in which the message operation comprises an insert operation, the key length and key comprise the key of the key-value pair, the value length and value comprise the value of the key-value pair, the transaction-identifier-sequence length comprises the depth of the transaction, where a transaction with no parents has depth one, and a transaction with a parent has depth equal to one plus the depth of the parent, and the sequence of transaction identifiers comprises the transaction identifier of the transaction, and of each of the transaction's ancestors, the front-end module then causing the file-maintenance module to insert the message into the root block identified in the header of the file;

inserting a message into nonleaf node comprising
(a) identifying which children the key of the message is to be delivered to,
(b) inserting the message into the FIFOs of the message queues respectively corresponding to the identified children, and
(c) determining if the total size of the node is larger than a specified value, and if so then flushing message queues of one or more children;

identifying which child a message is to be delivered to in a nonleaf node comprising comparing the pivot keys of the nonleaf node to the key of the message, thus identifying one or more children that can hold the message;

flushing message queues of one or more children comprising selecting a nonempty message queue, fetching the corresponding child block into main memory using the buffer-pool module, and removing one or more messages from the message queue and inserting said messages into the child block;

inserting a message into a leaf node, the insertion comprising
(a) fetching from the leaf node the leaf entry with the same key as the message, if such leaf entry exists, otherwise constructing an empty leaf entry,
(b) if the message operation comprises an insert operation or a delete operation then i. discarding any existing transaction record in the leaf entry that has the same innermost transaction identifier as the message,
ii. adding placeholder transaction records for every ancestor transaction identifier in the message that is not listed in the leaf entry,
iii. adding an insert or delete transaction record, depending on the operation of the message, for the innermost transaction of the message, the value length and value of the transaction record being copied from the message, and
iv. storing the resulting leaf entry into the leaf node,
(c) if the message operation comprises an abort operation and if the innermost transaction identifier of the leaf entry equals the innermost transaction identifier of the message, then
  i. removing the innermost transaction record of the leaf entry,
  ii. while the innermost transaction record is a placeholder, removing said innermost transaction record,
  iii. if the resulting leaf entry is empty, then deleting the original leaf entry, if any, from the leaf node, otherwise storing the new leaf entry into the leaf node, and
(d) if the message operation comprises a commit operation and if the innermost transaction identifier of the leaf entry equals the innermost transaction identifier of the message, then
  i. if the innermost transaction record of the leaf entry is a delete operation then
    A. removing the innermost transaction record of the leaf entry,
    B. if the resulting leaf entry is empty, then deleting the leaf entry from the leaf node,
    C. otherwise replacing the new innermost transaction record with the contents of the removed innermost transaction record without changing the transaction identifier of the new innermost transaction record, and
  ii. if the innermost transaction record of the leaf entry is an insert operation then
    A. removing the innermost transaction record of the leaf entry,
    B. if the resulting leaf entry is empty, then replacing the old leaf entry with a new leaf entry with transaction-record count equal to one and with the key and value copied from the message,
    C. otherwise replacing the new innermost transaction record of the leaf entry with the contents of the removed innermost transaction record without changing the transaction identifier of the new innermost transaction record, and where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;
where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;
where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;
where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;
where when the front-end module executes a search on a particular key in a file in a transaction, the front-end module causes the locking module to acquire a shared lock on the key and causes the file-maintenance module to traverse the tree, searching the root node for the key;
where searching a nonleaf node for a key comprises identifying the smallest-numbered child that can hold the key as the next node on the path, flushing the message queue of that child, and then searching the child node;
where searching a leaf node comprises fetching from the leaf node the leaf entry with the same key as the message, if such key exists, and returning the associated value from the innermost transaction record of the leaf entry, if the transaction record count is greater than one, or returning the value of the leaf entry if the transaction record count equals one;
where the logging module maintains a log, the log comprising a sequence of one or more log entries;
a log entry comprising a sequence of bytes encoding, in order, a log sequence number, a length, log entry data, a checksum, and the length again;
where a log sequence number comprises a number, where the log sequence number in one log entry of the log is one less than the log sequence number in the following log entry in the log;
where when the front-end module executes an insert of a key-value pair into a file in a transaction, the front-end module causes the logging module to create a log entry in which the log data comprises bytes that encode an insert operation, the key, the value, the transaction identifier of the transaction, and a file identifier identifying the file;
the front-end module establishing for each file, when the file is opened, a file identifier;
where a file identifier comprises a number;
where a checksum on a sequence of bytes is calculated by organizing the bytes into 8-byte values, interpreting the 8-byte values as integers, and summing the product of the ith 8-byte value with seventeen raised to the power of i to produce a checksum;
where a data file header further comprises a descriptor;
where a descriptor comprises a version number, a length, and a sequence of one or more bytes, the number of bytes being equal to the length;
where a fingerprint seed comprises an integer;
where a fingerprint comprises an integer;

where the fingerprint of a leaf node is calculated as the sum over all the leaf entries of the node of the product of the fingerprint seed of the node with the checksum of the leaf entry;

where the fingerprint of a nonleaf node is calculated as the sum of the fingerprints of the children nodes of the nonleaf node further summed with the sum over all the messages in the message queues in the node of the product of the fingerprint seed of the node with the checksum of the message;

where when the front-end module creates or opens a file, the front-end module provides a comparison function that, given two keys and the descriptor from the file header, compares the two keys to determine whether the two keys are to be considered equal or else which one is to be ordered ahead of the other, thus ordering key-value pairs;

where the file-maintenance module maintains the tree of each file so that in a nonleaf node, for each given a pivot key numbered i the node, the pivot key is ordered to be greater than or equal to any of the key-value pairs stored in child subtrees or message queues numbered less than or equal to i, and the pivot key is ordered to be less than or equal to any of the key-value pairs stored in child subtrees or message queues numbered greater than i, and the pivot key numbered i is ordered to be before any pivot keys numbered greater than i;

where when recovering from a crash, the recovery module reads the log and acts on each log entry to restore the data stored into a consistent state;

where when the front-end module creates a file, the front-end module specifies a descriptor causing the file-maintenance module to maintain the descriptor version number in each node in the file.

2. A computer system comprising a processor; a main memory; a secondary memory; where one or both of the memories contains an encoded application for storing data on the secondary memory, that when the application is performed on the processor, provides a process for processing information, the process causing the computer system to perform the operations of organizing data in a data storage system, said process comprising:

providing a system, wherein the system comprises distinct software modules, and wherein the distinct software modules comprise a front-end module, a buffer-pool module, a locking module, and a file-maintenance module;

one or more data files being maintained by the file-maintenance module;

where a data file comprises a header, and one or more blocks;

where one or more of the blocks comprise bytes encoding a block translation table, and one or more of the blocks comprise bytes encoding leaf nodes, and one or more of the blocks comprise bytes encoding nonleaf nodes;

where a header comprises a root block number identifying a root block and a set of one or more block numbers identifying block translation tables blocks;

where a block translation table comprises a number and an array, the number specifying the length of the array, the array indexed by a block number, each element of the array comprising a translation entry;

where a translation entry comprises a file offset and a size, the file offset and size identifying a block of one or more bytes in the file, the block number indexing the entry thus identifying the block;

where the block identified by the root block number comprises an encoding of a leaf node or a nonleaf node; where a nonleaf node comprises
 (a) a fingerprint seed,
 (b) a fingerprint,
 (c) a counter c,
 (d) one or more child block numbers, where the number of child block numbers equals c, each child block number identifying a block comprising a leaf node or nonleaf node, the children being numbered consecutively from 0 to c−1,
 (e) one or more pivots, where the number of pivots equals one less than the number of child block numbers, the pivots being numbered consecutively from 0 to c−2,
 (f) one or more message queues, where the number of message queues equals c, the message queues being numbered consecutively from 0 to c−1, and
 (g) a descriptor version number;
where a leaf node comprises
 (a) a fingerprint seed,
 (b) a fingerprint,
 (c) a sorted array of one or more leaf entries,
 (d) a checksum, and
 (e) a descriptor version number;
the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;
 where a key comprises a length and a sequence of one or more bytes;
 where a pivot comprises a key;
 where a value comprises a length and a sequence of one or more bytes;
 where a key-value pair comprises a key and a value;
 where a message queue comprises a FIFO (first-in-first-out) of one or more messages;
 where the FIFO of messages comprises a counter f and a sequence of one or more messages where the number of messages in the sequence equals f;
 where the FIFO of messages supports operations comprising enqueueing a message and dequeueing the least recently enqueued message;
 where a message comprises
  (a) a message operation,
  (b) a key, and
  (c) a value;
 where a leaf entry comprises
  (a) a value, and
  (b) a key;
where a message operation comprises an insert operation, a delete operation, an abort operation, and a commit operation; where, when the front-end module executes an insert of a key-value pair into a file in a transaction, the front-end module causes the locking module to acquire an exclusive lock on the key, and the front-end module creates a message in which the message operation comprises an insert operation, the key length and key comprise the key of the key-value pair, the value length and value comprise the value of the key-value pair, the front-end module then causing the file-maintenance module to insert the message into the root block identified in the header of the file;
 inserting a message into a nonleaf node, the insertion comprising
  (a) identifying which children the key of the message is to be delivered to, and (b) inserting the message into the FIFOs of the message queues respectively corresponding to the identified children;

identifying which child a message is to be delivered to in a nonleaf node comprising comparing the pivot keys of the nonleaf node to the key of the message, thus identifying one or more children that can hold the message;

inserting a message into a leaf node, the insertion comprising (a) fetching from the leaf node the leaf entry with the same key as the message, if such leaf entry exists, otherwise constructing an empty leaf entry, (b) if the message operation comprises an insertion operation then
  i. constructing a leaf entry with a key taken from the message, a provisional value taken from the value of the message, and a committed value taken from the previously existing leaf entry with the same key if such leaf entry exists, otherwise setting the new leaf entry to have no committed value,
  ii. deleting the previous leaf entry if it exists, and
  iii. storing the new leaf entry in the leaf node, (c) if the message operation comprises a delete operation then
  i. constructing a leaf entry that is a provisional delete, with the committed value taken from the previously existing leaf entry with the same key if such leaf entry exists,
  ii. deleting the previous leaf entry if it exists, and
  iii. storing the new leaf entry in the leaf node, where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;

where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the locking module to acquire a shared lock on the key and causes the file-maintenance module to traverse the tree, searching the root node for the key;

where searching a nonleaf node for a key comprises identifying the smallest-numbered child that can hold the key as the next node on the path, and then searching the child node;

where searching a leaf node comprises fetching from the leaf node the leaf entry with the same key as the message, if such key exists, and returning the associated value from the leaf entry;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length;

where a fingerprint seed comprises an integer;

where a fingerprint comprises an integer;

where the fingerprint of a leaf node is calculated as the sum over all the leaf entries of the node of the product of the fingerprint seed of the node with the checksum of the leaf entry;

where the fingerprint of a nonleaf node is calculated as the sum of the fingerprints of the children nodes of the nonleaf node further summed with the sum over all the messages in the message queues in the node of the product of the fingerprint seed of the node with the checksum of the message;

where when the front-end module creates a file, the front-end module specifies a descriptor causing the file-maintenance module to maintain the descriptor version number in each node in the file.

3. A computer system comprising a processor; a main memory; a secondary memory; where one or both of the memories contains an encoded application for storing data on the secondary memory, that when the application is performed on the processor, provides a process for processing information, the process causing the computer system to perform the operations of organizing data in a data storage system, said process comprising:

providing a system, wherein the system comprises distinct software modules, and wherein the distinct software modules comprise a front-end module, a buffer-pool module, a recovery module, a logging module, a locking module, and a file-maintenance module;

one or more data files being maintained by the file-maintenance module;

where a data file comprises a header, and one or more blocks;

where one or more of the blocks comprise bytes encoding leaf nodes, and one or more of the blocks comprise bytes encoding nonleaf nodes;

where a header comprises a root block number identifying a root block;

where the block identified by the root block number comprises an encoding of a leaf node or a nonleaf node;

where a nonleaf node comprises
(a) a fingerprint seed,
(b) a fingerprint,
(c) a counter c,
(d) one or more child block numbers, where the number of child block numbers equals c, each child block number identifying a block comprising a leaf node or nonleaf node, the children being numbered consecutively from 0 to c−1,
(e) one or more pivots, where the number of pivots equals one less than the number of child block numbers, the pivots being numbered consecutively from 0 to c−2,
(f) one or more message queues, where the number of message queues equals c, the message queues being numbered consecutively from 0 to c−1, and
(g) a descriptor version number;
where a leaf node comprises
(a) a fingerprint seed,
(b) a fingerprint,
(c) a log sequence number,
(d) a sorted array of one or more leaf entries,
(e) a checksum, and
(f) a descriptor version number;
the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;
where a value comprises a length and a sequence of one or more bytes;
where a pivot comprises a key;
where a key comprises a length and a sequence of one or more bytes;
where a key-value pair comprises a key and a value;
where a message queue comprises a FIFO (first-in-first-out) of one or more messages;
where the FIFO of messages comprises a counter f and a sequence of one or more messages where the number of messages in the sequence equals f;
where the FIFO of messages supports operations comprising enqueueing a message and dequeueing the least recently enqueued message;
where a message comprises
(a) a message operation,
(b) a key,
(c) a value,
(d) a transaction-identifier-sequence length, and
(e) a sequence of one or more transaction identifiers, where the number of transaction identifiers equals the transaction-identifier-sequence length;
where a leaf entry comprises
(a) a transaction-record count, and
(b) a key;
where for a leaf entry in which the transaction-record count equals one, the leaf entry further comprises a value;
where for a leaf entry in which the transaction-record count is greater than one, the leaf entry further comprises a sequence of transaction records equal in length to the transaction-record count;
where a transaction record comprises a transaction record type, a transaction identifier, and a value;
where a transaction record type comprises an operation comprising an insert operation, a delete operation, and a placeholder operation;
where a transaction identifier comprises a log sequence number;
where a message operation comprises an insert operation, a delete operation, an abort operation, and a commit operation;
where, when the front-end module executes an insert of a key-value pair into a file in a transaction, the front-end module causes the locking module to acquire an exclusive lock on the key, and the front-end module creates a message in which the message operation comprises an insert operation, the key length and key comprise the key of the key-value pair, the value length and value comprise the value of the key-value pair, the transaction-identifier-sequence length comprises the depth of the transaction, where a transaction with no parents has depth one, and a transaction with a parent has depth equal to one plus the depth of the parent, and the sequence of transaction identifiers comprises the transaction identifier of the transaction, and of each of the transaction's ancestors, the front-end module then causing the file-maintenance module to insert the message into the root block identified in the header of the file;
inserting a message into nonleaf node comprising
(a) identifying which children the key of the message is to be delivered to, and
(b) inserting the message into the FIFOs of the message queues respectively corresponding to the identified children;
identifying which child a message is to be delivered to in a nonleaf node comprising comparing the pivot keys of the nonleaf node to the key of the message, thus identifying one or more children that can hold the message;
inserting a message into a leaf node, the insertion comprising
(a) fetching from the leaf node the leaf entry with the same key as the message, if such leaf entry exists, otherwise constructing an empty leaf entry,
(b) if the message operation comprises an insert operation or a delete operation then
 i. discarding any existing transaction record in the leaf entry that has the same innermost transaction identifier as the message,
 ii. adding placeholder transaction records for every ancestor transaction identifier in the message that is not listed in the leaf entry,
 iii. adding an insert or delete transaction record, depending on the operation of the message, for the innermost transaction of the message, the value length and value of the transaction record being copied from the message, and
 iv. storing the resulting leaf entry into the leaf node,
(c) if the message operation comprises an abort operation and if the innermost transaction identifier of the leaf entry equals the innermost transaction identifier of the message, then
 i. removing the innermost transaction record of the leaf entry,
 ii. while the innermost transaction record is a placeholder, removing said innermost transaction record,
 iii. if the resulting leaf entry is empty, then deleting the original leaf entry, if any, from the leaf node, otherwise storing the new leaf entry into the leaf node, and
(d) if the message operation comprises a commit operation and if the innermost transaction identifier of the leaf entry equals the innermost transaction identifier of the message, then
 i. if the innermost transaction record of the leaf entry is a delete operation then
  A. removing the innermost transaction record of the leaf entry,
  B. if the resulting leaf entry is empty, then deleting the leaf entry from the leaf node,
  C. otherwise replacing the new innermost transaction record with the contents of the removed innermost transaction record without changing the transaction identifier of the new innermost transaction record, and ii. if the innermost transaction record of the leaf entry is an insert operation then
  A. removing the innermost transaction record of the leaf entry,
  B. if the resulting leaf entry is empty, then replacing the old leaf entry with a new leaf entry with transaction-record count equal to one and with the key and value copied from the message,
  C. otherwise replacing the new innermost transaction record of the leaf entry with the contents of the removed innermost transaction record without changing the transaction identifier of the new innermost transaction record, and where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;

where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the locking module to acquire a shared lock on the key and causes the file-maintenance module to traverse the tree, searching the root node for the key;

where searching a nonleaf node for a key comprises identifying the smallest-numbered child that can hold the key as the next node on the path, and then searching the child node;

where searching a leaf node comprises fetching from the leaf node the leaf entry with the same key as the message, if such key exists, and returning the associated value from the innermost transaction record of the leaf entry, if the transaction record count is greater than one, or returning the value of the leaf entry if the transaction record count equals one;

where the logging module maintains a log, the log comprising a sequence of one or more log entries;

a log entry comprising a sequence of bytes encoding, in order, a log sequence number, a length, log entry data, a checksum, and the length again;

where a log sequence number comprises a number, where the log sequence number in one log entry of the log is one less than the log sequence number in the following log entry in the log;

where when the front-end module executes an insert of a key-value pair into a file in a transaction, the front-end module causes the logging module to create a log entry in which the log data comprises bytes that encode an insert operation, the key, the value, the transaction identifier of the transaction, and a file identifier identifying the file;

the front-end module establishing for each file, when the file is opened, a file identifier;

where a file identifier comprises a number;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length;

where a fingerprint seed comprises an integer;

where a fingerprint comprises an integer;

where the fingerprint of a leaf node is calculated as the sum over all the leaf entries of the node of the product of the fingerprint seed of the node with the checksum of the leaf entry;

where the fingerprint of a nonleaf node is calculated as the sum of the fingerprints of the children nodes of the nonleaf node further summed with the sum over all the messages in the message queues in the node of the product of the fingerprint seed of the node with the checksum of the message;

where when recovering from a crash, the recovery module reads the log and acts on each log entry to restore the data stored into a consistent state;

where when the front-end module creates a file, the front-end module specifies a descriptor causing the file-maintenance module to maintain the descriptor version number in each node in the file.

4. A computer program product, comprising a non-transitory computer usable medium having a computer readable program code embodied therein, said computer readable program code adapted to be executed to implement a method for storing data, said method comprising:

providing a system, wherein the system comprises distinct software modules, and wherein the distinct software modules comprise a front-end module, a buffer-pool module, and a file-maintenance module;

one or more data files being maintained by the file-maintenance module;

where a data file comprises a header, and one or more blocks;

where one or more of the blocks comprise bytes encoding leaf nodes, and one or more of the blocks comprise bytes encoding nonleaf nodes;

where a header comprises a root block number identifying a root block;

where the block identified by the root block number comprises an encoding of a leaf node or a nonleaf node;

where a nonleaf node comprises (a) a counter c,
(b) one or more child block numbers, where the number of child block numbers equals c, each child block number identifying a block comprising a leaf node or nonleaf node, the children being numbered consecutively from 0 to c−1,
(c) one or more pivots, where the number of pivots equals one less than the number of child block numbers, the pivots being numbered consecutively from 0 to c−2,
(d) one or more message queues, where the number of message queues equals c, the message queues being numbered consecutively from 0 to c−1, and
(e) a descriptor version number;

where a leaf node comprises
(a) a sorted array of one or more leaf entries,
(b) a checksum, and
(c) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;

where a key comprises a length and a sequence of one or more bytes;
where a value comprises a length and a sequence of one or more bytes;
where a pivot comprises a key;
where a key-value pair comprises a key and a value;
where a message queue comprises a FIFO (first-in-first-out) of one or more messages;
where the FIFO of messages comprises a counter f and a sequence of or more messages where the number of messages in the sequence equals f;
where the FIFO of messages supports operations comprising enqueueing a message and dequeueing the least recently enqueued message;
where a message comprises
(a) a message operation,
(b) a key, and
(c) a value;
where a leaf entry comprises
(a) a value, and
(b) a key;
where a message operation comprises an insert operation, a delete operation, an abort operation, and a commit operation;
where, when the front-end module executes an insert of a key-value pair into a file in a transaction, and the front-end module creates a message in which the message operation comprises an insert operation, the key length and key comprise the key of the key-value pair, the value length and value comprise the value of the key-value pair, the front-end module then causing the file-maintenance module to insert the message into the root block identified in the header of the file;
inserting a message into nonleaf node comprising
(a) identifying which children the key of the message is to be delivered to, and
(b) inserting the message into the FIFOs of the message queues respectively corresponding to the identified children;
identifying which child a message is to be delivered to in a nonleaf node comprising comparing the pivot keys of the nonleaf node to the key of the message, thus identifying one or more children that can hold the message;
inserting a message into a leaf node, the insertion comprising
(a) fetching from the leaf node the leaf entry with the same key as the message, if such leaf entry exists, otherwise constructing an empty leaf entry,
(b) if the message operation comprises an insertion operation then
  i. constructing a leaf entry with a key taken from the message, a provisional value taken from the value of the message, and a committed value taken from the previously existing leaf entry with the same key if such leaf entry exists, otherwise setting the new leaf entry to have no committed value,
  ii. deleting the previous leaf entry if it exists, and
  iii. storing the new leaf entry in the leaf node,
(c) if the message operation comprises a delete operation then
  i. constructing a leaf entry that is a provisional delete, with the committed value taken from the previously existing leaf entry with the same key if such leaf entry exists,
  ii. deleting the previous leaf entry if it exists, and
  iii. storing the new leaf entry in the leaf node,
where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;
where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;
where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;
where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;
where when the front-end module executes a search on a particular key in a file in a transaction, the front-end module causes the file-maintenance module to traverse the tree, searching the root node for the key;
where searching a nonleaf node for a key comprises identifying the smallest-numbered child that can hold the key as the next node on the path, and then searching the child node; where searching a leaf node comprises fetching from the leaf node the leaf entry with the same key as the message, if such key exists, and returning the associated value from the leaf entry;

where a checksum on a sequence of bytes is calculated by organizing the bytes into 8-byte values, interpreting the 8-byte values as integers, and summing the product of the ith 8-byte value with seventeen raised to the power of i to produce a checksum;
where a data file header further comprises a descriptor;
where a descriptor comprises a version number, a length, and a sequence of one or more bytes, the number of bytes being equal to the length;
where when the front-end module creates a file, the front-end module specifies a descriptor causing the file-maintenance module to maintain the descriptor version number in each node in the file.

5. A computer system comprising a processor; a main memory; a secondary memory; where one or both of the memories contains an encoded application for storing data on the secondary memory, that when the application is performed on the processor, provides a process for processing information, the process causing the computer system to perform the operations of organizing data in a data storage system, said process comprising:
 providing a system, wherein the system comprises distinct software modules, and wherein the distinct software modules comprise a front-end module, a buffer-pool module, and a file-maintenance module;
 one or more data files being maintained by the file-maintenance module;
 where a data file comprises a header, and one or more blocks;
 where one or more of the blocks comprise bytes encoding leaf nodes, and one or more of the blocks comprise bytes encoding nonleaf nodes;
 where a header comprises a root block number identifying a root block;
 where the block identified by the root block number comprises an encoding of a leaf node or a nonleaf node;
 where a nonleaf node comprises
  (a) a counter c,
  (b) one or more child block numbers, where the number of child block numbers equals c, each child block number identifying a block comprising a leaf node or nonleaf node, the children being numbered consecutively from 0 to c−1,
  (c) one or more pivots, where the number of pivots equals one less than the number of child block numbers, the pivots being numbered consecutively from 0 to c−2,
  (d) one or more message queues, where the number of message queues equals c, the message queues being numbered consecutively from 0 to c−1, and
  (e) a descriptor version number;
 where a leaf node comprises
  (a) a sorted array of one or more leaf entries,
  (b) a checksum, and
  (c) a descriptor version number;
 the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;
  where a value comprises a length and a sequence of one or more bytes;
  where a pivot comprises a key;
  where a key comprises a length and a sequence of one or more bytes;
  where a key-value pair comprises a key and a value;
  where a message queue comprises a FIFO of one or more messages;
  where the FIFO (first-in-first-out) of messages comprises a counter f and a sequence of one or more messages where the number of messages in the sequence equals f;
  where the FIFO of messages supports operations comprising enqueueing a message and dequeueing the least recently enqueued message;
  where a message comprises
   (a) a message operation,
   (b) a key, and
   (c) a value;
  where a leaf entry comprises
   (a) a value, and
   (b) a key;
 where a message operation comprises an insert operation, a delete operation, an abort operation, and a commit operation;
 where, when the front-end module executes an insert of a key-value pair into a file in a transaction, and the front-end module creates a message in which the message operation comprises an insert operation, the key length and key comprise the key of the key-value pair, the value length and value comprise the value of the key-value pair, the front-end module then causing the file-maintenance module to insert the message into the root block identified in the header of the file;
  inserting a message into nonleaf node comprising
   (a) identifying which children the key of the message is to be delivered to, and
   (b) inserting the message into the FIFOs of the message queues respectively corresponding to the identified children;
  identifying which child a message is to be delivered to in a nonleaf node comprising comparing the pivot keys of the nonleaf node to the key of the message, thus identifying one or more children that can hold the message;
  inserting a message into a leaf node, the insertion comprising
   (a) fetching from the leaf node the leaf entry with the same key as the message, if such leaf entry exists, otherwise constructing an empty leaf entry,
   (b) if the message operation comprises an insertion operation then
    i. constructing a leaf entry with a key taken from the message, a provisional value taken from the value of the message, and a committed value taken from the previously existing leaf entry with the same key if such leaf entry exists, otherwise setting the new leaf entry to have no committed value,
    ii. deleting the previous leaf entry if it exists, and
    iii. storing the new leaf entry in the leaf node,
   (c) if the message operation comprises a delete operation then
    i. constructing a leaf entry that is a provisional delete, with the committed value taken from the previously existing leaf entry with the same key if such leaf entry exists,
    ii. deleting the previous leaf entry if it exists, and
    iii. storing the new leaf entry in the leaf node,
  where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;

where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the file-maintenance module to traverse the tree, searching the root node for the key;

where searching a nonleaf node for a key comprises identifying the smallest-numbered child that can hold the key as the next node on the path, and then searching the child node; where searching a leaf node comprises fetching from the leaf node the leaf entry with the same key as the message, if such key exists, and returning the associated value from the leaf entry;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length;

where when the front-end module creates a file, the front-end module specifies a descriptor causing the file-maintenance module to maintain the descriptor version number in each node in the file.

6. A computer program product, comprising a non-transitory computer usable medium having a computer readable program code embodied therein, said computer readable program code adapted to be executed to implement a method for storing data, said method comprising:

providing a system, wherein the system comprises distinct software modules, and wherein the distinct software modules comprise a front-end module, a buffer-pool module, a locking module, and a file-maintenance module;

one or more data files being maintained by the file-maintenance module;

where a data file comprises a header, and one or more blocks;

where one or more of the blocks comprise bytes encoding leaf nodes, and one or more of the blocks comprise bytes encoding nonleaf nodes;

where a header comprises a root block number identifying a root block;

where the block identified by the root block number comprises an encoding of a leaf node or a nonleaf node;

where a nonleaf node comprises
(a) a fingerprint seed,
(b) a fingerprint,
(c) a counter c,
(d) one or more child block numbers, where the number of child block numbers equals c, each child block number identifying a block comprising a leaf node or nonleaf node, the children being numbered consecutively from 0 to c−1,
(e) one or more pivots, where the number of pivots equals one less than the number of child block numbers, the pivots being numbered consecutively from 0 to c−2,
(f) one or more message queues, where the number of message queues equals c, the message queues being numbered consecutively from 0 to c−1, and
(g) a descriptor version number;

where a leaf node comprises
(a) a fingerprint seed,
(b) a fingerprint,
(c) a sorted array of one or more leaf entries,
(d) a checksum, and
(e) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;

where a value comprises a length and a sequence of one or more bytes;

where a pivot comprises a key;

where a key comprises a length and a sequence of one or more bytes;

where a key-value pair comprises a key and a value;

where a message queue comprises a FIFO (first-in-first-out) of one or more messages;

where the FIFO of messages comprises a counter f and a sequence of one or more messages where the number of messages in the sequence equals f;

where the FIFO of messages supports operations comprising enqueueing a message and dequeueing the least recently enqueued message; where a message comprises
(a) a message operation,
(b) a key, and
(c) a value;

where a leaf entry comprises
(a) a value, and
(b) a key;

where a message operation comprises an insert operation, a delete operation, an abort operation, and a commit operation;

where, when the front-end module executes an insert of a key-value pair into a file in a transaction, the front-end module causes the locking module to acquire an exclusive lock on the key, and the front-end module creates a message in which the message operation comprises an insert operation, the key length and key comprise the key of the key-value pair, the value length and value comprise the value of the key-value pair, the front-end module then causing the file-maintenance module to insert the message into the root block identified in the header of the file;

inserting a message into nonleaf node comprising (a) identifying which children the key of the message is to be delivered to,
(b) inserting the message into the FIFOs of the message queues respectively corresponding to the identified children, and
(c) determining if the total size of the node is larger than a specified value, and if so then flushing message queues of one or more children;

identifying which child a message is to be delivered to in a nonleaf node comprising comparing the pivot keys of the nonleaf node to the key of the message, thus identifying one or more children that can hold the message;

flushing message queues of one or more children comprising selecting a nonempty message queue, fetching the corresponding child block into main memory using the buffer-pool module, and removing one or more messages from the message queue and inserting said messages into the child block;

inserting a message into a leaf node, the insertion comprising
(a) fetching from the leaf node the leaf entry with the same key as the message, if such leaf entry exists, otherwise constructing an empty leaf entry,
(b) if the message operation comprises an insertion operation then
  i. constructing a leaf entry with a key taken from the message, a provisional value taken from the value of the message, and a committed value taken from the previously existing leaf entry with the same key if such leaf entry exists, otherwise setting the new leaf entry to have no committed value,
  ii. deleting the previous leaf entry if it exists, and
  iii. storing the new leaf entry in the leaf node,
(c) if the message operation comprises a delete operation then
  i. constructing a leaf entry that is a provisional delete, with the committed value taken from the previously existing leaf entry with the same key if such leaf entry exists,
  ii. deleting the previous leaf entry if it exists, and
  iii. storing the new leaf entry in the leaf node, where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;

where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the locking module to acquire a shared lock on the key and causes the file-maintenance module to traverse the tree, searching the root node for the key;

where searching a nonleaf node for a key comprises identifying the smallest-numbered child that can hold the key as the next node on the path, flushing the message queue of that child, and then searching the child node;

where searching a leaf node comprises fetching from the leaf node the leaf entry with the same key as the message, if such key exists, and returning the associated value from the leaf entry;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length;

where a fingerprint seed comprises an integer;

where a fingerprint comprises an integer;

where the fingerprint of a leaf node is calculated as the sum over all the leaf entries of the node of the product of the fingerprint seed of the node with the checksum of the leaf entry;

where the fingerprint of a nonleaf node is calculated as the sum of the fingerprints of the children nodes of the nonleaf node further summed with the sum over all the messages in the message queues in the node of the product of the fingerprint seed of the node with the checksum of the message;

where when the front-end module creates or opens a file, the front-end module provides a comparison function that, given two keys and the descriptor from the file header, compares the two keys to determine whether the two keys are to be considered equal or else which one is to be ordered ahead of the other, thus ordering key-value pairs;

where the file-maintenance module maintains the tree of each file so that in a nonleaf node, for each given a pivot key numbered i the node, the pivot key is ordered to be greater than or equal to any of the key-value pairs stored in child subtrees or message queues numbered less than or equal to i, and the pivot key is ordered to be less than or equal to any of the key-value pairs stored in child subtrees or message queues numbered greater than i, and the pivot key numbered i is ordered to be before any pivot keys numbered greater than i;

where when the front-end module creates a file, the front-end module specifies a descriptor causing the file-maintenance module to maintain the descriptor version number in each node in the file.

7. A computer program product, comprising a non-transitory computer usable medium having a computer readable program code embodied therein, said computer readable program code adapted to be executed to implement a method for storing data, said method comprising:

providing a system, wherein the system comprises distinct software modules, and wherein the distinct software modules comprise a front-end module, a buffer-pool module, and a file-maintenance module;

one or more data files being maintained by the file-maintenance module;

where a data file comprises a header, and one or more blocks;

where one or more of the blocks comprise bytes encoding leaf nodes, and one or more of the blocks comprise bytes encoding nonleaf nodes;

where a header comprises a root block number identifying a root block;

where the block identified by the root block number comprises an encoding of a leaf node or a nonleaf node;

where a nonleaf node comprises
(a) a counter c,
(b) one or more child block numbers, where the number of child block numbers equals c, each child block number identifying a block comprising a leaf node or nonleaf node, the children being numbered consecutively from 0 to c−1,
(c) one or more pivots, where the number of pivots equals one less than the number of child block numbers, the pivots being numbered consecutively from 0 to c−2,
(d) one or more message queues, where the number of message queues equals c, the message queues being numbered consecutively from 0 to c−1, and
(e) a descriptor version number;

where a leaf node comprises
(a) a sorted array of one or more leaf entries,
(b) a checksum, and
(c) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;

where a pivot comprises a key;

where a key comprises a length and a sequence of one or more bytes;

where a value comprises a length and a sequence of one or more bytes;

where a key-value pair comprises a key and a value;

where a message queue comprises a FIFO (first-in-first-out) of one or more messages;

where the FIFO of messages comprises a counter f and a sequence of one or more messages where the number of messages in the sequence equals f;

where the FIFO of messages supports operations comprising enqueueing a message and dequeueing the least recently enqueued message;

where a message comprises
(a) a message operation,
(b) a key, and
(c) a value;

where a leaf entry comprises
(a) a value, and
(b) a key;

where a message operation comprises an insert operation, a delete operation, an abort operation, and a commit operation;

where, when the front-end module executes an insert of a key-value pair into a file in a transaction, and the front-end module creates a message in which the message operation comprises an insert operation, the key length and key comprise the key of the key-value pair, the value length and value comprise the value of the key-value pair, the front-end module then causing the file-maintenance module to insert the message into the root block identified in the header of the file;

inserting a message into nonleaf node comprising
(a) identifying which children the key of the message is to be delivered to,
(b) inserting the message into the FIFOs of the message queues respectively corresponding to the identified children, and
(c) determining if the total size of the node is larger than a specified value, and if so then flushing message queues of one or more children;

identifying which child a message is to be delivered to in a nonleaf node comprising comparing the pivot keys of the nonleaf node to the key of the message, thus identifying one or more children that can hold the message;

flushing message queues of one or more children comprising selecting a nonempty message queue, fetching the corresponding child block into main memory using the buffer-pool module, and removing one or more messages from the message queue and inserting said messages into the child block;

inserting a message into a leaf node, the insertion comprising
(a) fetching from the leaf node the leaf entry with the same key as the message, if such leaf entry exists, otherwise constructing an empty leaf entry,
(b) if the message operation comprises an insertion operation then
  i. constructing a leaf entry with a key taken from the message, a provisional value taken from the value of the message, and a committed value taken from the previously existing leaf entry with the same key if such leaf entry exists, otherwise setting the new leaf entry to have no committed value,
  ii. deleting the previous leaf entry if it exists, and
  iii. storing the new leaf entry in the leaf node,
(c) if the message operation comprises a delete operation then
  i. constructing a leaf entry that is a provisional delete, with the committed value taken from the previously existing leaf entry with the same key if such leaf entry exists,
  ii. deleting the previous leaf entry if it exists, and
  iii. storing the new leaf entry in the leaf node, where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;

where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the file-maintenance module to traverse the tree, searching the root node for the key;

where searching a nonleaf node for a key comprises identifying the smallest-numbered child that can hold the key as the next node on the path, flushing the message queue of that child, and then searching the child node;

where searching a leaf node comprises fetching from the leaf node the leaf entry with the same key as the message, if such key exists, and returning the associated value from the leaf entry;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length; where when the front-end module creates or opens a file, the front-end module provides a comparison function that, given two keys and the descriptor from the file header, compares the two keys to determine whether the two keys are to be considered equal or else which one is to be ordered ahead of the other, thus ordering key-value pairs;

where the file-maintenance module maintains the tree of each file so that in a nonleaf node, for each given a pivot key numbered i the node, the pivot key is ordered to be greater than or equal to any of the key-value pairs stored in child subtrees or message queues numbered less than or equal to i, and the pivot key is ordered to be less than or equal to any of the key-value pairs stored in child subtrees or message queues numbered greater than i, and the pivot key numbered i is ordered to be before any pivot keys numbered greater than i;

where when the front-end module creates a file, the front-end module specifies a descriptor causing the file-maintenance module to maintain the descriptor version number in each node in the file.

8. A computer program product, comprising a non-transitory computer usable medium having a computer readable program code embodied therein, said computer readable program code adapted to be executed to implement a method for storing data, said method comprising:

providing a system, wherein the system comprises distinct software modules, and wherein the distinct software modules comprise a front-end module, a buffer-pool module, and a file-maintenance module;

one or more data files being maintained by the file-maintenance module;

where a data file comprises a header, and one or more blocks;

where one or more of the blocks comprise bytes encoding leaf nodes, and one or more of the blocks comprise bytes encoding nonleaf nodes;

where a header comprises a root block number identifying a root block;

where the block identified by the root block number comprises an encoding of a leaf node or a nonleaf node;

where a nonleaf node comprises
(a) a counter c,
(b) one or more child block numbers, where the number of child block numbers equals c, each child block number identifying a block comprising a leaf node or nonleaf node, the children being numbered consecutively from 0 to c−1,
(c) one or more pivots, where the number of pivots equals one less than the number of child block numbers, the pivots being numbered consecutively from 0 to c−2,
(d) one or more message queues, where the number of message queues equals c, the message queues being numbered consecutively from 0 to c−1, and
(e) a descriptor version number;

where a leaf node comprises
(a) a sorted array of one or more leaf entries,
(b) a checksum, and
(c) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;

where a pivot comprises a key;

where a key comprises a length and a sequence of one or more bytes;

where a value comprises a length and a sequence of one or more bytes;

where a key-value pair comprises a key and a value;

where a message queue comprises a FIFO (first-in-first-out) of one or more messages;

where the FIFO of messages comprises a counter f and a sequence of one or more messages where the number of messages in the sequence equals f;

where the FIFO of messages supports operations comprising enqueueing a message and dequeueing the least recently enqueued message;

where a message comprises
(a) a message operation,
(b) a key, and
(c) a value;

where a leaf entry comprises
(a) a value, and
(b) a key;

where a message operation comprises an insert operation, a delete operation, an abort operation, and a commit operation;

where, when the front-end module executes an insert of a key-value pair into a file in a transaction, and the front-end module creates a message in which the message operation comprises an insert operation, the key length and key comprise the key of the key-value pair, the value length and value comprise the value of the key-value pair, the front-end module then causing the file-maintenance module to insert the message into the root block identified in the header of the file;

inserting a message into nonleaf node comprising
(a) identifying which children the key of the message is to be delivered to, and
(b) inserting the message into the FIFOs of the message queues respectively corresponding to the identified children;

identifying which child a message to is be delivered to in a nonleaf node comprising comparing the pivot keys of the nonleaf node to the key of the message, thus identifying one or more children that can hold the message;

inserting a message into a leaf node, the insertion comprising
(a) fetching from the leaf node the leaf entry with the same key as the message, if such leaf entry exists, otherwise constructing an empty leaf entry,
(b) if the message operation comprises an insertion operation then
  i. constructing a leaf entry with a key taken from the message, a provisional value taken from the value of the message, and a committed value taken from the previously existing leaf entry with the same key if such leaf entry exists, otherwise setting the new leaf entry to have no committed value,
  ii. deleting the previous leaf entry if it exists, and
  iii. storing the new leaf entry in the leaf node,
(c) if the message operation comprises a delete operation then
  i. constructing a leaf entry that is a provisional delete, with the committed value taken from the previously existing leaf entry with the same key if such leaf entry exists,
  ii. deleting the previous leaf entry if it exists, and
  iii. storing the new leaf entry in the leaf node, where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;

where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the file-maintenance module to traverse the tree, searching the root node for the key;

where searching a nonleaf node for a key comprises identifying the smallest-numbered child that can hold the key as the next node on the path, and then searching the child node;

where searching a leaf node comprises fetching from the leaf node the leaf entry with the same key as the message, if such key exists, and returning the associated value from the leaf entry;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length;

where when the front-end module creates or opens a file, the front-end module provides a comparison function that, given two keys and the descriptor from the file header, compares the two keys to determine whether the two keys are to be considered equal or else which one is to be ordered ahead of the other, thus ordering key-value pairs;

where the file-maintenance module maintains the tree of each file so that in a nonleaf node, for each given a pivot key numbered i the node, the pivot key is ordered to be greater than or equal to any of the key-value pairs stored in child subtrees or message queues numbered less than or equal to i, and the pivot key is ordered to be less than or equal to any of the key-value pairs stored in child subtrees or message queues numbered greater than i, and the pivot key numbered i is ordered to be before any pivot keys numbered greater than i;

where when the front-end module creates a file, the front-end module specifies a descriptor causing the file-maintenance module to maintain the descriptor version number in each node in the file.

9. A computer system comprising a processor; a main memory; a secondary memory; where one or both of the memories contains an encoded application for storing data on the secondary memory, that when the application is performed on the processor, provides a process for processing information, the process causing the computer system to perform the operations of organizing data in a data storage system, said process comprising:

providing a system, wherein the system comprises distinct software modules, and wherein the distinct software modules comprise a front-end module, a buffer-pool module, a locking module, and a file-maintenance module;

one or more data files being maintained by the file-maintenance module;

where a data file comprises a header, and one or more blocks;

where one or more of the blocks comprise bytes encoding a block translation table, and one or more of the blocks comprise bytes encoding leaf nodes, and one or more of the blocks comprise bytes encoding nonleaf nodes;

where a header comprises a root block number identifying a root block and a set of one or more block numbers identifying block translation tables blocks;

where a block translation table comprises a number and an array, the number specifying the length of the array, the array indexed by a block number, each element of the array comprising a translation entry;

where a translation entry comprises a file offset and a size, the file offset and size identifying a block of one or more bytes in the file, the block number indexing the entry thus identifying the block;

where the block identified by the root block number comprises an encoding of a leaf node or a nonleaf node;

where a nonleaf node comprises (a) a counter c, (b) one or more child block numbers, where the number of child block numbers equals c, each child block number identifying a block comprising a leaf node or nonleaf node, the children being numbered consecutively from 0 to c−1, (c) one or more pivots, where the number of pivots equals one less than the number of child block numbers, the pivots being numbered consecutively from 0 to c−2, (d) one or more message queues, where the number of message queues equals c, the message queues being numbered consecutively from 0 to c−1, and (e) a descriptor version number;

where a leaf node comprises (a) a sorted array of one or more leaf entries, (b) a checksum, and (c) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;

where a pivot comprises a key;

where a value comprises a length and a sequence of one or more bytes;

where a key comprises a length and a sequence of one or more bytes;

where a key-value pair comprises a key and a value;

where a message queue comprises a FIFO (first-in-first-out) of one or more messages;

where the FIFO of messages comprises a counter f and a sequence of one or more messages where the number of messages in the sequence equals f;

where the FIFO of messages supports operations comprising enqueueing a message and dequeueing the least recently enqueued message;

where a message comprises (a) a message operation, (b) a key, and (c) a value;

where a leaf entry comprises (a) a value, and (b) a key;

where a message operation comprises an insert operation, a delete operation, an abort operation, and a commit operation;

where, when the front-end module executes an insert of a key-value pair into a file in a transaction, the front-end module causes the locking module to acquire an exclusive lock on the key, and the front-end module creates a message in which the message operation comprises an insert operation, the key length and key comprise the key of the key-value pair, the value length and value comprise the value of the key-value pair, the front-end module then causing the file-maintenance module to insert the message into the root block identified in the header of the file;

inserting a message into nonleaf node comprising (a) identifying which children the key of the message is to be delivered to, and (b) inserting the message into the FIFOs of the message queues respectively corresponding to the identified children;

identifying which child a message to is be delivered to in a nonleaf node comprising comparing the pivot keys of the nonleaf node to the key of the message, thus identifying one or more children that can hold the message;

inserting a message into a leaf node, the insertion comprising (a) fetching from the leaf node the leaf entry with the same key as the message, if such leaf entry exists, otherwise constructing an empty leaf entry, (b) if the message operation comprises an insertion operation then
  i. constructing a leaf entry with a key taken from the message, a provisional value taken from the value of the message, and a committed value taken from the previously existing leaf entry with the same key if such leaf entry exists, otherwise setting the new leaf entry to have no committed value,
  ii. deleting the previous leaf entry if it exists, and
  iii. storing the new leaf entry in the leaf node, (c) if the message operation comprises a delete operation then
  i. constructing a leaf entry that is a provisional delete, with the committed value taken from the previously existing leaf entry with the same key if such leaf entry exists,
  ii. deleting the previous leaf entry if it exists, and
  iii. storing the new leaf entry in the leaf node, where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;

where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the locking module to acquire a shared lock on the key and causes the file-maintenance module to traverse the tree, searching the root node for the key;

where searching a nonleaf node for a key comprises identifying the smallest-numbered child that can hold the key as the next node on the path, and then searching the child node; where searching a leaf node comprises fetching from the leaf node the leaf entry with the same key as the message, if such key exists, and returning the associated value from the leaf entry;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length; where when the front-end module creates a file, the front-end module specifies a descriptor causing the file-maintenance module to maintain the descriptor version number in each node in the file.

10. A computer system comprising a processor; a main memory; a secondary memory; where one or both of the memories contains an encoded application for storing data on the secondary memory, that when the application is performed on the processor, provides a process for processing information, the process causing the computer system to perform the operations of organizing data in a data storage system, said process comprising:

providing a system, wherein the system comprises distinct software modules, and wherein the distinct software modules comprise a front-end module, a buffer-pool module, a recovery module, a logging module, a locking module, and a file-maintenance module;

one or more data files being maintained by the file-maintenance module;

where a data file comprises a header, and one or more blocks;

where one or more of the blocks comprise bytes encoding leaf nodes, and one or more of the blocks comprise bytes encoding nonleaf nodes;

where a header comprises a root block number identifying a root block;

where the block identified by the root block number comprises an encoding of a leaf node or a nonleaf node;

where a nonleaf node comprises
(a) a counter c,
(b) one or more child block numbers, where the number of child block numbers equals c, each child block number identifying a block comprising a leaf node or nonleaf node, the children being numbered consecutively from 0 to c−1,
(c) one or more pivots, where the number of pivots equals one less than the number of child block numbers, the pivots being numbered consecutively from 0 to c−2, and
(d) one or more message queues, where the number of message queues equals c, the message queues being numbered consecutively from 0 to c−1, and
(e) a descriptor version number;

where a leaf node comprises
(a) a log sequence number,
(b) a sorted array of one or more leaf entries, and
(c) a checksum, and
(d) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;

where a value comprises a length and a sequence of one or more bytes;

where a key comprises a length and a sequence of one or more bytes;

where a pivot comprises a key;

where a key-value pair comprises a key and a value;

where a message queue comprises a FIFO (first-in-first-out) of one or more messages;

where the FIFO of messages comprises a counter f and a sequence of one or more messages where the number of messages in the sequence equals f;

where the FIFO of messages supports operations comprising enqueueing a message and dequeueing the least recently enqueued message;

where a message comprises
(a) a message operation,
(b) a key,
(c) a value,
(d) a transaction-identifier-sequence length, and
(e) a sequence of one or more transaction identifiers, where the number of transaction identifiers equals the transaction-identifier-sequence length;

where a leaf entry comprises
(a) a transaction-record count, and
(b) a key;

where for a leaf entry in which the transaction-record count equals one, the leaf entry further comprises a value;

where for a leaf entry in which the transaction-record count is greater than one, the leaf entry further comprises a sequence of transaction records equal in length to the transaction-record count;

where a transaction record comprises a transaction record type, a transaction identifier, and a value;

where a transaction record type comprises an operation comprising an insert operation, a delete operation, and a placeholder operation;

where a transaction identifier comprises a log sequence number;

where a message operation comprises an insert operation, a delete operation, an abort operation, and a commit operation;

where, when the front-end module executes an insert of a key-value pair into a file in a transaction, the front-end module causes the locking module to acquire an exclusive lock on the key, and the front-end module creates a message in which the message operation comprises an insert operation, the key length and key comprise the key of the key-value pair, the value length and value comprise the value of the key-value pair, the transaction-identifier-sequence length comprises the depth of the transaction, where a transaction with no parents has depth one, and a transaction with a parent has depth equal to one plus the depth of the parent, and the sequence of transaction identifiers comprises the transaction identifier of the transaction, and of each of the transaction's ancestors, the front-end module then causing the file-maintenance module to insert the message into the root block identified in the header of the file;
inserting a message into nonleaf node comprising
(a) identifying which children the key of the message is to be delivered to,
(b) inserting the message into the FIFOs of the message queues respectively corresponding to the identified children, and (c) determining if the total size of the node is larger than a specified value, and if so then flushing message queues of one or more children;
identifying which child a message is to be delivered to in a nonleaf node comprising comparing the pivot keys of the nonleaf node to the key of the message, thus identifying one or more children that can hold the message;
flushing message queues of one or more children comprising selecting a nonempty message queue, fetching the corresponding child block into main memory using the buffer-pool module, and removing one or more messages from the message queue and inserting said messages into the child block;
inserting a message into a leaf node, the insertion comprising
(a) fetching from the leaf node the leaf entry with the same key as the message, if such leaf entry exists, otherwise constructing an empty leaf entry,
(b) if the message operation comprises an insert operation or a delete operation then
  i. discarding any existing transaction record in the leaf entry that has the same innermost transaction identifier as the message,
  ii. adding placeholder transaction records for every ancestor transaction identifier in the message that is not listed in the leaf entry,
  iii. adding an insert or delete transaction record, depending on the operation of the message, for the innermost transaction of the message, the value length and value of the transaction record being copied from the message, and
  iv. storing the resulting leaf entry into the leaf node,
(c) if the message operation comprises an abort operation and if the innermost transaction identifier of the leaf entry equals the innermost transaction identifier of the message, then
  i. removing the innermost transaction record of the leaf entry,
  ii. while the innermost transaction record is a placeholder, removing said innermost transaction record,
  iii. if the resulting leaf entry is empty, then deleting the original leaf entry, if any, from the leaf node, otherwise storing the new leaf entry into the leaf node, and
(d) if the message operation comprises a commit operation and if the innermost transaction identifier of the leaf entry equals the innermost transaction identifier of the message, then
  i. if the innermost transaction record of the leaf entry is a delete operation then
    A. removing the innermost transaction record of the leaf entry,
    B. if the resulting leaf entry is empty, then deleting the leaf entry from the leaf node,
    C. otherwise replacing the new innermost transaction record with the contents of the removed innermost transaction record without changing the transaction identifier of the new innermost transaction record, and
  ii. if the innermost transaction record of the leaf entry is an insert operation then
    A. removing the innermost transaction record of the leaf entry,
    B. if the resulting leaf entry is empty, then replacing the old leaf entry with a new leaf entry with transaction-record count equal to one and with the key and value copied from the message,
    C. otherwise replacing the new innermost transaction record of the leaf entry with the contents of the removed innermost transaction record without changing the transaction identifier of the new innermost transaction record, and
where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;
where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;
where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;
where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;
where when the front-end module executes a search on a particular key in a file in a transaction, the front-end module causes the locking module to acquire a shared lock on the key and causes the file-maintenance module to traverse the tree, searching the root node for the key;
where searching a nonleaf node for a key comprises identifying the smallest-numbered child that can hold the key as the next node on the path, flushing the message queue of that child, and then searching the child node;
where searching a leaf node comprises fetching from the leaf node the leaf entry with the same key as the message, if such key exists, and returning the associated value from the innermost transaction record of the leaf entry, if the transaction record count is greater than one, or returning the value of the leaf entry if the transaction record count equals one;
where the logging module maintains a log, the log comprising a sequence of one or more log entries;
a log entry comprising a sequence of bytes encoding, in order, a log sequence number, a length, log entry data, a checksum, and the length again;

where a log sequence number comprises a number, where the log sequence number in one log entry of the log is one less than the log sequence number in the following log entry in the log;

where when the front-end module executes an insert of a key-value pair into a file in a transaction, the front-end module causes the logging module to create a log entry in which the log data comprises bytes that encode an insert operation, the key, the value, the transaction identifier of the transaction, and a file identifier identifying the file;

the front-end module establishing for each file, when the file is opened, a file identifier;

where a file identifier comprises a number;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length;

where when recovering from a crash, the recovery module reads the log and acts on each log entry to restore the data stored into a consistent state;

where when the front-end module creates a file, the front-end module specifies a descriptor causing the file-maintenance module to maintain the descriptor version number in each node in the file.

11. A computer system comprising a processor; a main memory; a secondary memory; where one or both of the memories contains an encoded application for storing data on the secondary memory, that when the application is performed on the processor, provides a process for processing information, the process causing the computer system to perform the operations of organizing data in a data storage system, said process comprising:

providing a system, wherein the system comprises distinct software modules, and wherein the distinct software modules comprise a front-end module, a buffer-pool module, a recovery module, a logging module, a locking module, and a file-maintenance module;

one or more data files being maintained by the file-maintenance module;

where a data file comprises a header, and one or more blocks;

where one or more of the blocks comprise bytes encoding a block translation table, and one or more of the blocks comprise bytes encoding leaf nodes, and one or more of the blocks comprise bytes encoding nonleaf nodes;

where a header comprises a root block number identifying a root block and a set of one or more block numbers identifying block translation tables blocks;

where a block translation table comprises a number and an array, the number specifying the length of the array, the array indexed by a block number, each element of the array comprising a translation entry;

where a translation entry comprises a file offset and a size, the file offset and size identifying a block of one or more bytes in the file, the block number indexing the entry thus identifying the block;

where the block identified by the root block number comprises an encoding of a leaf node or a nonleaf node;

where a nonleaf node comprises (a) a fingerprint seed,
(b) a fingerprint,
(c) a counter c,
(d) one or more child block numbers, where the number of child block numbers equals c, each child block number identifying a block comprising a leaf node or nonleaf node, the children being numbered consecutively from 0 to $c-1$,
(e) one or more pivots, where the number of pivots equals one less than the number of child block numbers, the pivots being numbered consecutively from 0 to $c-2$,
(f) one or more message queues, where the number of message queues equals c, the message queues being numbered consecutively from 0 to $c-1$, and
(g) a descriptor version number;

where a leaf node comprises (a) a fingerprint seed,
(b) a fingerprint,
(c) a log sequence number,
(d) a sorted array of one or more leaf entries,
(e) a checksum, and
(f) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;

where a pivot comprises a key;

where a key comprises a length and a sequence of one or more bytes;

where a value comprises a length and a sequence of one or more bytes;

where a key-value pair comprises a key and a value;

where a message queue comprises a FIFO (first-in-first-out) of one or more messages;

where the FIFO of messages comprises a counter f and a sequence of one or more messages where the number of messages in the sequence equals f;

where the FIFO of messages supports operations comprising enqueueing a message and dequeueing the least recently enqueued message;

where a message comprises (a) a message operation,
(b) a key,
(c) a value,
(d) a transaction-identifier-sequence length, and
(e) a sequence of one or more transaction identifiers, where the number of transaction identifiers equals the transaction-identifier-sequence length;

where a leaf entry comprises (a) a transaction-record count, and
(b) a key;

where for a leaf entry in which the transaction-record count equals one, the leaf entry further comprises a value;

where for a leaf entry in which the transaction-record count is greater than one, the leaf entry further comprises a sequence of transaction records equal in length to the transaction-record count;

where a transaction record comprises a transaction record type, a transaction identifier, and a value;

where a transaction record type comprises an operation comprising an insert operation, a delete operation, and a placeholder operation;

where a transaction identifier comprises a log sequence number;

where a message operation comprises an insert operation, a delete operation, an abort operation, and a commit operation;

where, when the front-end module executes an insert of a key-value pair into a file in a transaction, the front-end module causes the locking module to acquire an exclusive lock on the key, and the front-end module creates a message in which the message operation comprises an insert operation, the key length and key comprise the key of the key-value pair, the value length and value comprise the value of the key-value pair, the transaction-identifier-sequence length comprises the depth of the transaction, where a transaction with no parents has depth one, and a transaction with a parent has depth equal to one plus the depth of the parent, and the sequence of transaction identifiers comprises the transaction identifier of the transaction, and of each of the transaction's ancestors, the front-end module then causing the file-maintenance module to insert the message into the root block identified in the header of the file;

inserting a message into nonleaf node comprising
 (a) identifying which children the key of the message is to be delivered to,
 (b) inserting the message into the FIFOs of the message queues respectively corresponding to the identified children, and
 (c) determining if the total size of the node is larger than a specified value, and if so then flushing message queues of one or more children;

identifying which child a message is to be delivered to in a nonleaf node comprising comparing the pivot keys of the nonleaf node to the key of the message, thus identifying one or more children that can hold the message;

flushing message queues of one or more children comprising selecting a nonempty message queue, fetching the corresponding child block into main memory using the buffer-pool module, and removing one or more messages from the message queue and inserting said messages into the child block;

inserting a message into a leaf node, the insertion comprising
 (a) fetching from the leaf node the leaf entry with the same key as the message, if such leaf entry exists, otherwise constructing an empty leaf entry,
 (b) if the message operation comprises an insert operation or a delete operation then
  i. discarding any existing transaction record in the leaf entry that has the same inner most transaction identifier as the message,
  ii. adding placeholder transaction records for every ancestor transaction identifier in the message that is not listed in the leaf entry,
  iii. adding an insert or delete transaction record, depending on the operation of the message, for the innermost transaction of the message, the value length and value of the transaction record being copied from the message, and
  iv. storing the resulting leaf entry into the leaf node,
 (c) if the message operation comprises an abort operation and if the innermost transaction identifier of the leaf entry equals the innermost transaction identifier of the message, then
  i. removing the innermost transaction record of the leaf entry,
  ii. while the innermost transaction record is a placeholder, removing said innermost transaction record,
  iii. if the resulting leaf entry is empty, then deleting the original leaf entry, if any, from the leaf node, otherwise storing the new leaf entry into the leaf node, and
 (d) if the message operation comprises a commit operation and if the innermost transaction identifier of the leaf entry equals the innermost transaction identifier of the message, then
  i. if the innermost transaction record of the leaf entry is a delete operation then
   A. removing the innermost transaction record of the leaf entry,
   B. if the resulting leaf entry is empty, then deleting the leaf entry from the leaf node,
   C. otherwise replacing the new innermost transaction record with the contents of the removed innermost transaction record without changing the transaction identifier of the new innermost transaction record, and
  ii. if the innermost transaction record of the leaf entry is an insert operation then
   A. removing the innermost transaction record of the leaf entry,
   B. if the resulting leaf entry is empty, then replacing the old leaf entry with a new leaf entry with transaction-record count equal to one and with the key and value copied from the message,
   C. otherwise replacing the new innermost transaction record of the leaf entry with the contents of the removed innermost transaction record without changing the transaction identifier of the new innermost transaction record, and where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes, where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the locking module to acquire a shared lock on the key and causes the file-maintenance module to traverse the tree, searching the root node for the key;

where searching a nonleaf node for a key comprises identifying the smallest-numbered child that can hold the key as the next node on the path, flushing the message queue of that child, and then searching the child node;

where searching a leaf node comprises fetching from the leaf node the leaf entry with the same key as the message, if such key exists, and returning the associated value from the innermost transaction record of the leaf entry, if the transaction record count is greater than one, or returning the value of the leaf entry if the transaction record count equals one;

where the logging module maintains a log, the log comprising a sequence of one or more log entries;

a log entry comprising a sequence of bytes encoding, in order, a log sequence number, a length, log entry data, a checksum, and the length again;

where a log sequence number comprises a number, where the log sequence number in one log entry of the log is one less than the log sequence number in the following log entry in the log;

where when the front-end module executes an insert of a key-value pair into a file in a transaction, the front-end module causes the logging module to create a log entry in which the log data comprises bytes that encode an insert operation, the key, the value, the transaction identifier of the transaction, and a file identifier identifying the file;

the front-end module establishing for each file, when the file is opened, a file identifier;

where a file identifier comprises a number;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length;

where a fingerprint seed comprises an integer;

where a fingerprint comprises an integer;

where the fingerprint of a leaf node is calculated as the sum over all the leaf entries of the node of the product of the fingerprint seed of the node with the checksum of the leaf entry;

where the fingerprint of a nonleaf node is calculated as the sum of the fingerprints of the children nodes of the nonleaf node further summed with the sum over all the messages in the message queues in the node of the product of the fingerprint seed of the node with the checksum of the message;

where when the front-end module creates or opens a file, the front-end module provides a comparison function that, given two keys and the descriptor from the file header, compares the two keys to determine whether the two keys are to be considered equal or else which one is to be ordered ahead of the other, thus ordering key-value pairs;

where the file-maintenance module maintains the tree of each file so that in a nonleaf node, for each given a pivot key numbered i the node, the pivot key is ordered to be greater than or equal to any of the key-value pairs stored in child subtrees or message queues numbered less than or equal to i, and the pivot key is ordered to be less than or equal to any of the key-value pairs stored in child subtrees or message queues numbered greater than i, and the pivot key numbered i is ordered to be before any pivot keys numbered greater than i;

where when recovering from a crash, the recovery module reads the log and acts on each log entry to restore the data stored into a consistent state;

where when the front-end module creates a file, the front-end module specifies a descriptor causing the file-maintenance module to maintain the descriptor version number in each node in the file.

12. A computer program product, comprising a non-transitory computer usable medium having a computer readable program code embodied therein, said computer readable program code adapted to be executed to implement a method for storing data, said method comprising:

providing a system, wherein the system comprises distinct software modules, and wherein the distinct software modules comprise a front-end module, a buffer-pool module, a recovery module, a logging module, and a file-maintenance module;

one or more data files being maintained by the file-maintenance module;

where a data file comprises a header, and one or more blocks;

where one or more of the blocks comprise bytes encoding leaf nodes, and one or more of the blocks comprise bytes encoding nonleaf nodes;

where a header comprises a root block number identifying a root block;

where the block identified by the root block number comprises an encoding of a leaf node or a nonleaf node;

where a nonleaf node comprises
(a) a fingerprint seed,
(b) a fingerprint,
(c) a counter c,
(d) one or more child block numbers, where the number of child block numbers equals c, each child block number identifying a block comprising a leaf node or nonleaf node, the children being numbered consecutively from 0 to c−1,
(e) one or more pivots, where the number of pivots equals one less than the number of child block numbers, the pivots being numbered consecutively from 0 to c−2,
(f) one or more message queues, where the number of message queues equals c, the message queues being numbered consecutively from 0 to c−1, and
(g) a descriptor version number;

where a leaf node comprises
(a) a fingerprint seed,
(b) a fingerprint,
(c) a log sequence number,
(d) a sorted array of one or more leaf entries,
(e) a checksum, and
(f) a descriptor version number;

the leaf and nonleaf nodes providing a tree structure, in which the leaves of the tree comprise the leaf nodes and the internal nodes of the tree comprise the nonleaf nodes, where the root block number identifies the root of the tree, and for each nonleaf node, the child block numbers of the node identify the respective children of the node;

where a key comprises a length and a sequence of one or more bytes;

where a value comprises a length and a sequence of one or more bytes;

where a pivot comprises a key;

where a key-value pair comprises a key and a value;

where a message queue comprises a FIFO (first-in-first-out) of one or more messages;
where the FIFO of messages comprises a counter f and a sequence of one or more messages where the number of messages in the sequence equals f;
where the FIFO of messages supports operations comprising enqueueing a message and dequeueing the least recently enqueued message;
where a message comprises
(a) a message operation,
(b) a key,
(c) a value,
(d) a transaction-identifier-sequence length, and
(e) a sequence of one or more transaction identifiers, where the number of transaction identifiers equals the transaction-identifier-sequence length;
where a leaf entry comprises
(a) a transaction-record count, and
(b) a key;
where for a leaf entry in which the transaction-record count equals one, the leaf entry further comprises a value;
where for a leaf entry in which the transaction-record count is greater than one, the leaf entry further comprises a sequence of transaction records equal in length to the transaction-record count;
where a transaction record comprises a transaction record type, a transaction identifier, and a value;
where a transaction record type comprises an operation comprising an insert operation, a delete operation, and a placeholder operation;
where a transaction identifier comprises a log sequence number;
where a message operation comprises an insert operation, a delete operation, an abort operation, and a commit operation;
where, when the front-end module executes an insert of a key-value pair into a file in a transaction, and the front-end module creates a message in which the message operation comprises an insert operation, the key length and key comprise the key of the key-value pair, the value length and value comprise the value of the key-value pair, the transaction-identifier-sequence length comprises the depth of the transaction, where a transaction with no parents has depth one, and a transaction with a parent has depth equal to one plus the depth of the parent, and the sequence of transaction identifiers comprises the transaction identifier of the transaction, and of each of the transaction's ancestors, the front-end module then causing the file-maintenance module to insert the message into the root block identified in the header of the file;
inserting a message into nonleaf node comprising
(a) identifying which children the key of the message is to be delivered to,
(b) inserting the message into the FIFOs of the message queues respectively corresponding to the identified children, and
(c) determining if the total size of the node is larger than a specified value, and if so then flushing message queues of one or more children;
identifying which child a message is to be delivered to in a nonleaf node comprising comparing the pivot keys of the nonleaf node to the key of the message, thus identifying one or more children that can hold the message;
flushing message queues of one or more children comprising selecting a nonempty message queue, fetching the corresponding child block into main memory using the buffer-pool module, and removing one or more messages from the message queue and inserting said messages into the child block;
inserting a message into a leaf node, the insertion comprising
(a) fetching from the leaf node the leaf entry with the same key as the message, if such leaf entry exists, otherwise constructing an empty leaf entry,
(b) if the message operation comprises an insert operation or a delete operation then
  i. discarding any existing transaction record in the leaf entry that has the same innermost transaction identifier as the message,
  ii. adding placeholder transaction records for every ancestor transaction identifier in the message that is not listed in the leaf entry,
  iii. adding an insert or delete transaction record, depending on the operation of the message, for the innermost transaction of the message, the value length and value of the transaction record being copied from the message, and
  iv. storing the resulting leaf entry into the leaf node,
(c) if the message operation comprises an abort operation and if the innermost transaction identifier of the leaf entry equals the innermost transaction identifier of the message, then
  i. removing the innermost transaction record of the leaf entry,
  ii. while the innermost transaction record is a placeholder, removing said innermost transaction record,
  iii. if the resulting leaf entry is empty, then deleting the original leaf entry, if any, from the leaf node, otherwise storing the new leaf entry into the leaf node, and
(d) if the message operation comprises a commit operation and if the innermost transaction identifier of the leaf entry equals the innermost transaction identifier of the message, then
  i. if the innermost transaction record of the leaf entry is a delete operation then
    A. removing the innermost transaction record of the leaf entry,
    B. if the resulting leaf entry is empty, then deleting the leaf entry from the leaf node,
    C. otherwise replacing the new innermost transaction record with the contents of the removed innermost transaction record without changing the transaction identifier of the new innermost transaction record, and
  ii. if the innermost transaction record of the leaf entry is an insert operation then
    A. removing the innermost transaction record of the leaf entry,
    B. if the resulting leaf entry is empty, then replacing the old leaf entry with a new leaf entry with transaction-record count equal to one and with the key and value copied from the message,
    C. otherwise replacing the new innermost transaction record of the leaf entry with the contents of the removed innermost transaction record without changing the transaction identifier of the new innermost transaction record, and
where when a leaf node is modified, if it becomes larger than a specified size, the leaf node is split by the file-maintenance module into two leaf nodes, and the parent of the leaf node, if it exists, is modified to include a new pivot key that separates the two leaf nodes, and to include pointers to the two leaf nodes, and if there is no parent of the leaf node, a new root node is created with the new pivot keys and the pointers to the leaf nodes;

where when a leaf node is modified, it becomes smaller than a specified size, and if there is a left or right sibling to the leaf, then the leaf and the sibling are merged into one leaf node, and the parent of the two leaf nodes is modified to remove the pivot that separates the two nodes and to point at the one remaining node instead of the two original leaf nodes;

where when a nonleaf node is modified to include an additional pivot and pointer, if the fanout of the nonleaf node therefore becomes larger than a specified value, then the nonleaf node is split into two nonleaf nodes, and the parent of the nonleaf node, if it exists, is modified to include a new pivot key that separates the two nonleaf nodes, and to include pointers to the two nonleaf nodes, and if there is no parent of the nonleaf node, a new root node is created with the new pivot keys and the pointers to the leaf nodes;

where when a nonleaf node is modified to remove a pivot and pointer, if the fanout of the nonleaf node therefore becomes smaller than a specified value, and if there is a sibling to the nonleaf node, the nonleaf node and its siblings are merged, and their parent is updated to remove the pivot that separates the two nodes and to point at the one remaining node instead of the two original leaf nodes;

where when the front-end module executes a search on a particular key in a file in a transaction, the front-end module causes the file-maintenance module to traverse the tree, searching the root node for the key;

where searching a nonleaf node for a key comprises identifying the smallest-numbered child that can hold the key as the next node on the path, flushing the message queue of that child, and then searching the child node;

where searching a leaf node comprises fetching from the leaf node the leaf entry with the same key as the message, if such key exists, and returning the associated value from the innermost transaction record of the leaf entry, if the transaction record count is greater than one, or returning the value of the leaf entry if the transaction record count equals one;

where the logging module maintains a log, the log comprising a sequence of one or more log entries;

a log entry comprising a sequence of bytes encoding, in order, a log sequence number, a length, log entry data, a checksum, and the length again;

where a log sequence number comprises a number, where the log sequence number in one log entry of the log is one less than the log sequence number in the following log entry in the log;

where when the front-end module executes an insert of a key-value pair into a file in a transaction, the front-end module causes the logging module to create a log entry in which the log data comprises bytes that encode an insert operation, the key, the value, the transaction identifier of the transaction, and a file identifier identifying the file;

the front-end module establishing for each file, when the file is opened, a file identifier;

where a file identifier comprises a number;

where a checksum on a sequence of bytes is calculated by organizing the bytes into 8-byte values, interpreting the 8-byte values as integers, and summing the product of the ith 8-byte value with seventeen raised to the power of i to produce a checksum;

where a data file header further comprises a descriptor;

where a descriptor comprises a version number, a length, and a sequence of one or more bytes, the number of bytes being equal to the length;

where a fingerprint seed comprises an integer;

where a fingerprint comprises an integer;

where the fingerprint of a leaf node is calculated as the sum over all the leaf entries of the node of the product of the fingerprint seed of the node with the checksum of the leaf entry;

where the fingerprint of a nonleaf node is calculated as the sum of the fingerprints of the children nodes of the nonleaf node further summed with the sum over all the messages in the message queues in the node of the product of the of the fingerprint seed of the node with the checksum of the message;

where when recovering from a crash, the recovery module reads the log and acting on each log entry to restore the data stored into a consistent state;

where when the front-end module creates a file, the front-end module specifies a descriptor causing the file-maintenance module to maintain the descriptor version number in each node in the file.

\* \* \* \* \*